(12) United States Patent
Emadi et al.

(10) Patent No.: US 12,477,852 B2
(45) Date of Patent: Nov. 18, 2025

(54) SEMICONDUCTOR LIGHT SENSING

(71) Applicant: ILLUMINA, INC., San Diego, CA (US)

(72) Inventors: Arvin Emadi, San Jose, CA (US); Ravi Billa, Foster City, CA (US); Mohsen Rezaei, Brown Deer, WI (US); Craig Hetherington, Foster City, CA (US)

(73) Assignee: ILLUMINA, INC., San Diego, CA (US)

( * ) Notice: Subject to any disclaimer, the term of this patent is extended or adjusted under 35 U.S.C. 154(b) by 439 days.

(21) Appl. No.: 18/048,705

(22) Filed: Oct. 21, 2022

(65) Prior Publication Data

US 2023/0126668 A1 Apr. 27, 2023

Related U.S. Application Data

(60) Provisional application No. 63/271,078, filed on Oct. 22, 2021.

(51) Int. Cl.
*H10F 39/00* (2025.01)
*G01N 21/64* (2006.01)
*H01L 23/60* (2006.01)
*H10F 39/18* (2025.01)

(52) U.S. Cl.
CPC ....... *H10F 39/8067* (2025.01); *G01N 21/645* (2013.01); *H01L 23/60* (2013.01); *H10F 39/18* (2025.01); *G01N 21/6428* (2013.01)

(58) Field of Classification Search
CPC .. G01N 21/6428; G01N 21/645; H01L 23/60; H10F 39/18; H10F 39/8067
See application file for complete search history.

(56) References Cited

U.S. PATENT DOCUMENTS

| 6,024,923 | A  | * | 2/2000  | Melendez    | G01N 21/645  |
|           |    |   |         |             | 422/91       |
| 8,384,178 | B2 | * | 2/2013  | Mabuchi     | H10F 39/014  |
|           |    |   |         |             | 257/431      |
| 11,106,063| B1 | * | 8/2021  | Mirshafieyan| G02F 1/0327  |
| 11,302,735| B2 | * | 4/2022  | Yang        | H10F 39/8053 |
| 2004/0066511 | A1 | * | 4/2004 | Tanaami   | G02B 21/0076 |
|           |    |   |         |             | 356/318      |
| 2005/0190366 | A1 | * | 9/2005 | Boege     | G01N 21/253  |
|           |    |   |         |             | 356/417      |
| 2005/0237524 | A1 | * | 10/2005| Kamei     | G01N 21/645  |
|           |    |   |         |             | 356/318      |
| 2006/0252070 | A1 | * | 11/2006| Boege     | G06V 20/693  |
|           |    |   |         |             | 382/128      |
| 2007/0087382 | A1 |   | 4/2007 | Howorka et al. | |

(Continued)

FOREIGN PATENT DOCUMENTS

WO  WO2019132857 A1  7/2019
WO   2021071699 A1  4/2021

*Primary Examiner* — Blake C Riddick
(74) *Attorney, Agent, or Firm* — Heslin Rothenberg Farley & Mesiti P.C.

(57) ABSTRACT

There is set forth herein, in one example, a device comprising: a detector surface; an array of sensing photodiodes formed in a semiconductor formation, wherein the semiconductor formation receives light from the detector surface; and a light separating structure intermediate the detector surface and a sensing photodiode of the array of sensing photodiodes.

17 Claims, 27 Drawing Sheets

(56) References Cited

U.S. PATENT DOCUMENTS

| | | | |
|---|---|---|---|
| 2007/0159753 A1* | 7/2007 | Randall | H05K 9/009 361/111 |
| 2009/0212235 A1* | 8/2009 | Patt | B01L 7/52 250/459.1 |
| 2010/0002981 A1* | 1/2010 | Tang | G01N 21/255 385/12 |
| 2010/0247382 A1 | 9/2010 | Lee et al. | |
| 2010/0282083 A1* | 11/2010 | Edwards | B03C 3/155 55/482 |
| 2011/0127619 A1 | 6/2011 | Chen et al. | |
| 2012/0161270 A1* | 6/2012 | Maehara | H04N 25/65 257/E31.127 |
| 2012/0298881 A1* | 11/2012 | Ogata | G01N 21/645 250/432 R |
| 2014/0256057 A1* | 9/2014 | Ozawa | G01N 21/6428 422/69 |
| 2015/0079596 A1* | 3/2015 | Eltoukhy | G06F 16/214 435/6.12 |
| 2015/0184237 A1 | 7/2015 | Su et al. | |
| 2016/0041095 A1 | 2/2016 | Rothberg et al. | |
| 2016/0047747 A1 | 2/2016 | Lafferty et al. | |
| 2017/0191125 A1 | 7/2017 | Vijayan et al. | |
| 2017/0275690 A1 | 9/2017 | Dehlinger et al. | |
| 2017/0338271 A1* | 11/2017 | Jin | H10F 39/8053 |
| 2018/0341649 A1* | 11/2018 | Eltoukhy | G01N 15/1434 |
| 2019/0025511 A1 | 1/2019 | Rothberg et al. | |
| 2020/0284957 A1 | 9/2020 | Bellos et al. | |
| 2021/0364412 A1* | 11/2021 | Daaboul | G01N 21/45 |
| 2022/0113469 A1* | 4/2022 | Rothberg | G02B 5/20 |
| 2024/0063321 A1* | 2/2024 | Frach | H10F 77/413 |

* cited by examiner

WAVELENGTH

2ND TRENCH ETCH, FILLING AND PLANARIZATION

NW FORMATION

2<sup>ND</sup> TRENCH ETCH, FILLING AND PLANARIZATION

NW FORMATION

OXIDE + FILTER THIN FILM
DEPOSITION

2<sup>ND</sup> TRENCH ETCH, FILLING AND
PLANARIZATION

SEMICONDUCTOR LIGHT SENSING

CROSS-REFERENCE TO RELATED APPLICATIONS

This application claims priority to U.S. Patent Application No. 63/271,078 filed Oct. 22, 2021, entitled "Semiconductor Light Sensing" which is incorporated herein by reference in its entirety.

BACKGROUND

Various protocols in biological or chemical research involve performing controlled reactions. The designated reactions can then be observed or detected and subsequent analysis can help identify or reveal properties of chemicals involved in the reaction.

In some multiplex assays, an unknown analyte having an identifiable label (e.g., fluorescent label) can be exposed to thousands of known probes under controlled conditions. Each known probe can be deposited into a corresponding well of a microplate. Observing any chemical reactions that occur between the known probes and the unknown analyte within the wells can help identify or reveal properties of the analyte. Other examples of such protocols include known DNA sequencing processes, such as sequencing-by-synthesis (SBS) or cyclic-array sequencing.

In some fluorescent-detection protocols, an optical system is used to direct excitation light onto fluorophores, e.g., fluorescently-labeled analytes and to also detect the fluorescent emission light that can emit from the analytes having attached fluorophores. However, such optical systems can be relatively expensive and benefit from a larger benchtop footprint. For example, the optical system can include an arrangement of lenses, filters, and light sources.

In other proposed detection systems, the controlled reactions in a flow cell can be defined by a solid-state light sensor array (e.g., a complementary metal oxide semiconductor (CMOS) detector or a charge coupled device (CCD) detector). These systems do not involve a large optical assembly to detect the fluorescent emissions.

BRIEF DESCRIPTION

There is set forth herein, according to one example, a device comprising: a detector surface; an array of sensing photodiodes formed in a semiconductor formation, wherein the semiconductor formation receives light from the detector surface; and a light separating structure intermediate the detector surface and a sensing photodiode of the array of sensing photodiodes; wherein the light separating structure is configured to preferentially transmit photons of emission light relative to photons of excitation light.

There is set forth herein, according to one example, a device comprising: a detector surface; an array of sensing photodiodes formed in a semiconductor formation, wherein the semiconductor formation receives light from the detector surface; a structure intermediate the detector surface and a sensing photodiode of the array of sensing photodiodes, wherein the structure comprises a second semiconductor formation that absorbs photons of light, and a dielectric barrier that blocks electrons generated from photon absorption in the second semiconductor formation from reaching a sensing photodiode of the array of sensing photodiodes.

There is set forth herein, according to one example, a device comprising: a detector surface; an array of sensing photodiodes formed in a semiconductor formation, wherein the semiconductor formation receives light from the detector surface; and a structure intermediate the detector surface and a sensing photodiode of the array of sensing photodiodes, wherein the structure comprises alternating layers of a first material and a second material, the second material having a higher index of refraction than the first material, wherein the structure preferentially transmits photons of emission light relative to photons of excitation light.

There is set forth herein, according to one example, a method comprising: forming in a semiconductor formation an array of sensing photodiodes; forming an array of light separating structure regions, wherein respective light separating structure regions of the array of light separating structure regions are associated to respective sensing photodiodes of the array of sensing photodiodes; and forming a detector surface, wherein the semiconductor formation is configured to receive excitation light and emission light from the detector surface; wherein the respective light separating structure regions are formed in a receive light path of the excitation light and emission light from the detector surface.

There is set forth herein, according to one example, a method comprising: forming in a semiconductor formation an array of sensing photodiodes; forming a structure having a dielectric barrier and a second semiconductor formation, and forming a detector surface, wherein the semiconductor formation is configured to receive excitation light and emission light from the detector surface; wherein the structure having the dielectric barrier and the second semiconductor formation is formed in a receive light path of the excitation light and emission light from the detector surface.

There is set forth herein, according to one example, a method comprising: forming in a semiconductor formation an array of sensing photodiodes; forming a structure having alternating layers of first material and second material, the first material and the second material having different indices of refraction, and forming a detector surface, wherein the semiconductor formation is configured to receive excitation light and emission light from the detector surface; wherein the structure having the alternating layers of first material and second material is formed in a receive light path of the excitation light and emission light from the detector surface.

There is set forth herein, according to one example, a device comprising: a detector surface configured for supporting biological or chemical samples; an array of sensing photodiodes formed in a semiconductor formation, wherein the semiconductor formation receives excitation light and emission light from the detector surface; a conductive grid having grid segments disposed between sample sites of the detector surface; wherein the conductive grid defines a charge removal path.

There is set forth herein, according to one example, a device comprising: a detector surface configured for supporting biological or chemical samples; an array of sensing photodiodes formed in a semiconductor formation, wherein the semiconductor formation receives excitation light and emission light from the detector surface; and a light separating structure in a receive light path of the excitation light and emission light intermediate the detector surface and a sensing photodiode of the array of sensing photodiodes; wherein the light separating structure is configured to preferentially transmit photons of the emission light relative to photons of the excitation light.

There is set forth herein, according to one example, a device comprising: a detector surface configured for supporting biological or chemical samples; an array of sensing photodiodes formed in a semiconductor formation, wherein the semiconductor formation receives excitation light and emission light from the detector surface; a structure in a receive light path of the excitation light and emission light intermediate the detector surface and a sensing photodiode of the array of sensing photodiodes, wherein the structure comprises a second semiconductor formation that absorbs photons of the excitation light and the emission light, and a dielectric barrier that blocks electrons generated from photon absorption in the second semiconductor formation from reaching a sensing photodiode of the array of sensing photodiodes.

There is set forth herein, according to one example, a device comprising: a detector surface configured for supporting biological or chemical samples; an array of sensing photodiodes formed in a semiconductor formation, wherein the semiconductor formation receives excitation light and emission light from the detector surface; and a structure in a receive light path of the excitation light and emission light intermediate the detector surface and a sensing photodiode of the array of sensing photodiodes, wherein the structure comprises alternating layers of a first material and a second material, the second material having a higher index of refraction than the first material, wherein the structure preferentially transmits photons of the emission light relative to photons of the excitation light.

Additional features and advantages are realized through techniques of the present disclosure.

DRAWINGS

These and other features, aspects, benefits, and advantages of the present subject matter will become better understood when the following detailed description is read with reference to the accompanying drawings in which like characters represent like parts throughout the drawings, wherein.

Figure 12:
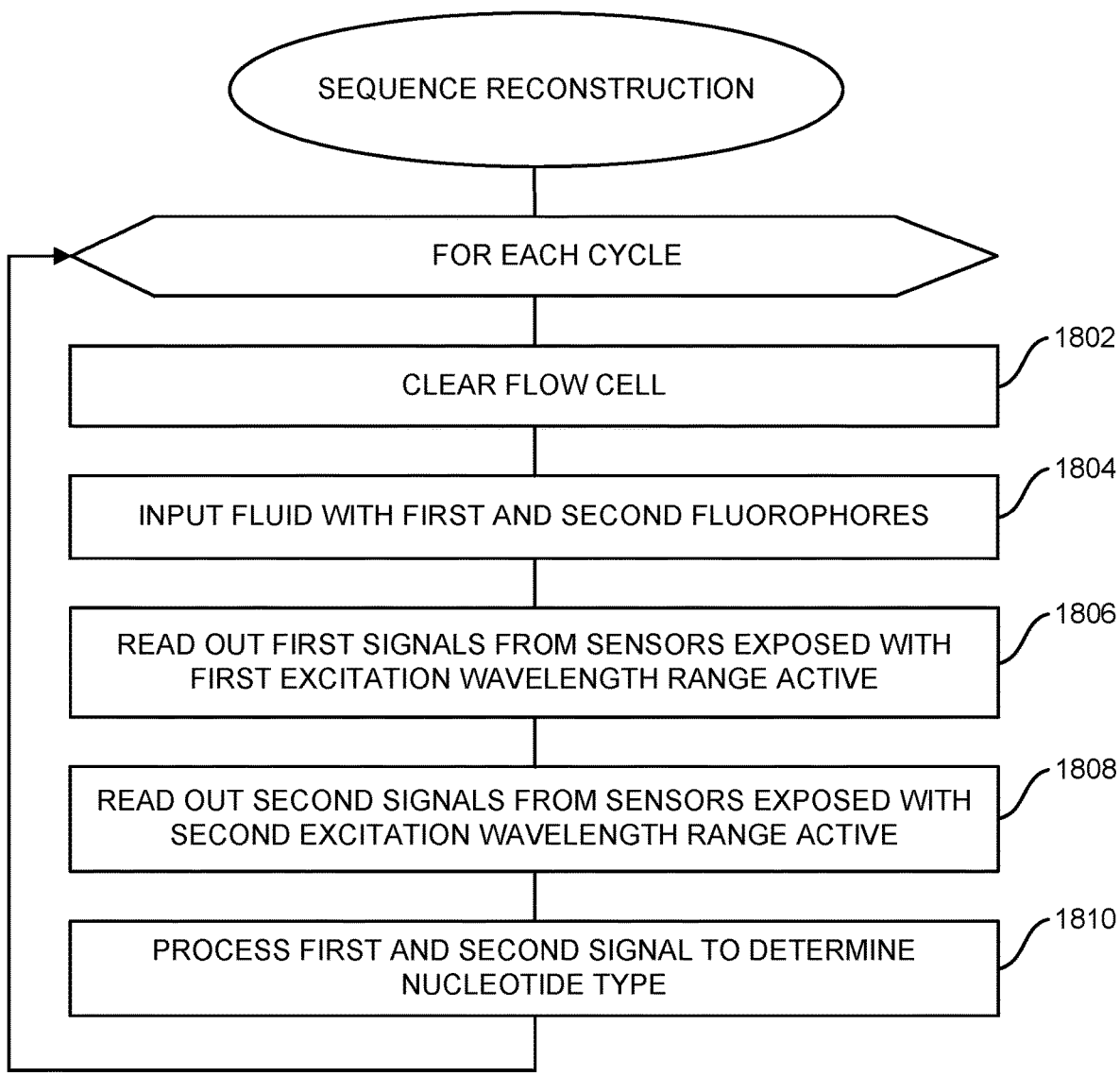

FIG. 12. is a flowchart illustrating performance of a method for performance by a system for use in biological or chemical analysis.

DETAILED DESCRIPTION

In FIGS. 1A-1D there is shown a system 100 for use in analysis, such as biological or chemical analysis. System 100 can include light energy exciter 10 and a detector assembly 20. Detector assembly 20 can include detector 200 and a flow cell 282 which flow cell 282 can be defined by detector 200. Detector 200 can include a plurality of sensing photodiodes 212 and detector surface 206 for supporting samples 502 such as biological or chemical samples subject to test. Sidewalls 284, and flow cover 288, as well as detector 200 having detector surface 206 can define and delimit flow cell 282. Detector surface 206 can have an associated detector surface plane 130.

In a further aspect, detector surface 206 can be recessed to include reaction recesses which in one example can define nanowells 208. According to one example, each sensing photodiode 212 can be associated to and aligned to nanowells 208. Each of nanowells 208 can define therein one or more reaction sites and samples 502 can be supported on such reaction sites according to one example. The reaction sites can define sample sites. Examples herein recognize that "area" as referred to herein in the context of "doped area" can refer to a volumetric space (in other words, not limited to a 2-dimensional space). Reaction sites shown as being provided by nanowells 208 can alternatively be provided by alternative features, e.g., posts, pads, ridges, channels, and/or layers of a multilayer material.

In another aspect, detector 200 can include one or more metallization layer as set forth herein defining circuitry, e.g., for readout of signals from sensing photodiodes 212, digitization, storage and signal processing.

According to one example, detector 200 can be provided by a solid-state integrated circuit detector, such as complementary metal oxide semiconductor (CMOS) integrated circuit detector or a charge coupled device (CCD) integrated circuit detector.

According to one example, system 100 can be used for performance of biological or chemical testing with use of fluorophores. For example, a fluid having one or more fluorophores can be caused to flow into and out of flow cell 282 through an inlet port using inlet port 289 and outlet port 290. Fluorophores can attract to various samples 502 and thus, by their detection fluorophores can act as markers for the samples 502 e.g., biological or chemical analytes to which they attract.

To detect the presence of a fluorophore within flow cell 282, light energy exciter 10 can be energized so that excitation light 101 in an excitation wavelength range is emitted by light energy exciter 10. On receipt of excitation light 101, fluorophores attached to samples 502 radiate emission light 501, which is the signal of interest for detection by sensing photodiodes 212. Emission light 501 owing to fluorescence of a fluorophore attached to a sample 502 will have a wavelength range red shifted relative to a wavelength range of excitation light 101.

Light energy exciter 10 can include at least one light source and at least one optical components to illuminate samples 502. Examples of light sources can include e.g., lasers, arc lamps, LEDs, or laser diodes. The optical components can be, for example, reflectors, dichroics, beam splitters, collimators, lenses, filters, wedges, prisms, mirrors, detectors, and the like. In examples that use an illumination system, the light energy exciter 10 can be configured to direct excitation light 101 to reaction sites. As one example, fluorophores can be excited by light in the green wavelength range, e.g., can be excited using excitation light 101 having a center (peak) wavelength of about 523 nm.

Examples herein recognize that a signal to noise ratio of system 100 can be expressed as set forth in the equation of (1) hereinbelow $$SNR = \frac{\text{Signal}}{\sqrt{\text{Signal}+\text{Excitation}+AF+\text{Background}+\text{Dark Current}+\text{Read Noise}^2}} \quad \text{(Eq. 1)}$$

where "Signal" is the emission light 501, i.e. the signal of interest light attributable to the fluorescence of a fluorophore attached to a sample, "Excitation" is unwanted excitation light reaching the sensing photodiodes 212, "AF" is the autofluorescence noise radiation of one or more autofluorescence sources within detector 200, "Background" is unwanted light energy transmitted into detector 200 from a source external to detector 200, "Dark Current" is current flow noise associated to random electron-hole pair generation in the absence of light and "Read Noise" is noise associated to analog-to-digital electronics.

Figure 2:
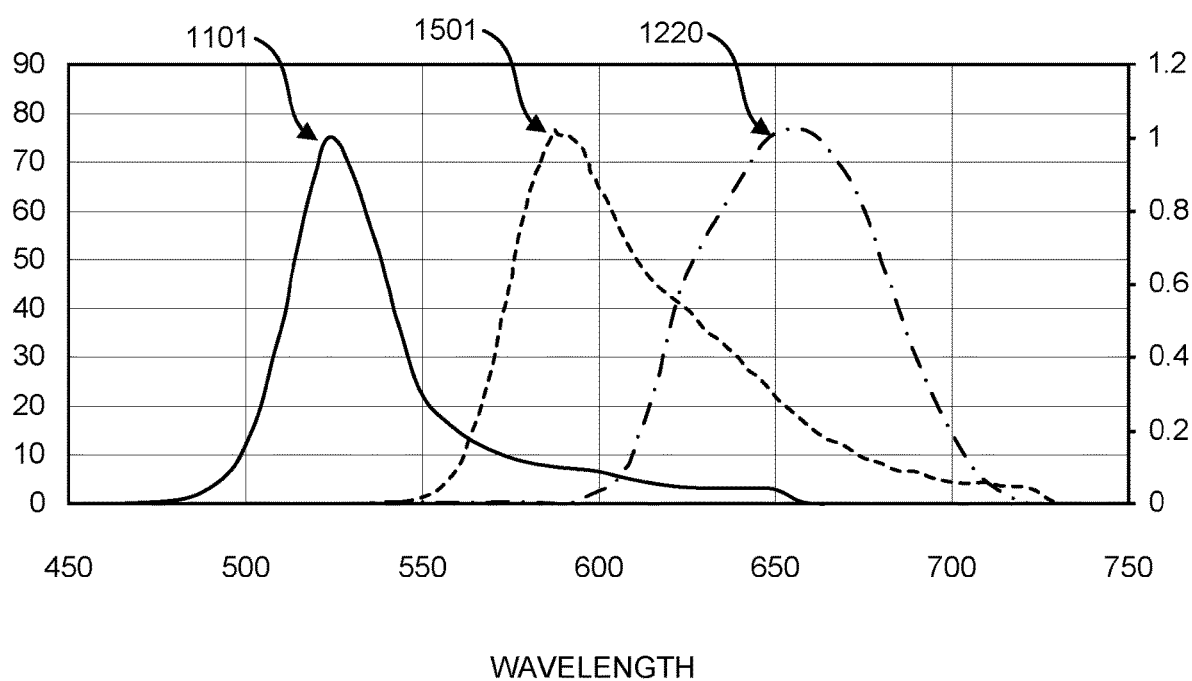
FIG. 2 is a spectral profile coordination diagram illustrating coordination between excitation wavelengths, absorption wavelengths, fluorescence emissions signal wavelengths, and detection band wavelengths according to one example.

FIG. 2 is an example of a spectral profile coordination diagram illustrating targeted coordination between a wavelength range of excitation light, a wavelength range of signal light and a detection wavelength range. In the spectral profile coordination diagram of FIG. 2 spectral profile 1101 shown as a green light spectral profile is the spectral profile of excitation light 101 as emitted by light energy exciter 10. Spectral profile 1501 is the spectral profile of the emission light 501 caused by the fluorescence of a fluorophore on being excited by excitation light 101. Spectral profile 1220 is the transmission profile (detection band) of sensing photodiodes 212 according to one example. It will be understood that the spectral profile coordination diagram of FIG. 2 is intended to represent general features common to some examples, but that variations of the indicated spectral profiles are common. In one aspect, excitation light 101 can commonly include, in addition to a green light spectral profile, a blue light spectral profile (not shown) wherein system 100 is switchable between modes in which (a) the green light spectral profile is active with the blue light spectral profile being inactive, and (b) the blue light spectral profile is active with the green light spectral profile being inactive. In other examples, there can be different combinations of excitation light 101 and emission light. In one example, the spectral profile 1101 of excitation light 101 can feature a center wavelength in the blue light wavelength range and the spectral profile of emission light 501 can feature a center wavelength in the green wavelength range.

Detector 200 can be configured to detect light in the wavelength range indicated by spectral profile 1220. Spectral profile 1220 specifies the detection wavelength range with amplitude of spectral profile 1220 indicating a level of sensitivity. Thus, referring to the spectral profile coordination diagram of FIG. 2, detector 200 is able to detect emission light 501 in the range of wavelengths wherein the spectral profile 1501 of the emission light 501 and the detection band spectral profile 1220 of sensing photodiodes 212 intersect.

Figure 1A:
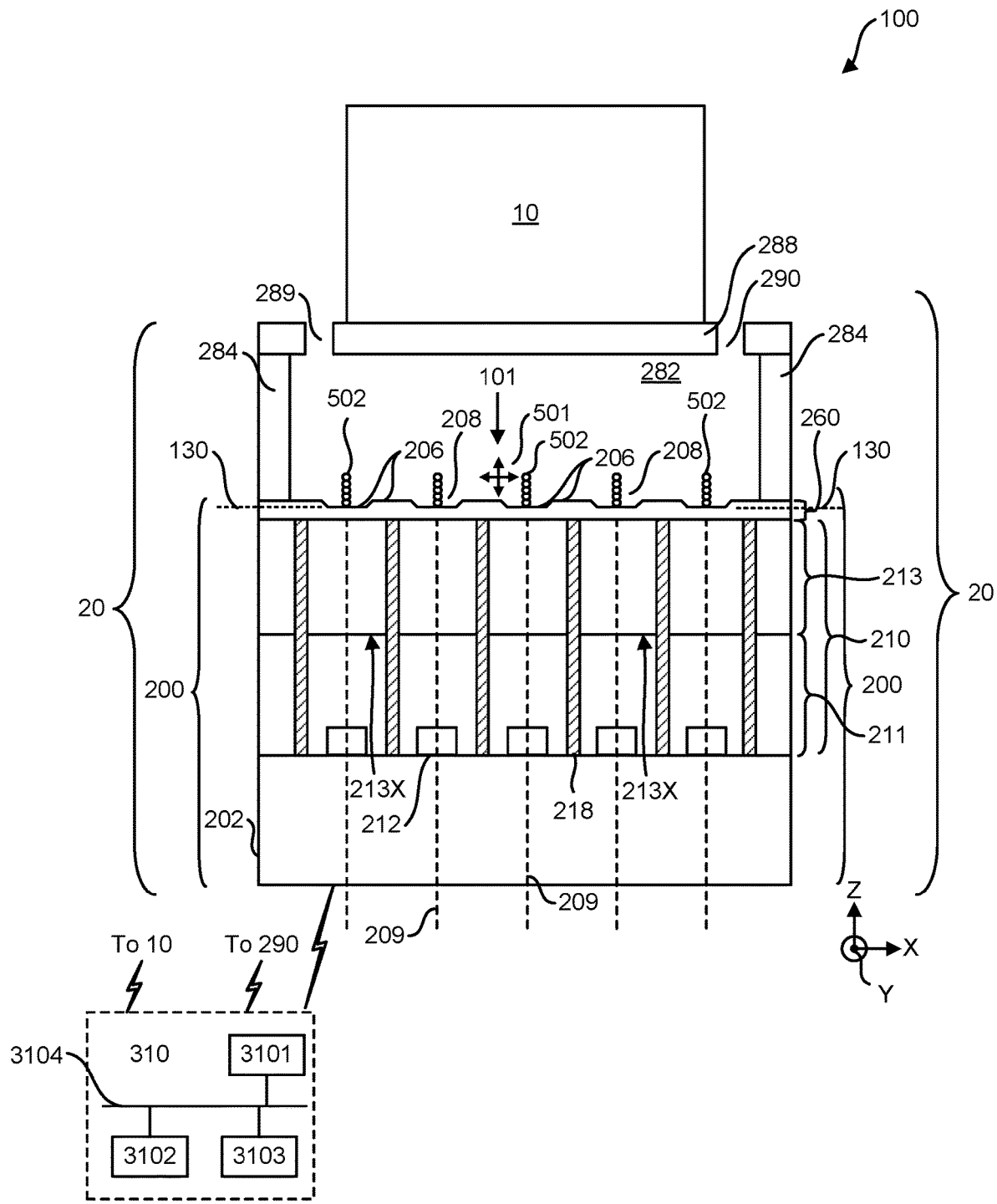
FIG. 1A is a schematic cutaway side view of a system for use in biological or chemical analysis having a detector that includes a detector surface for supporting a biological or chemical sample according to one example.

Detector 200 can include light separating features to increase the signal to noise ratio of system 100. Referring to FIG. 1A, detector 200 can include substrate 202 and sensing structure 210. Sensing structure 210 can include a semiconductor formation 211 and light separating structure 213. According to one example, semiconductor formation 211 can be provided by a silicon layer, e.g., a silicon layer defined on a bulk silicon wafer or silicon layer of an SOI wafer. Semiconductor formation 211 in another example, can be provided by a material other than silicon, e.g., graphene, gallium nitride, silicon carbide, gallium arsenide, germanium, or other Group IV semiconductor material. Sensing structure 210 can include various features formed therein for improving the signal to noise ratio of system 100. In one example, separating light by light separating structure 213 can include absorption based light separation. In one example, separating light by light separating structure 213 can include reflection based light separation.

Semiconductor formation 211 can include a plurality of spaced apart sensing photodiodes 212. The sensing photodiodes 212 can be defined by doped regions of semiconductor formation 211. The plurality of spaced apart sensing photodiodes 212 can define an array of sensing photodiodes 212.

In another aspect, sensing structure 210 can include a plurality of spaced apart light separating structure regions 213X formed in light separating structure 213. The plurality of spaced apart light separating structure regions 213X can define an array of light separating structure regions 213X. Respective ones of light separating structure regions 213X formed in sensing structure 210 can be associated to respective ones of sensing photodiodes 212 formed in semiconductor formation 211. The plurality of spaced apart light separating structure regions 213X can be defined by deep trench isolation (DTI) formations 218 extending vertically within sensing structure 210. A respective sensing photodiode 212 can generate a current signal in response to received electrons while light separating region 213 can provide a light separating function.

Respective ones of light separating structure regions 213X can be formed to be associated to and aligned with the respective sensing photodiodes 212 of the plurality of sensing photodiodes 212. Each respective semiconductor formation 214 can be disposed forwardly of a respective associated sensing photodiode 212 in the path of emission light 501 from detector surface 206 at a location of samples 502 toward sensing photodiodes 212. Referring to sensing photodiodes 212, sensing photodiodes 212 can be doped to serve as sensing photodiodes while light separating structure regions 213X can be configured for light separation. In one example, there is set forth herein a plurality of spaced apart light separating structure regions 213X formed in sensing structure 210, wherein respective ones of the plurality of spaced apart light separating structure regions 213X are associated to respective ones of the sensing photodiodes 212, and wherein the respective ones of the light separating structure regions 213X are disposed in a receive light path of the excitation light 101 and emission light 501 intermediate the detector surface 206 and the respective ones of the sensing photodiodes 212. Accordingly, in reference to FIG. 1A and the accompanying description, there is set forth herein, in one example, a device comprising: a detector surface; an array of sensing photodiodes formed in a semiconductor formation, wherein the semiconductor formation receives light from the detector surface; and a light separating structure intermediate the detector surface and a sensing photodiode of the array of sensing photodiodes; wherein the light separating structure is configured to preferentially transmit photons of emission light relative to photons of excitation light.

Figure 1B:
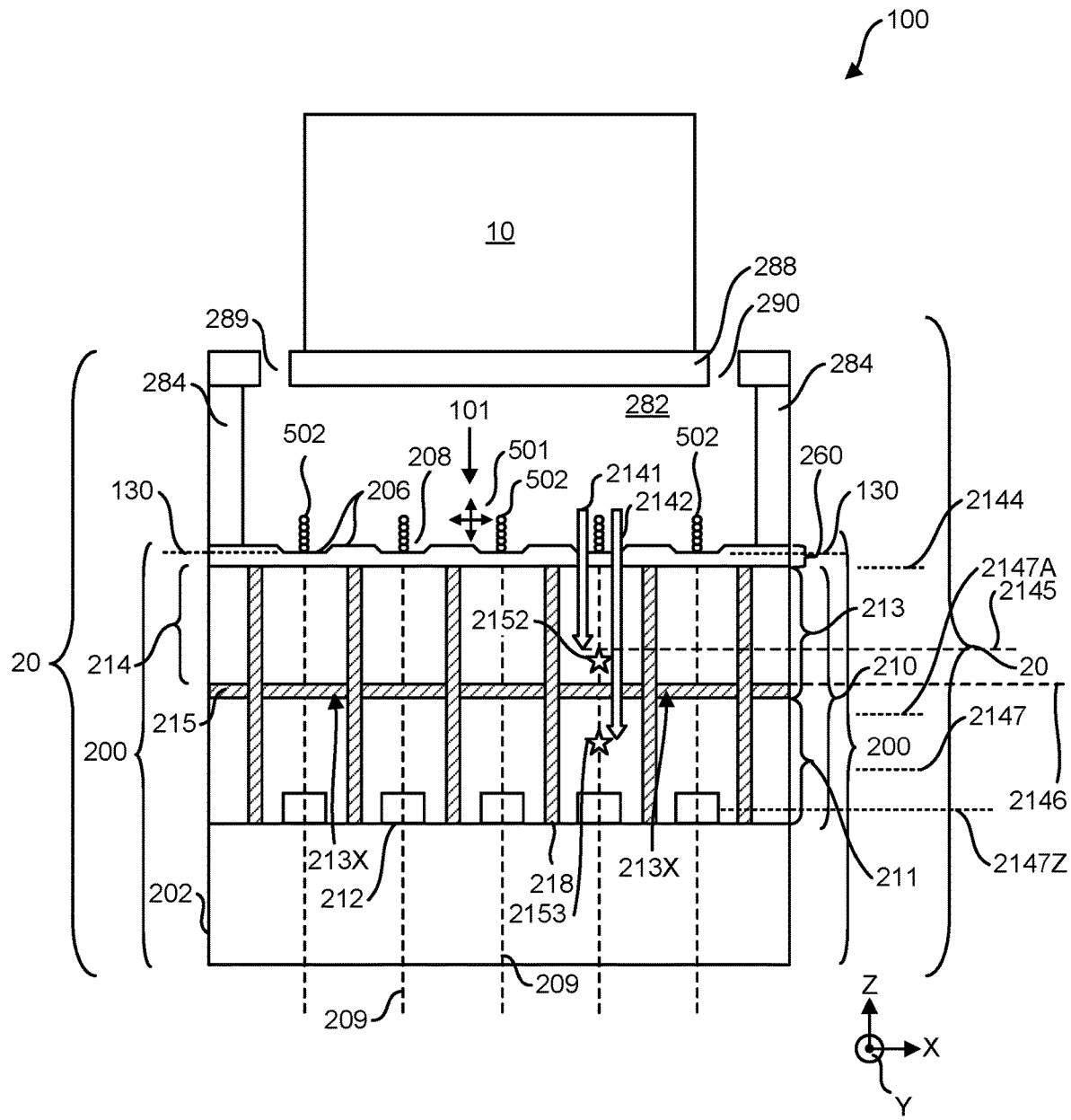
FIG. 1B is a schematic cutaway side view of a system for use in biological or chemical analysis having a detector that includes a detector surface for supporting a biological or chemical sample according to one example.
Figure 1C:
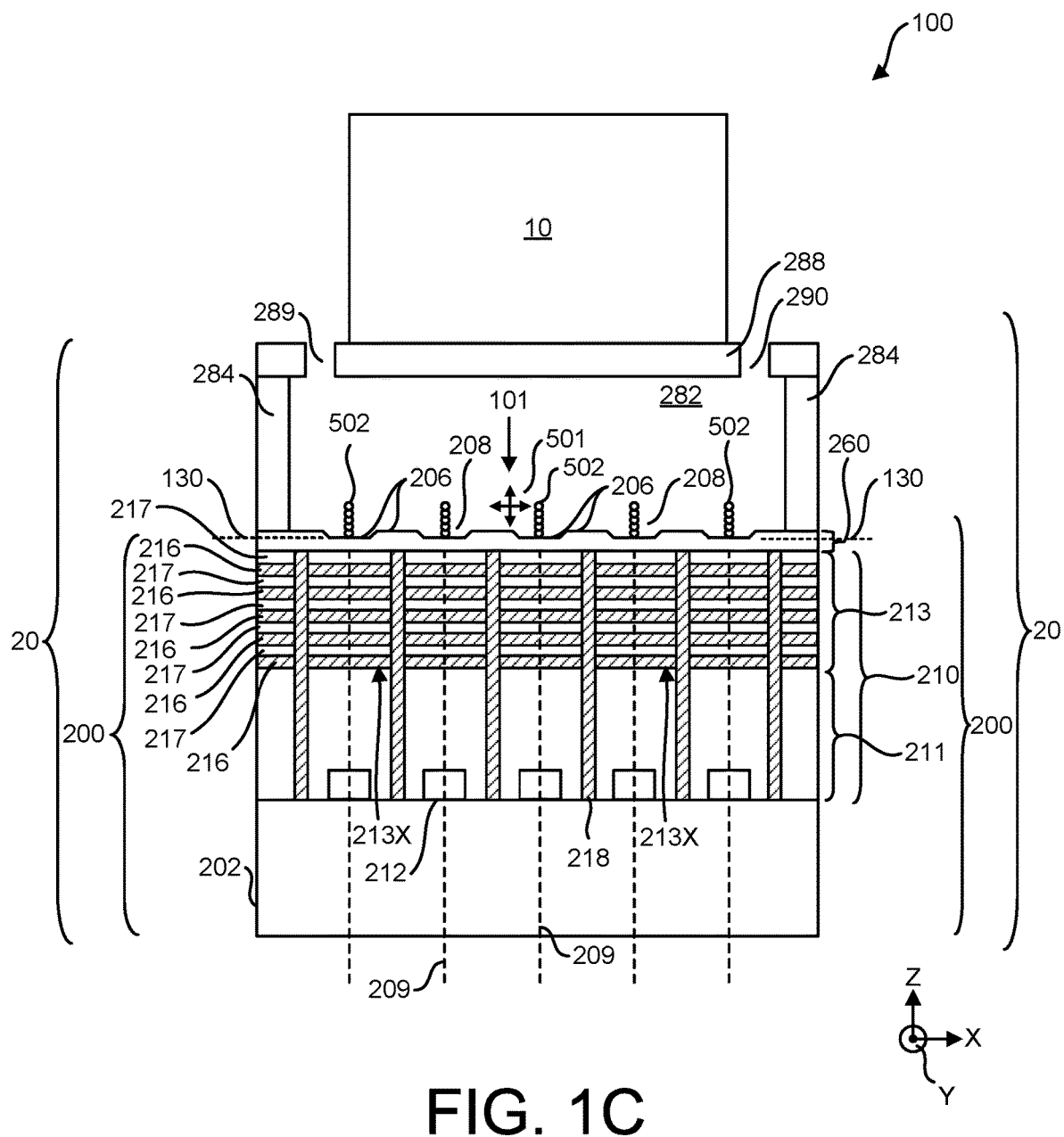
FIG. 1C is a schematic cutaway side view of a system for use in biological or chemical analysis having a detector that includes a detector surface for supporting a biological or chemical sample according to one example.

In the example of FIG. 1B, light separating structure regions 213X are provided by sections of semiconductor region 214, wherein the sections are defined and separated by deep trench isolation formations 218. In the example of FIG. 1C, light separating structure regions 213X are provided by sections of an interference reflector defined by alternating layers of first material 216 and second material 217, wherein the sections are separated by deep trench isolation formations 218. In one example according to FIG. 1C, the alternating layers of first material 216 and second material 217 can be provided by alternating layers of dielectric material as the first material, and semiconductor material as the second material. Accordingly, in reference to FIG. 1B and the accompanying description, there is set forth herein, in one example, a device comprising: a detector surface; an array of sensing photodiodes formed in a semiconductor formation, wherein the semiconductor formation receives light from the detector surface; a structure intermediate the detector surface and a sensing photodiode of the array of sensing photodiodes, wherein the structure comprises a second semiconductor formation that absorbs photons of light, and a dielectric barrier that blocks electrons generated from photon absorption in the second semiconductor formation from reaching a sensing photodiode of the array of sensing photodiodes. Accordingly, in reference to FIG. 1C and the accompanying description, there is set forth herein, in one example, a device comprising: a detector surface; an array of sensing photodiodes formed in a semiconductor formation, wherein the semiconductor formation receives light from the detector surface; and a structure intermediate the detector surface and a sensing photodiode of the array of sensing photodiodes, wherein the structure comprises alternating layers of a first material and a second material, the second material having a higher index of refraction than the first material, wherein the structure preferentially transmits photons of emission light relative to photons of excitation light.

In one example, there is set forth herein a sample supporting structure 260 defining a detector surface 206 configured for supporting biological or chemical samples 502; an array of sensing photodiodes 212 formed in a sensing structure 210, wherein the sensing structure 210 receives excitation light 101 and emission light 501 from the detector surface 206; a light separating structure region 213X formed in the sensing structure 210 in a receive light path of the excitation light 101 and emission light 501 intermediate the detector surface 206 and a sensing photodiode 212 of the array of sensing photodiodes 212; and wherein light separating structure regions 213X is configured to separate light.

In one example, sensing photodiodes 212 can be, e.g., n-doped regions in a p-substrate, or n-doped regions on a p-well on a n-doped substrate or any other diode combination. Semiconductor barrier depth for instances of sensing photodiode 212 can be in the range of from about 0.2 um to about 2 um according to one example. DTI feature size of DTI formations 218 can be from about 0.1 um to about 0.3 um in one example. The aspect ratio of DTI formations 218 can be from about 1:5 to 1:25 according to one example.

For alignment of respective ones of light separating structure regions 213X to respective ones of sensing photodiodes 212, associated light separating structure regions 213X and sensing photodiodes 212 can be arranged in one example to share a common vertically extending central axis 209, as shown in several of the views. In various shown examples, a vertically extending central axis 209 of an instance of sensing photodiode 212 can extend through light separating structure region 213X, and a vertically extending central axis 209 of an instance of light separating structure region 213X can extend through an instance of sensing photodiode 212.

Referring to FIG. 1A, light separating structure 213 and light separating structure regions 213X are shown in generical form. Light separating structure regions 213X can be configured to separate light by preferentially transmitting photons of emission light 501 relative to photons of excitation light 101. In another aspect, light separating structure regions 213X can be configured to separate light by preferentially restricting transmission of photons of excitation light 101 relative to photons of emission light 501.

Referring to FIG. 1B, light separating structure regions 213X can include dielectric barrier 215 disposed adjacently below semiconductor formation 214. Semiconductor formation 214 can be configured to preferentially transmit photons of emission light 501 relative to excitation light 101. Further, semiconductor formation 214 can be configured to preferentially absorb excitation light 101 relative to emission light 501. Electrons generated from photon absorption within semiconductor formation 214 can diffuse and travel in random directions, and/or drift within semiconductor formation 214 but can be blocked by dielectric barrier 215 from reaching sensing photodiode 212. Electrons generated from photon absorption within semiconductor formation 211 can diffuse to reach sensing photodiode 212. In one example, semiconductor formation 214 can have a thickness of from about 1 nm to about 50.0 um. Thus, electrons generated from photon absorption within semiconductor formation 214 can travel elevation distances of from about 1 nm to about 50.0 um prior to being blocked by dielectric barrier 215.

The described operation of light separating structure 213, in which electrons generated as a result of photon absorption diffuse within semiconductor formation 214 and are blocked from reaching sensing photodiodes 212 by dielectric barrier 215 can be differentiated from the operation of an alternative example in which an organic light filter can be used to filter out unwanted wavelengths. In the example of an organic light filter, photons that are absorbed within organic filter material can generate heat as a result of photon absorption rather than generate electrons that can diffuse and/or drift to travel within a formation until being blocked by a dielectric barrier 215 from reaching sensing photodiodes 212.

While operation of semiconductor formation 214 in combination with dielectric barrier 215 can be differentiated from the operation of the described organic light filter, examples herein do not exclude use of organic filter material. In some examples, an organic light filter structure that generates heat upon photon absorption rather than electrons that diffuse and/or drift to travel within a formation until being blocked by a dielectric barrier 215 from reaching sensing photodiodes 212, can be disposed in a light path of excitation light 101 and emission light 501, e.g., above or below light separating structure 213 as shown in FIGS. 1A-1C.

Examples herein can facilitate the elimination of organic light filters or the use of organic lights filters having reduced thickness, which by their reduced thickness remove or reduce fabrication challenges. The functioning of organic filters for performance of wavelength selection can be distinguished from the functioning of semiconductor formation 214 in combination with dielectric barrier 215 for performance of wavelength selection. In one example, the functioning of organic filters for performance of wavelength selection can be based on heat being generated as a result of photon absorption (which photon absorption has characteristics that vary in dependence on wavelength), whereas the functioning of semiconductor formation 214 in combination with dielectric barrier 215 for performance of wavelength selection can be based on electrons being generated as a result of photon absorption (which photon absorption has characteristics that vary in dependence on wavelength), wherein generated electrons can be blocked from reaching sensing photodiodes 212 by dielectric barrier 215.

Referring to FIG. 1C, light separating structure regions 213X can include alternating layers of first material 216 and second material 217, wherein the alternating layers define an interference reflector. The described interference reflector comprising alternating layers of first material 216 and second material 217 can be configured to preferentially transmit photons of emission light 501 relative to photons of excitation light 101. Further, the described interference reflector comprising alternating layers of first material 216 and second material 217 can be configured to preferentially reflect excitation light 101 relative to emission light 501.

Figure 1D:
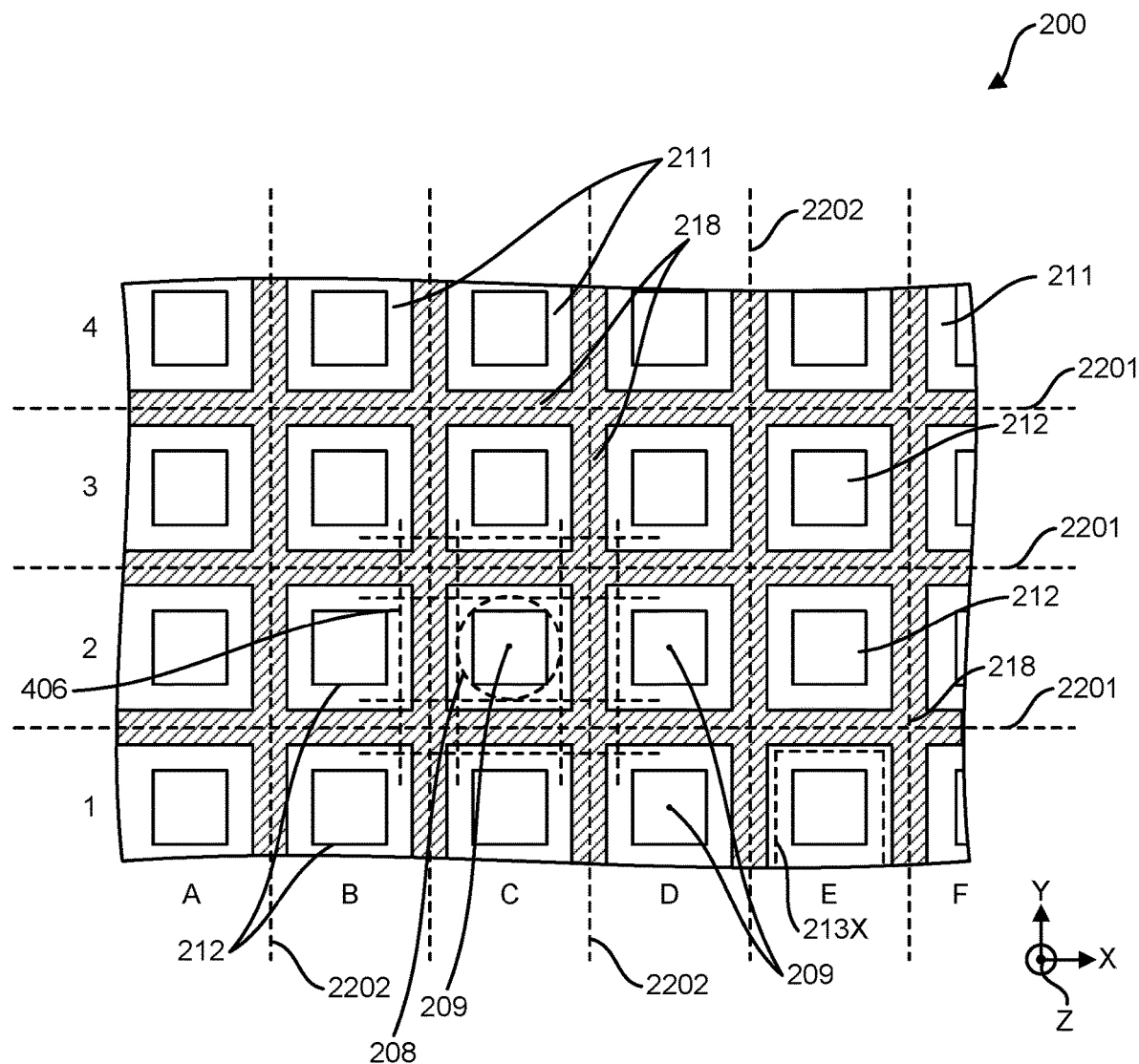
FIG. 1D is a schematic cutaway top view of a system for use in biological or chemical analysis having a detector that includes an array of sensing photodiodes according to one example.

FIG. 1D depicts a cross sectional top view (looking in a direction parallel to the reference Z axis) of the system of FIGS. 1A-1C taken along the elevation of sensing photodiodes 212. Sensing photodiodes 212 can define, in one example, a two-dimensional array of sensing photodiodes 212 extending in directions parallel to both the reference X axis and reference Y axis. In one example, the two-dimensional array of sensing photodiodes 212 can comprise a 10+×10+ array of sensing photodiodes 212. In one example, the two-dimensional array of sensing photodiodes 212 can comprise a 100+×100+ array of sensing photodiodes 212. In one example, the two-dimensional array of sensing photodiodes 212 can comprise a 1000+×1000+ array of sensing photodiodes 212. In one example, the two-dimensional array of sensing photodiodes 212 can comprise a 10000+×10000+ array of sensing photodiodes 212.

In one example, semiconductor formation 211 can be of unitary, i.e., single piece construction. In one example, semiconductor formation 214 can be of unitary, i.e., single piece construction.

In various examples herein, light separating structure 213 can include inorganic semiconductor material. Examples herein recognize that the use of inorganic semiconductor material for light separation offers several advantages. First, inorganic semiconductor material can more strongly absorb excitation light than does alternative material such as organic filter material, as described herein. As such, the light separating structure 213 can be shortened relative to a design relying on an organic light filter, which can directly reduce fabrication costs and also further reduce the need for crosstalk-reduction structures, thus indirectly reducing costs.

Examples herein recognize that because inorganic semiconductor material features a higher refractive index (for energies below the band gap) than an organic filter material, light pipes defined by inorganic semiconductor material employed for light separation can provide more tightly confined light relative to a light pipe defined by an organic filter. In comparison to the existing sensor designs which use metallic curtains to assist confining light around the light pipe, examples herein need not utilize such curtains. Example herein recognize that avoiding use of curtains would greatly simplify the fabrication process and reduce costs.

In another aspect, inorganic semiconductor material can be deposited via alternative techniques which are more uniform and less expensive than techniques used to deposit organic filter material. In another aspect, after deposition, inorganic semiconductor material relative to organic filter material can be more robust against high temperatures and strong solvents, and more mechanically sturdy. Greater robustness has several benefits. For example, the sensor consumable can be less likely to break or otherwise fail during manufacturing or customer use. In addition, because some microfabrication processes may involve harsh conditions, examples herein enable the use of a greater variety of processes and design concepts.

In one example, set forth with reference to FIG. 1C and its variations, semiconductors can be integrated into multilayer stack defining an interference reflector which have emergent properties not present in single layers. In one example, an interference reflector can increase performance without increasing material use or cost.

In another aspect, the properties of inorganic semiconductor material can be tuned continuously. In contrast to organic filter material where a specific molecule whose light-absorbing properties can be modulated only slightly by changing co-solvent or metal coordination, optical properties of inorganic semiconductors can emerge from collective effects of all the atoms in the material and adjusting of the atomic proportions can in many cases smoothly vary the optical properties.

Examples herein can comprise use of polycrystalline, amorphous, and/or alloyed inorganic semiconductors for performance of light separation, as set forth in reference to examples according to FIGS. 1B and 1C. Use of such inorganic semiconductors can facilitate the development of low-crosstalk fluorescence sensors for sequencing and for many other applications outside of sequencing. A photogenerated electron in the region before dielectric barrier 215, e.g., provided by an oxide region (e.g., oxide layer) can be blocked by the dielectric barrier 215, e.g., oxide layer and is resisted or even prevented from reach a sensing photodiode of the sensing photodiodes 212.

In one example, semiconductor formation 214 as set forth with reference to examples according to FIG. 1B can comprise, e.g., silicon (Si), amorphous silicon (a-Si), germanium (Ge), or cadmium sulfide (CdS), etc. In one example, as set forth with reference to examples according to FIG. 1B semiconductor formation 214 can consist of, e.g., silicon (Si), amorphous silicon (a-Si), germanium (Ge), or cadmium sulfide (CdS), etc.

In one example, first material 216 and/or second material 217 as set forth with reference to examples according to FIG. 1C can be selected from the group consisting of, e.g., silicon (Si), amorphous silicon (a-Si), germanium (Ge), or cadmium sulfide (CdS), etc.

Figure 3:
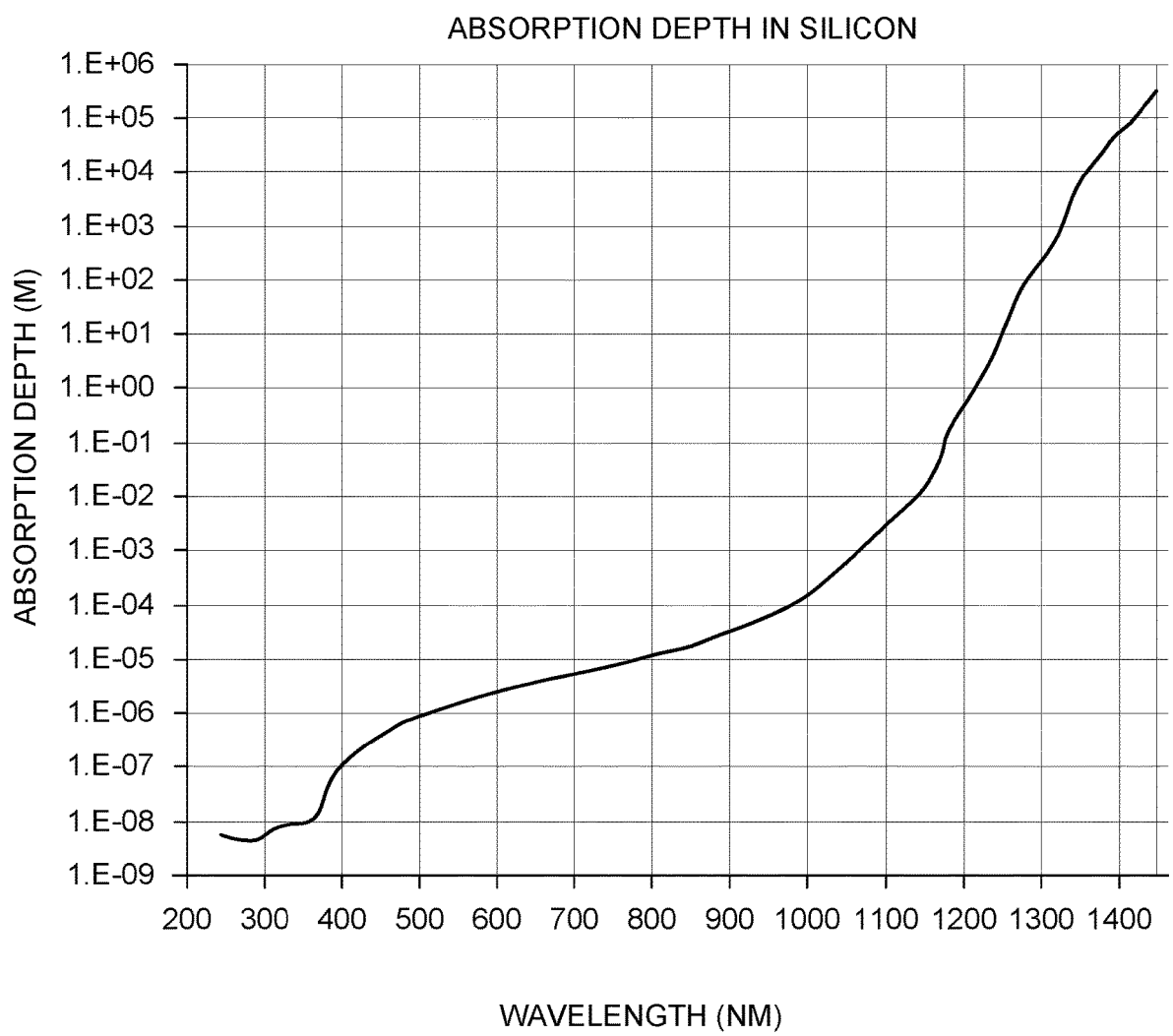
FIG. 3 depicts an absorption depth of light in silicon according to one example.

FIG. 3 depicts absorption depth of light through silicon at various wavelengths. Absorption depth refers to the inverse of the absorption coefficient, α. Absorption depth defines the distance from the surface into the material at which the light falls to 1/e (about 37%) of the original intensity. Examples herein recognize that the power of a wave in a certain medium is directly proportional to the square of the field quantity. Absorption depth herein further refers to the depth at which the wave power has dropped to $1/e^2$ (about 1.3%) of the surface value. Examples herein recognize that the absorption depth of light of light though any semiconductor material will increase with increasing wavelength, and that the steepness of an absorption depth curve, an example of which is shown in FIG. 3, will change depending on the semiconductor material. Some semiconductor materials can feature steeper curves, and some semiconductor materials can feature shallower curves. Examples herein recognize that a given semiconductor material absorbs more light at shorter wavelengths and, accordingly, that the absorption depth of a given semiconductor material is relatively shorter for shorter wavelengths and relatively longer for longer wavelengths. As the wavelength of light is increased, the absorption depth of light in a given semiconductor material is increased.

Examples herein according to FIG. 1B can use absorption properties of light at different wavelengths to provide wavelength separation and selection.

Examples herein according to FIG. 1B can employ semiconductor formation 214 to provide wavelength separation and selection so that electrons generated within sensing structure 210 attributable to photon absorption of longer wavelengths of emission light 501 received within sensing structure 210 are preferentially received by sensing photodiodes 212 relative to electrons generated within sensing structure 210 attributable to photon absorption of shorter wavelengths of excitation light 101.

Examples herein according to FIG. 1B can facilitate generation of electron-hole pairs in semiconductor formation 214, and subsequent electron diffusion and/or drift and travel within semiconductor formation 214. Diffused electrons and electrons in drift can travel within semiconductor formation 214 but can be blocked by dielectric barrier 215 from reaching sensing photodiodes 212.

Examples herein recognize that in the absence of light separating structure 213 (which can include regions 213X) a majority of photons from both excitation light 101 and emission light 501 can be absorbed in an undoped area within semiconductor formation 211 of sensing structure 210 to generate electrons whereupon the electrons can diffuse within sensing structure 210 in random directions until the electrons reach sensing photodiode 212 configured as a sensing photodiode. Examples herein from Eq. 1 recognize that receipt of a substantial percentage of electrons by sensing photodiode 212 generated from photon absorption of excitation light 101 can negatively impact a signal to noise ratio and the detection of emission light 501.

Examples herein according to FIG. 1B can include the combination of semiconductor formation 214 and dielectric barrier 215 configured to separate light so that electrons generated from photon absorption within semiconductor formation 214 do not reach sensing photodiodes 212. Instead, electrons generated from photon absorption within semiconductor formation 214 can be blocked from reaching sensing photodiodes by dielectric barrier 215.

In one aspect as set forth herein, a depth dimension of semiconductor formation 214 defining a depth dimension of dielectric barrier 215 can be configured so that a depth dimension of semiconductor formation 214 defining the elevation 2146 of dielectric barrier 215 is selected in dependence on a targeted wavelength targeted for separation. In one example, by selecting a depth dimension of semiconductor formation 214 to be longer than an absorption depth of a wavelength targeted for separation, electron generation attributable to photon absorption for the wavelength can be substantially and predominantly confined to semiconductor formation 214, wherein generated electrons can be blocked by dielectric barrier 215 from reaching the described array of sensing photodiodes 212. The dimensions of semiconductor formation 214 and dielectric barrier 215 can be controlled with use of semiconductor deposition and planarizing fabrication methods.

In one example, semiconductor formation 214 herein can be configured to provide wavelength selection so that electrons attributable to photon absorption of emission light 501 in sensing structure 210 are preferentially received by sensing photodiode 212 relative to electrons attributable to photon absorption of excitation light 101 in sensing structure 210. In one example, semiconductor formation 214 herein can be configured to provide wavelength selection so that a percentage of photons of emission light 501 that absorb in sensing structure 210 below a barrier depth of dielectric barrier 215 to generate electrons that travel, e.g., diffuse, to reach sensing photodiode 212 is sufficient to facilitate the detection of emission light 501 received from detector surface 206 in the presence of illumination defining excitation light 101. In one example, semiconductor formation 214 herein can be configured to provide wavelength selection so that a percentage of photons of emission light 501 that absorb in sensing structure 210 below a barrier depth of dielectric barrier 215 to generate electrons that travel, e.g., diffuse, to reach sensing photodiode 212 relative to percentage of photons of excitation light 101 that absorb in sensing structure 210 below a barrier depth of dielectric barrier 215 to generate electrons that travel, e.g., diffuse, to reach sensing photodiode 212 is sufficient to facilitate the detection of emission light 501 received from detector surface 206 in the presence of illumination defining excitation light 101. In one example, semiconductor formation 214 herein can be configured to provide wavelength selection so that a percentage of electrons attributable to photon absorption of emission light 501 within sensing structure 210 that are generated below a barrier depth of dielectric barrier 215 to travel, e.g., diffuse, to reach sensing photodiode 212 is sufficient to facilitate the detection of emission light 501 received from detector surface 206 in the presence of illumination defining excitation light 101. In one example, semiconductor formation 214 herein can be configured to provide wavelength selection so that a percentage of electrons attributable to photon absorption of emission light 501 within sensing structure 210 that are generated below a barrier depth of dielectric barrier 215 to travel, e.g., diffuse, to reach sensing photodiode 212, relative to a percentage of electrons attributable to photon absorption of excitation light 101 within sensing structure 210 that are generated below a barrier depth of dielectric barrier 215 to travel, e.g., diffuse to reach sensing photodiode 212, is sufficient to facilitate the detection of emission light 501 received from detector surface 206 in the presence of illumination defining excitation light 101.

In one example, semiconductor formation 214 can be configured to provide wavelength separation of excitation light 101 so that a percentage of photons of excitation light 101 absorbed in sensing structure 210 that are absorbed within semiconductor formation 214 to restrict resulting generated electrons from diffusing to reach sensing photodiode 212 is sufficient to facilitate detection of emission light 501 received from detector surface 206 in the presence of illumination defining excitation light 101.

In one example, semiconductor formation 214 can be configured to have a barrier depth defined by an elevation 2146 of dielectric barrier 215 greater than an absorption depth of a center wavelength of excitation light 101 or another targeted wavelength of light targeted for separation. By configuring semiconductor formation 214 so that dielectric barrier 215 features a depth greater than an absorption depth of a center wavelength of excitation light 101, a majority of photons at a center wavelength of excitation light 101 can be expected to be absorbed within semiconductor formation 214 to produce photon generated electrons that travel, e.g., diffuse in random directions, within semiconductor formation 214, and are blocked by dielectric barrier 215 from reaching sensing photodiode 212.

By configuring semiconductor formation 214 so that dielectric barrier 215 features a depth at elevation 2146 greater than an absorption depth of center wavelength of excitation light 101, the percentage of photons at the center wavelength of excitation light 101 that are absorbed below a depth of dielectric barrier 215 at elevation 2146 can be limited, so that only a limited percentage of photons at a center wavelength of excitation light 101 are absorbed to generate electrons below elevation 2146 of dielectric barrier 215, which electrons can travel, e.g., diffuse in random directions, to be received by sensing photodiode 212 to contribute to a current signal by sensing photodiode 212. Limiting the percentage of photons absorbed below elevation 2146 at a given wavelength can limit the percentage of electrons generated as a result of photon absorption at the given wavelength. Limiting the percentage of electrons generated as a result of absorption of photons at a center wavelength of excitation light 101 that reach sensing photodiode 212 can facilitate detection of emission light 501.

While semiconductor formation 214 can include a barrier depth of dielectric barrier 215 at elevation 2146 so that only a limited percentage of photons at a center wavelength of excitation light 101 are absorbed to generate electrons below elevation 2146 of dielectric barrier 215, the depth of dielectric barrier 215 at elevation 2146 can be configured so that a substantial percentage of photons at a center wavelength of emission light 501 can be absorbed below an elevation depth of dielectric barrier 215 at elevation 2146 to generate electrons below elevation 2146 of dielectric barrier 215, which electrons can travel, e.g., diffuse in random directions, to be received by sensing photodiode 212 to contribute to a current signal generated in response to received electrons by sensing photodiode 212.

In one example, the barrier depth of dielectric barrier 215 at elevation 2146 can be configured so that a percentage of photons at a center wavelength of emission light 501 absorbed below elevation 2146 to generate electrons diffusing to reach sensing photodiode 212, is greater than a percentage of photons at a center wavelength of excitation light 101 absorbed below elevation 2146 to generate electrons diffusing to reach sensing photodiode 212. In one example, the barrier depth of dielectric barrier 215 at elevation 2146 can be configured so that a percentage of photons at a center wavelength of emission light 501 absorbed below elevation 2146 to generate electrons diffusing to reach sensing photodiode 212, is about 2× or more greater than a percentage of photons at a center wavelength of excitation light 101 absorbed below elevation 2146 to generate electrons diffusing to reach sensing photodiode 212. In one example, the barrier depth of dielectric barrier 215 at elevation 2146 can be configured so that a percentage of photons at a center wavelength of emission light 501 absorbed below elevation 2146 to generate electrons diffusing to reach sensing photodiode 212, is about 10× or more greater than a percentage of photons at a center wavelength of excitation light 101 absorbed below elevation 2146 to generate electrons diffusing to reach sensing photodiode 212. In one example, the barrier depth of dielectric barrier 215 at elevation 2146 can be configured so that a percentage of photons at a center wavelength of emission light 501 absorbed below elevation 2146 to generate electrons diffusing to reach sensing photodiode 212, is about 20× or more greater than a percentage of photons at a center wavelength of excitation light 101 absorbed below elevation 2146 to generate electrons diffusing to reach sensing photodiode 212. In one example, the barrier depth of dielectric barrier 215 at elevation 2146 can be configured so that a percentage of photons at a center wavelength of emission light 501 absorbed below elevation 2146 to generate electrons diffusing to reach sensing photodiode 212, is about 50× or more greater than a percentage of photons at a center wavelength of excitation light 101 absorbed below elevation 2146 to generate electrons diffusing to reach sensing photodiode 212.

In one example, the barrier depth of dielectric barrier 215 at elevation 2146 can be configured to be below an absorption depth of a center wavelength of excitation light 101 and above an absorption depth of a center wavelength of excitation light 101. By configuring semiconductor formation 214 so that the barrier depth of dielectric barrier 215 at elevation 2146 is below an absorption depth of a center wavelength of excitation light 101 and above an absorption depth of a center wavelength of excitation light, absorption of photons at a center wavelength of excitation light 101 below elevation 2146 can be limited, and absorption of photons at a center wavelength of emission light 501 below elevation 2146 can be substantially facilitated, so that sensing photodiode 212 receives by diffusion a substantial percentage of electrons generated within sensing structure 210 due to absorption of photons at a center wavelength of emission light 501 within semiconductor formation 211 of sensing structure 210.

The percentage of electrons generated due to absorption of photons at a center wavelength of emission light 501 that travel, e.g., diffuse, to be received by sensing photodiode 212 can be sufficient to facilitate detection of emission light 501, particularly where the percentage of electrons generated due to absorption of photons at a center wavelength of excitation light 101 that travel, e.g., diffuse to be received by sensing photodiode 212 is limited by the described wavelength separating and selecting functionality of semiconductor formation 214.

In one example, the thickness of semiconductor formation 214 defining a depth of dielectric barrier 215 at elevation 2146 can be configured to be at a depth of about 1× or more than the absorption depth of a center wavelength of excitation light 101. In one example, the thickness of semiconductor formation 214 defining a depth of dielectric barrier 215 at elevation 2146 can be configured to be at a depth of about 2× or more the absorption depth of a center wavelength of excitation light 101. In one example, the thickness of semiconductor formation 214 defining a depth of dielectric barrier 215 at elevation 2146 can be configured to be at a depth of about 1× or more the absorption depth of a center wavelength of excitation light 101. In one example, the thickness of semiconductor formation 214 defining a depth of dielectric barrier 215 at elevation 2146 can be configured to be at a depth of about 5× or more the absorption depth of a center wavelength of excitation light 101. In one example, the thickness of semiconductor formation 214 defining a depth of dielectric barrier 215 at elevation 2146 can be configured to be at a depth of about 7× or more the absorption depth of a center wavelength of excitation light 101. In any of the described examples, elevation 2146 can be configured to be at a depth of less than an absorption depth of a center wavelength of emission light 501.

The thickness of semiconductor formation 214 defining a depth of dielectric barrier 215 at elevation 2146 can be configured differently for different wavelengths of excitation light 101 and emission light 501. For example, if excitation light 101 includes a shorter wavelength (e.g., includes blue light rather than green light), a thickness of semiconductor formation 214 can be configured to be shorter so that photon absorption and therefore photon absorption electron generation for the shorter wavelength light continues to be substantially and predominantly contained with semiconductor formation 214 while the area for absorption and electron generation attributable to longer wavelength light is lengthened for improved signal to noise ratio. If emission light 501 includes longer wavelengths (e.g., wavelengths at the long wavelength boundary of red), the thickness of semiconductor formation 214 to the depth of dielectric barrier 215 at elevation 2146 can be lengthened to increase separation of excitation light 101, while still facilitating substantial photon absorption of emission light 501 within semiconductor formation 211 below an elevation 2146 of dielectric barrier 215 sufficient for detection of emission light 501.

In one example, the thickness of semiconductor formation 214 defining a depth of dielectric barrier 215 can be configured so that (a) absorption of excitation light 101 can be substantially and predominantly confined to semiconductor formation 214, (b) so that absorption of excitation light 101 at elevations of sensing structure 210 below a depth of dielectric barrier 215 at elevation 2146 is limited, and (c) so that substantial absorption of emission light 501 occurs both above and below depth of dielectric barrier 215 at elevation 2146. In one example, the depth of dielectric barrier 215 at elevation 2146 can be configured so that a percentage of photons at a center wavelength of excitation light 101 absorbed within semiconductor formation 211 below the elevation 2146 of dielectric barrier 215 is about 13 percent or less. In one example, the depth of dielectric barrier 215 at elevation 2146 can be configured so that a percentage of photons at a center wavelength of excitation light 101 absorbed within semiconductor formation 211 below the elevation 2146 of dielectric barrier 215 is about 10 percent or less. In one example, the depth of dielectric barrier 215 at elevation 2146 can be configured so that a percentage of photons at a center wavelength of excitation light 101 absorbed within semiconductor formation 211 below the elevation 2146 of dielectric barrier 215 is about 5 percent or less. In one example, the depth of dielectric barrier 215 at elevation 2146 can be configured so that a percentage of photons at a center wavelength of excitation light 101 absorbed within semiconductor formation 211 below the elevation 2146 of dielectric barrier 215 is about 1 percent or less. In one example, the depth of dielectric barrier 215 at elevation 2146 defined by the thickness of semiconductor formation 214 can be configured so that a percentage of photons at a center wavelength of excitation light 101 absorbed within semiconductor formation 211 below the elevation 2146 of dielectric barrier 215 is about 0.1 percent or less. In one example, the depth of dielectric barrier 215 at elevation 2146 defined by the thickness of semiconductor formation 214 can be configured so that a percentage of photons at a center wavelength of emission light 501 absorbed below the elevation 2146 of dielectric barrier 215 is about 13 percent or more. In one example, the depth of dielectric barrier 215 at elevation 2146 defined by the thickness of semiconductor formation 214 can be configured so that a percentage of photons at a center wavelength of emission light 501 absorbed below the elevation 2146 of dielectric barrier 215 is about 20 percent or more. In one example, the depth of dielectric barrier 215 at elevation 2146 defined by the thickness of semiconductor formation 214 can be configured so that a percentage of photons at a center wavelength of emission light 501 absorbed below the elevation 2146 of dielectric barrier 215 is about 40 percent or more.

Referring again to FIG. 2, excitation light 101 can feature the spectral profile 1101 as indicated in FIG. 2 which is a green light spectral profile and emission light 501 can feature the spectral profile 1501 as indicated in FIG. 2 which is a red light spectral profile. Referring to FIG. 1B, the behavior of green light photon generated electrons is contrasted with that of red light photon generated electrons. FIG. 1B depicts the scenario where both excitation light 101 and emission light 501 are received from detector surface 206 and directed toward semiconductor formation 214 and semiconductor formation 211 of sensing structure 210. In the described example set forth in FIG. 2, excitation light 101 can include green light (between about 500 nm and about 565 nm), and emission light 501 can include red light (between about 620 nm to about 750 nm).

The behavior of green light 2141 within sensing structure 210 is described with reference to FIG. 1B. In an illustrative example, green light 2141 in the green wavelength band can exhibit an absorption depth within sensing structure 210 to a range of elevations about elevation 2145 so that a majority of green light received by sensing structure 210 is absorbed in semiconductor formation 214 between the elevation 2144 and elevation 2146 which elevation 2146 is the semiconductor barrier depth elevation of dielectric barrier 215. Green light in the described scenario can be substantially and predominantly absorbed within semiconductor formation 214.

Electron 2152 depicts an electron generated by photon absorption within semiconductor formation 214. Electron 2152 generated by photon absorption within semiconductor formation 214, can be expected to travel, e.g., diffuse in random directions, within semiconductor formation 214, but be blocked by dielectric barrier 215 from reaching sensing photodiode 212. Because a majority of green light photons (between about 500 nm and about 565 nm), can be expected to be absorbed at an absorption depth within an elevation depth of semiconductor formation 214, a majority of electrons generated as a result of green light photon absorption can be expected to exhibit the behavior of electron 2152; namely, can be expected to travel, e.g. diffuse in random directions, within semiconductor formation 214 and be blocked from reaching sensing photodiodes 212 by dielectric barrier 215.

The behavior of red light 2142 (between about 620 nm to about 750 nm) within sensing structure 210 is described with reference to FIG. 1B. In an illustrative example, red light 2142 in the red wavelength band can exhibit an absorption depth (depth where intensity is about $1/e$ initial intensity and wave power is about $1/e^2$ initial wave power) within sensing structure 210 to a range of elevations about elevation 2147 so that a substantial percentage of red light photons received by sensing structure 210, are absorbed within sensing structure 210 at elevations below an elevation 2146 of dielectric barrier 215 of semiconductor formation 214.

Electron 2153 depicts an electron generated by photon absorption in semiconductor formation 211 of sensing structure 210 within semiconductor formation 211 below elevation 2146 of sensing structure 210 defined by dielectric barrier 215. Electron 2153 generated by photon absorption within semiconductor formation 211 of sensing structure 210 below elevation 2146 of dielectric barrier 215, can be expected to travel, e.g., diffuse randomly, and eventually will be received at sensing photodiode 212.

Red light (between about 620 nm to about 750 nm), according to one configuration for sensing structure 210 can be expected to be absorbed in substantial percentages at elevation depths of sensing structure 210 i.e., between the elevations of 2144-2147. Red light photons can be expected be absorbed in substantial percentages at elevation depths of sensing structure 210 both within the elevation range of semiconductor formation 214 and below an elevation range of semiconductor formation 214.

Because red light can be expected to be substantially absorbed at all depths within the elevations 2144 and 2147 in the described scenario, a first substantial percentage of electrons generated as a result of red light photon absorption occurring within semiconductor formation 214 can be expected to exhibit the behavior of electron 2152, and a second substantial percentage of electrons generated as a result of red light photon absorption occurring within an undoped region of semiconductor formation below a bottom elevation 2146 of semiconductor formation 214 defined by dielectric barrier 215 can be expected to exhibit the behavior of electron 2153.

Electron 2153 generated by photon absorption in an undoped region of sensing structure 210 below a bottom elevation of semiconductor formation 214 defined by dielectric barrier 215 at elevation 2146 can be expected to travel, e.g., diffuse randomly, and eventually can be expected to be received at sensing photodiode 212 in order to contribute to a current sensed by sensing photodiode 212.

Elevation 2147 in the described example is an elevation above but proximate a top elevation of sensing photodiodes 212, that is below the elevation 2146 of dielectric barrier 215, but which is closer to a top elevation of sensing photodiodes 212 than elevation 2146. In the described example, sensing structure 210 can be configured to that an absorption depth of red light is defined about elevation 2147, proximate but above a top elevation of sensing photodiodes 212. It will be understood that sensing structure 210 can alternatively be configured to have different elevations for the absorption depth of red light within sensing structure 210 relative to structures therein depending on application, e.g., elevations between elevation 2147A below but proximate elevation of dielectric barrier 215, and elevation 2147Z intersecting sensing photodiodes 212. Examples herein recognize that identifying optimized configurations for different applications can be aided with use of optical system simulation software, such as the optical system simulation software OPTICSTUDIO® available from Zemax LLC. In examples herein, elevation 2146 of dielectric barrier 215 can be defined by a top elevation of dielectric barrier 215 as depicted throughout the views.

Due to dielectric barrier 215, according to one example, electrons generated as a result of photon absorption within semiconductor formation 214 can be expected to travel, e.g., diffuse in random directions, within semiconductor formation 214. Because a majority of green light photons (between about 500 nm and about 565 nm), can be expected to be absorbed at an absorption depth within an elevation depth of semiconductor formation 214, the majority of electrons generated as a result of green light photon absorption can be expected to exhibit the behavior of electron 2152; namely, can be expected to travel, e.g., be diffused in random directions, within semiconductor formation 214 and be blocked from reaching sensing photodiodes by dielectric barrier 215.

Examples herein recognize that an absorption depth of light in a semiconductor material is shorter for short wavelengths and longer for longer wavelengths. As the wavelength is increased the absorption depth of the light is increased. Since the emission light 501 from fluorophores has longer wavelengths than the excitation wavelengths of excitation light 101, the absorption depth of emission light 501 is deeper than the absorption depth of the shorter wavelength of excitation light 101.

For wavelength separation herein, a thickness of semiconductor formation 214 can be controlled using semiconductor fabrication processes. The thickness of semiconductor formation 214 can be engineered differently for different wavelengths of excitation light 101 and emission light 501. The generated electrons generated within semiconductor formation 214 due to photon absorption can be blocked from reaching sensing photodiode 212 by dielectric barrier 215.

While FIG. 1B depicts the example of excitation light 101 being provided by green light, and emission light 501 being provided by red light, examples herein recognize that the depth of dielectric barrier 215 can be configured to optimize wavelength separation of excitation light 101 for different combinations of excitation light 101 and emission light 501. In one example, a depth of dielectric barrier 215 can be optimized for wavelength separation of excitation light 101 where excitation light 101 is provided by blue light, and emission light 501 is provided by red light. In one example, a depth of dielectric barrier 215 can be optimized for wavelength separation of excitation light 101 where excitation light 101 is provided by blue light, and emission light 501 is provided by green light.

Figure 4:
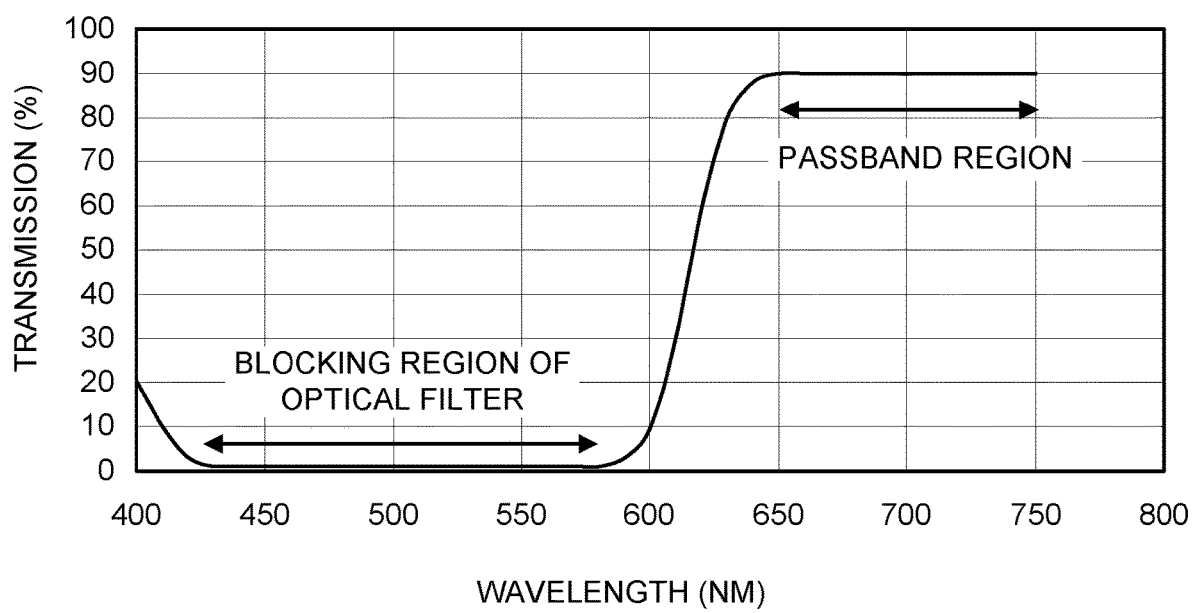
FIG. 4 is a spectral profile diagram illustrating operating of an interference reflector according to one example.

Referring again to the example of FIG. 1C employing an interference reflector defined by alternating layers of first material and second material, FIG. 4 illustrates a spectral profile of a representative interference reflector. The multilayered interference reflector can have first and second alternating layers of relatively higher refractive index and relatively lower refractive index material. The defined interference reflector can reflect wavelengths defining excitation light 101 and pass longer wavelengths defining emission light 501. The defined interference reflector can have a spectral profile as shown in FIG. 4. According to the spectral profile of FIG. 4, the described interference reflector can have a transmission passband region of from about 650 nm to about 750 nm or about 800 nm. In this region most of the light will pass the interference reflector. Emission light 501 from the fluorophores can have a majority of its signal in the passband region of from about 650 nm to about 750 nm or about 800 nm. The interference reflector in the example of FIG. 4 can have a transmission blocking region in the range of from about 440 nm to about 560 nm. The defined interference reflector can reflect most light in the transmission restricting region.

The example of FIG. 1C featuring an interference reflector, as shown by the transmission profile of FIG. 4, can feature essentially total reflection of wavelengths targeted for restriction of transmission, and essentially total transmission of wavelengths targeted for transmission. Accordingly, detector 200 is easily tunable to achieve targeted signal to noise ratios.

The spectral profile of an interference reflector as shown in FIG. 1C can be tuned by material selection and control of fabrication parameters for fabricating the interference reflector. The alternating pattern of layers of first material 216 with a first index of refraction, and layers of second material 217 with a second index of refraction can define an interference reflector having transmission profile characteristics as shown in FIG. 4. In one example, the defined interference reflector can include any first and second materials with one higher refractive index and one lower refractive index. The first and second materials, according to one example, can be transparent (extinction coefficient, k, close to zero in the passband region of the defined interference reflector). Material combinations defining the first material and the second material, can include, e.g.: aSi/SiN, aSi/SiO2, TiO2/SiO2, TiO2/SiN, TaOx/SiO2, TaOx/SiN, In one example, one of the first or second material can include ZnSe (with possible doping materials like Te and Cd). In one example, one of the first or second material can include CdS. In one example, the first material can be selected from the group consisting of: aSi, SiN, SiO2, TiO2, TaOx, ZnSe, CdS. The second material can have an index of refraction different from the first material and can be selected from the group consisting of aSi, SiN, SiO2, TiO2, TaOx, ZnSe, CdS.

In one example, one of the first or second material can comprise or be formed of a dielectric material and the other of the first or second material can comprise or be formed of semiconductor material. In some examples, use of a semiconductor material as one or more of the first or second material can reduce a thickness requirement of the defined interference reflector. For example, use of a semiconductor material having a higher refractive indexes than a non-semiconductor material can increase an index of refraction difference between the described first material and the second material, to reduce a thickness requirement of the defined interference reflector. In another aspect use of a semiconductor material can increase photon absorption by the defined interference reflector in the transmission blocking region (FIG. 4), to further reduce a thickness requirement of the defined interference reflector.

Figure 5A:
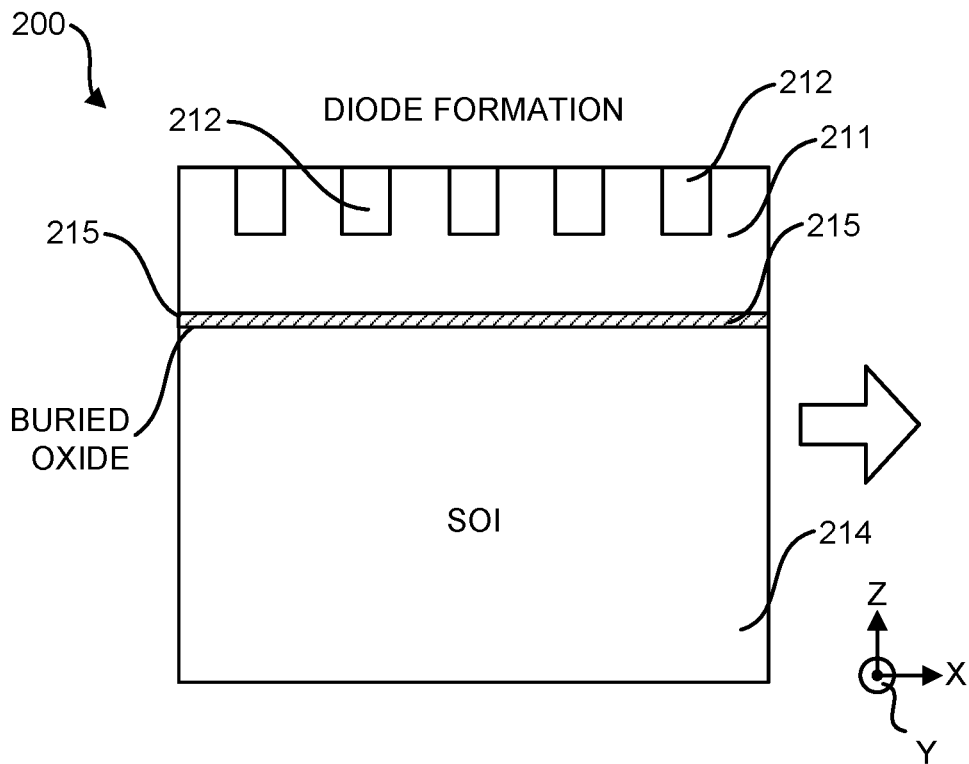
FIG. 5A through FIG. 5E are cross sectional fabrication stage views illustrating fabrication of a detector according to one example.

A method for fabrication of the detector 200 according to FIG. 1B as described with reference to the fabrication stage views of FIGS. 5A-5E. Referring to FIG. 5A, sensing photodiodes 212 can be formed within semiconductor formation 211. Semiconductor formation 211 in the example of FIG. 5A can be provided by a silicon layer of a silicon on insulator (SOI) wafer having a bulk silicon layer, a dielectric layer and the silicon layer. Referring to FIG. 5A, semiconductor formation 211 can be defined by a silicon layer of an SOI wafer and semiconductor formation 214 can be defined by a bulk silicon layer of an SOI wafer. In further referring to FIG. 5A, dielectric barrier 215 can be provided by a dielectric layer of an SOI wafer. Referring to the stage view of FIG. 5A, sensing photodiodes 212 can be formed by way of ion implantation to create doped regions within the silicon layer of the depicted SOI wafer with sensing photodiodes 212 formed.

Figure 5B:
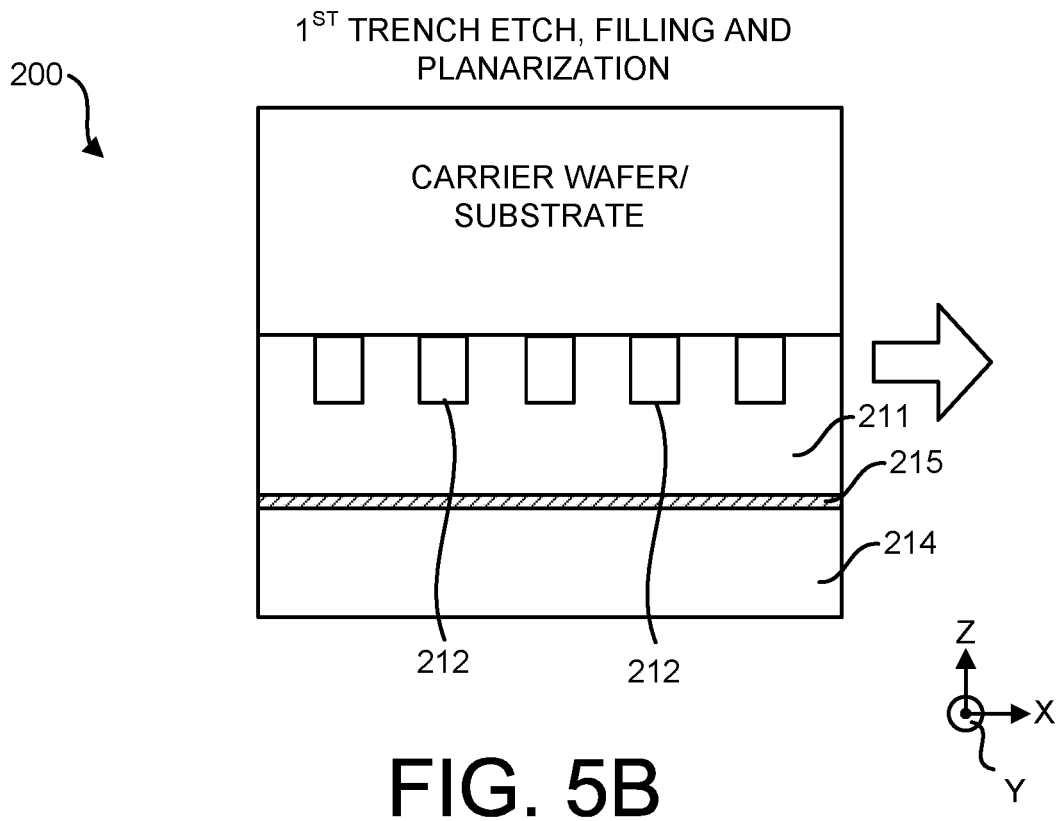
Figure 5C:
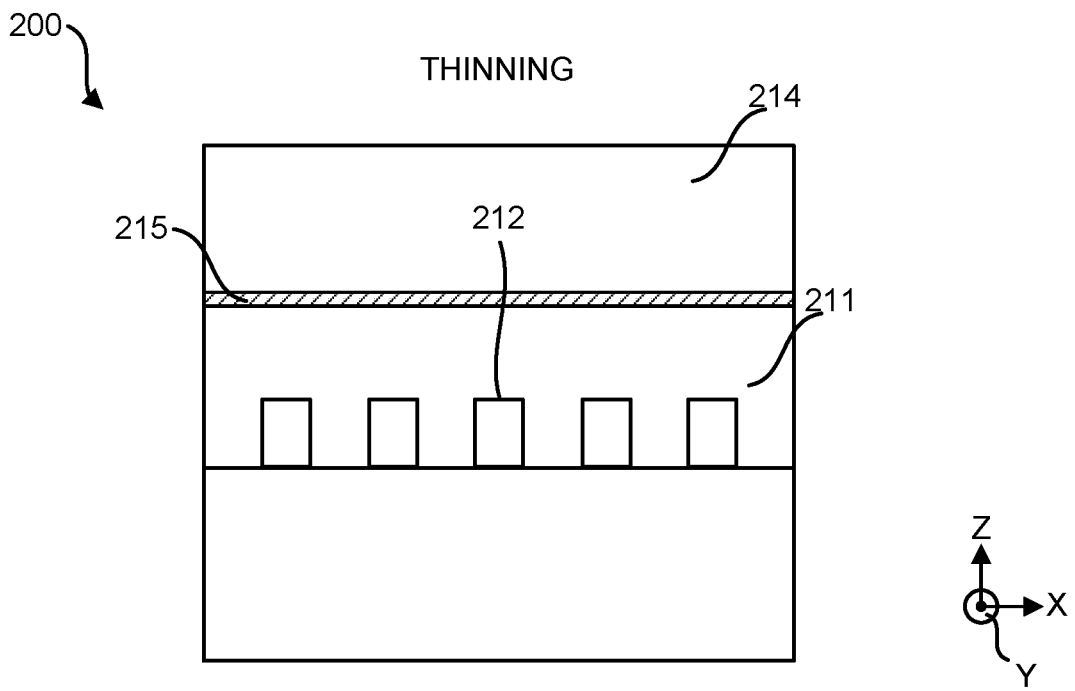

A carrier wafer as depicted in FIG. 5B can be applied to a planarized surface that exposes sensing photodiodes 212. Detector 200 in the intermediary stage of fabrication as shown in FIG. 5B can then be flipped as shown in FIG. 5C for further processing. Referring to FIG. 5C, the bulk silicon layer of the SOI wafer can be subject to thinning by grinding. The thinning can be performed to reduce an elevation of the bulk silicon layer portion of the SOI wafer to desired thickness in dependence on target wavelength separation, in dependence on wavelength separation targets where the detector being fabricated.

Figure 5D:
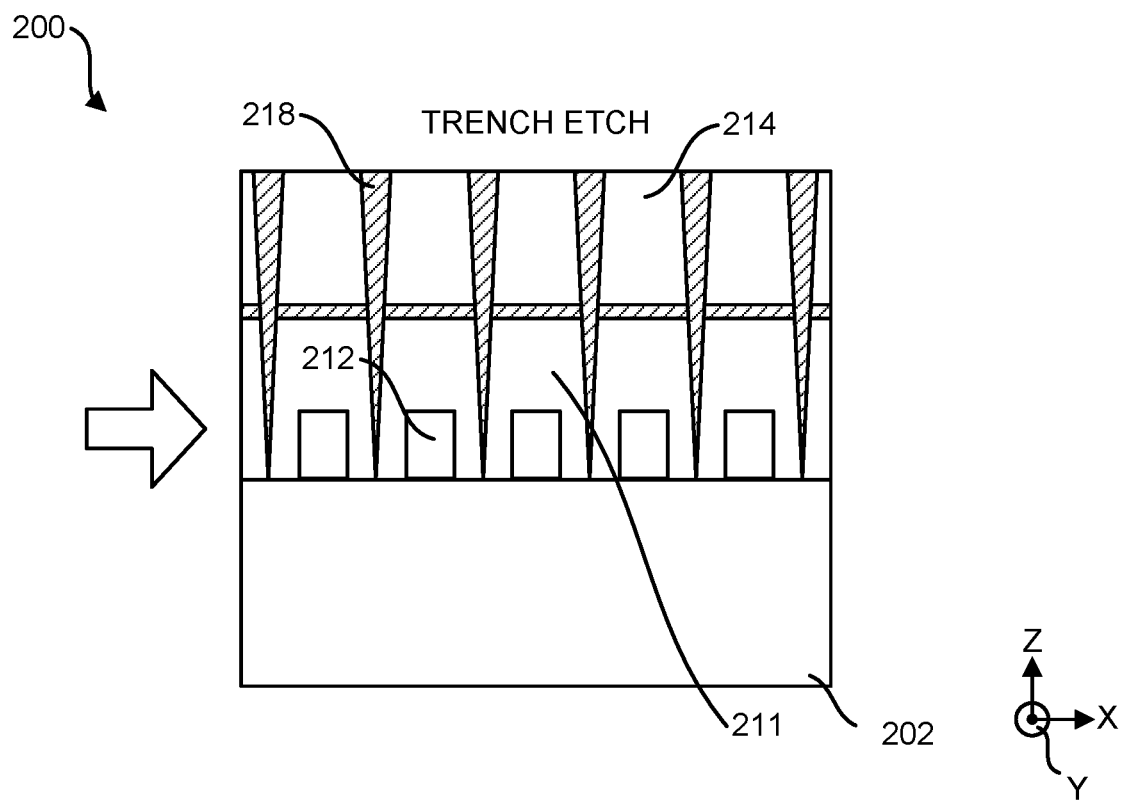

On completion of thinning, as depicted in FIG. 5C, the detector 200 in the intermediary stage of fabrication shown can be subject to trench formation by way of etching as depicted in FIG. 5D. The trenches can be filled with dielectric material and then planarized to define DTI formations 218 as depicted in FIG. 5D. Referring to FIG. 5D, the depicted top surface of detector in the intermediary stage of fabrication shown can be subject to planarization to permit further processing.

Figure 5E:
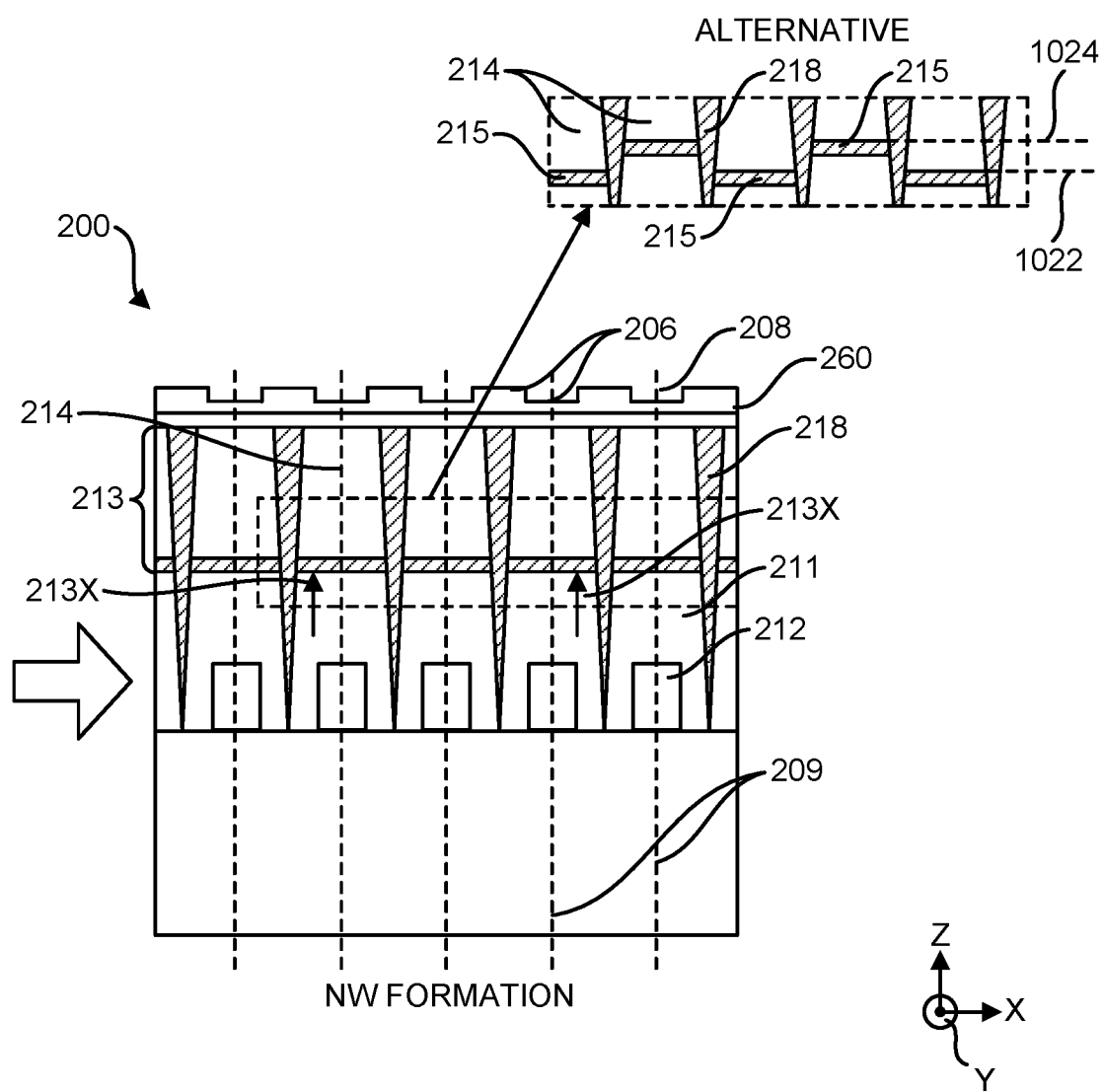

Referring to FIG. 5E, one or more dielectric layers can be deposited to define sample supporting structure 260, and sample supporting structure 260 can be subject to etching to define detector surface 206 and nanowells 208. Sample supporting structure 260 can alternately be referred to as a support structure or detector structure.

Figure 6A:
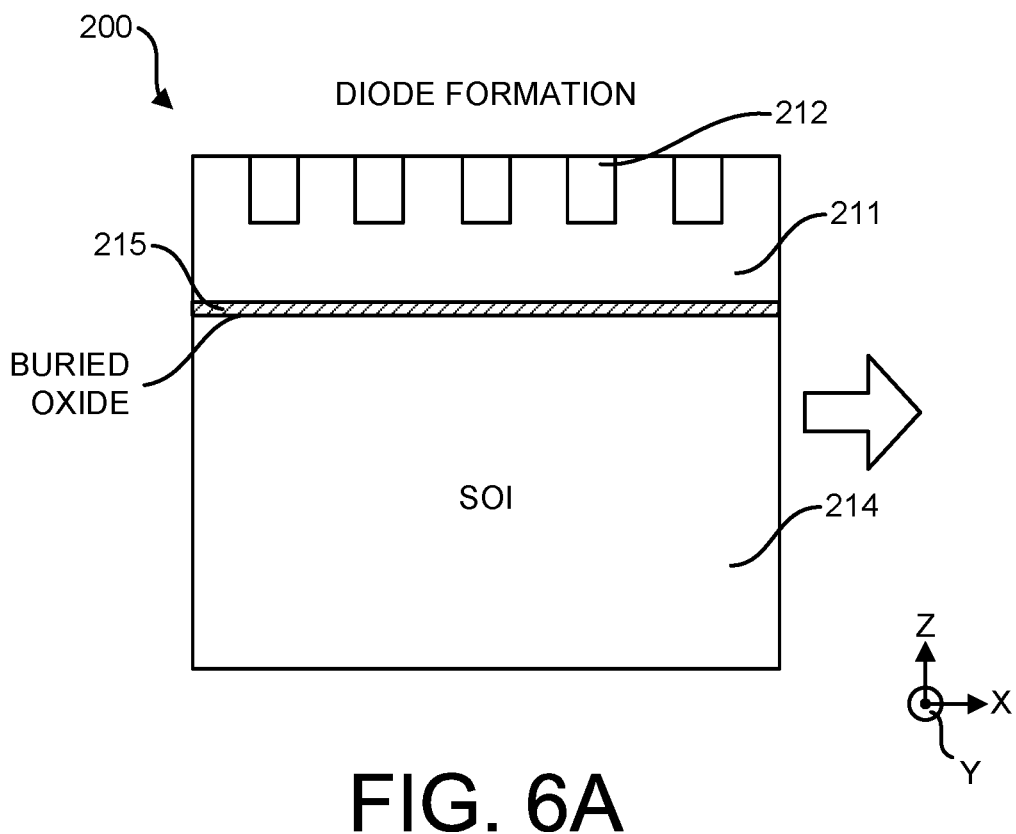
FIG. 6A through FIG. 6F are cross sectional fabrication stage views illustrating fabrication of a detector according to one example.

Another method for fabrication of detector 200 is set forth with reference to FIGS. 6A-6F. Referring to FIG. 6A, an SOI wafer again can be used to fabricate detector 200. Referring to FIG. 6A, semiconductor formation 211 can be defined by a silicon layer of an SOI wafer and semiconductor formation 214 can be defined by a bulk silicon layer of an SOI wafer. In further referring to FIG. 6A, dielectric barrier 215 can be provided by a dielectric layer of an SOI wafer.

Figure 6B:
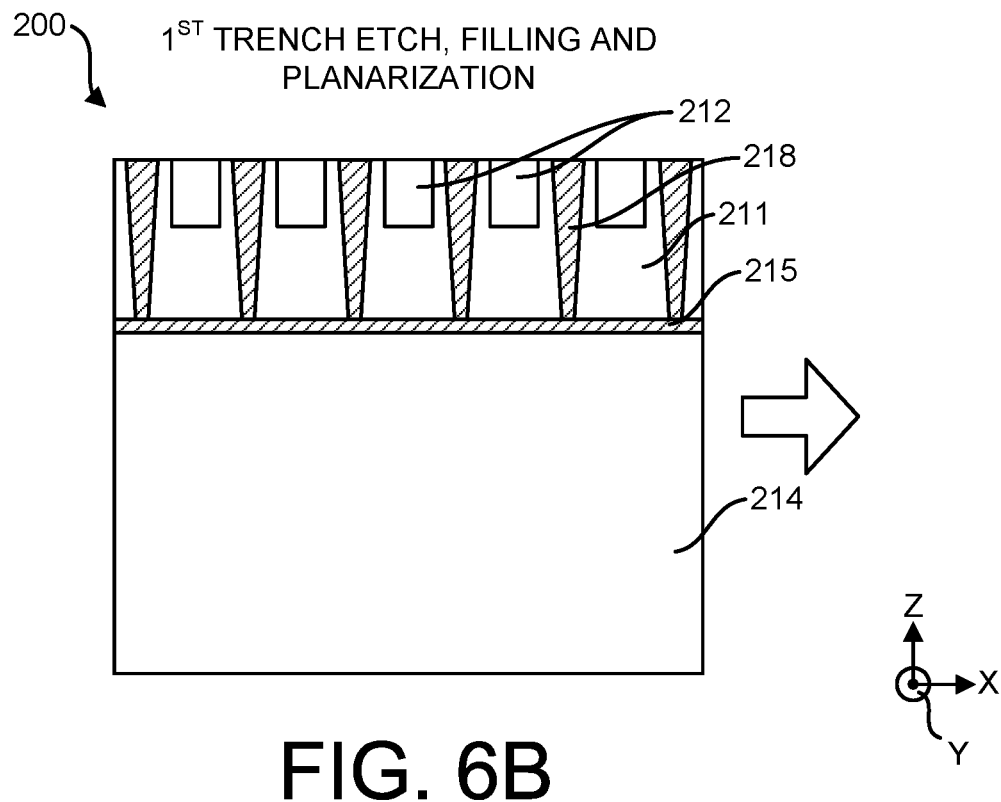

Referring to FIG. 6A, sensing photodiodes 212 can be formed by way of ion implantation with sensing photodiodes 212 formed, and fabrication processing can proceed to the stage as depicted in FIG. 6B. In the stage depicted in FIG. 6B, DTI formations 218 can be partially formed by way of etching into semiconductor formation 211 and then filling the resulting trenches with dielectric material and planarizing to partially define DTI formations 218.

Figure 6C:
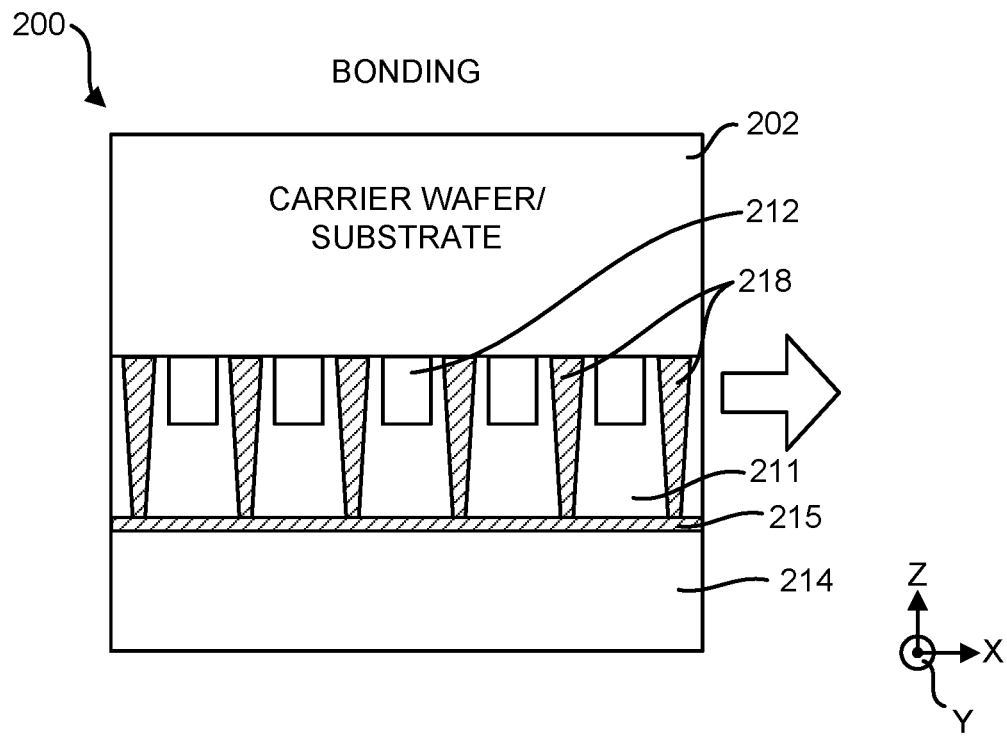
Figure 6D:
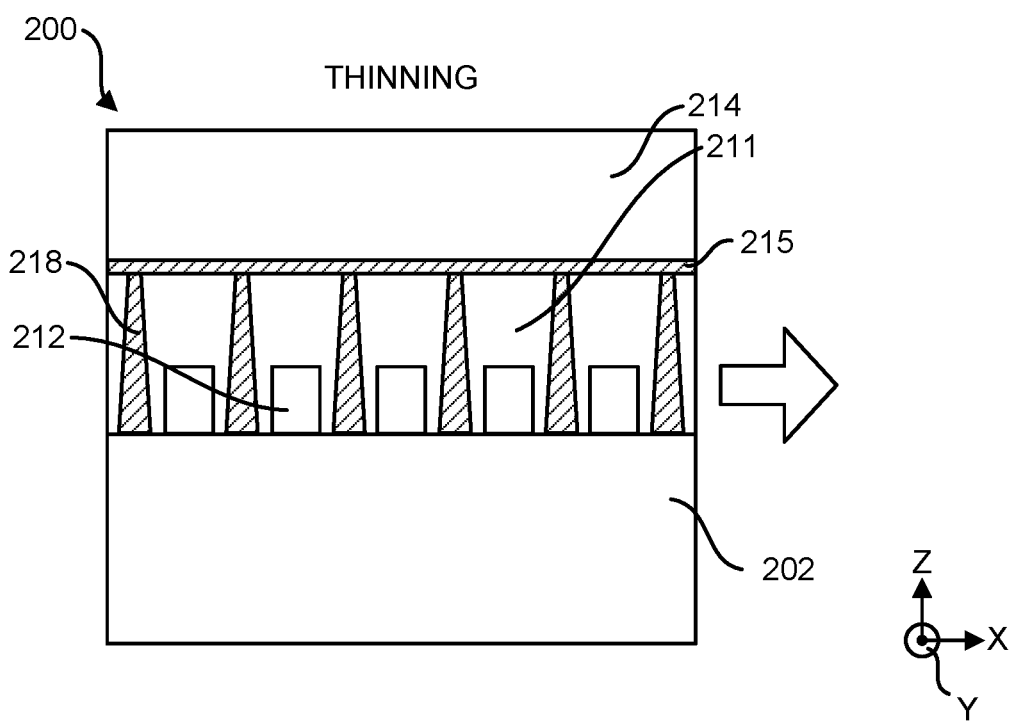
Figure 6E:
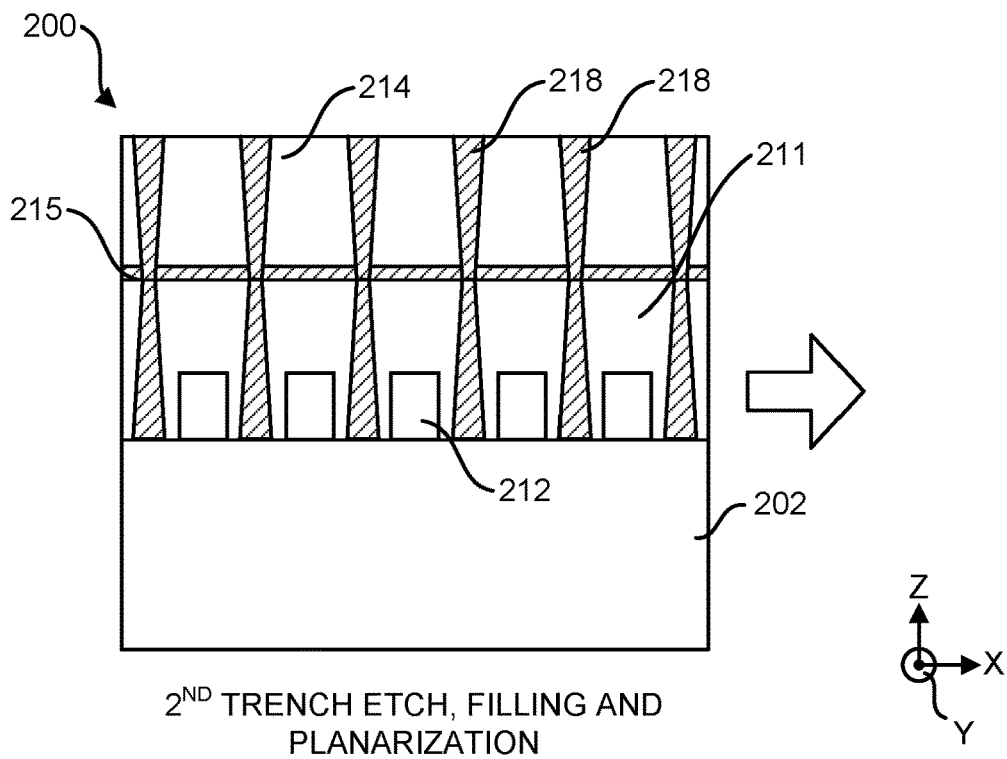

Referring to FIG. 6C, a carrier wafer can be bonded to the front side of the intermediary stage detector structure depicted in FIG. 6B, and then can be oriented in a backside-up orientation as depicted in FIG. 6D. With detector 200 in the intermediary stage of fabrication depicted in FIG. 6E, detector 200 can be subject to further fabrication processing. Namely, as depicted in FIGS. 6E and 6D, semiconductor formation 214 can be subject to thinning by grinding to reduce the thickness of semiconductor formation 214 in dependence on wavelengths targeted for separation. With semiconductor formation 214 thinned as shown in the stage view of FIG. 6E, trenches can be etched within semiconductor formation 214 and then can be filled and planarized to partially define DTI formations 218 as depicted in FIG. 6E.

Figure 6F:
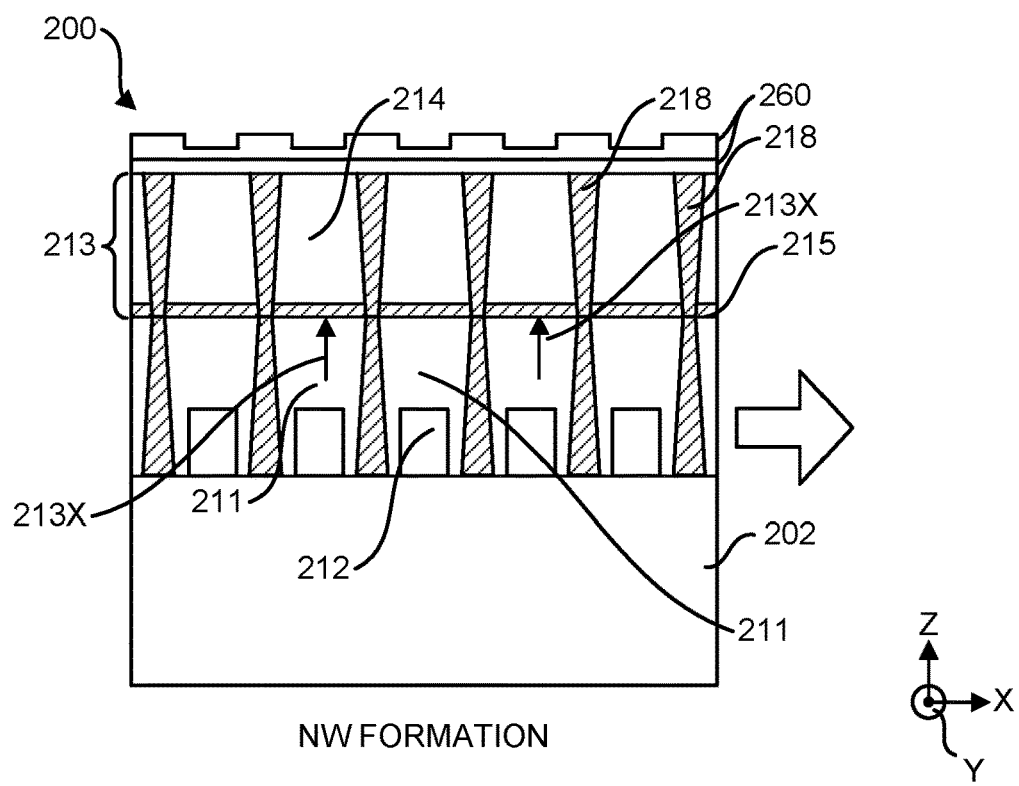

Referring to stage view of FIG. 6F, one or more layer can be deposited and patterned to define sample supporting structure 260, detector surface 206, and nanowells 208. Referring to FIG. 6F, DTI formations 218 can respectively include a front side DTI formation section extending through silicon, through semiconductor formation 211 and a backside DTI formation section extending through semiconductor formation 214, defined in FIG. 6F by a bulk substrate of an SOI wafer.

Figure 7A:
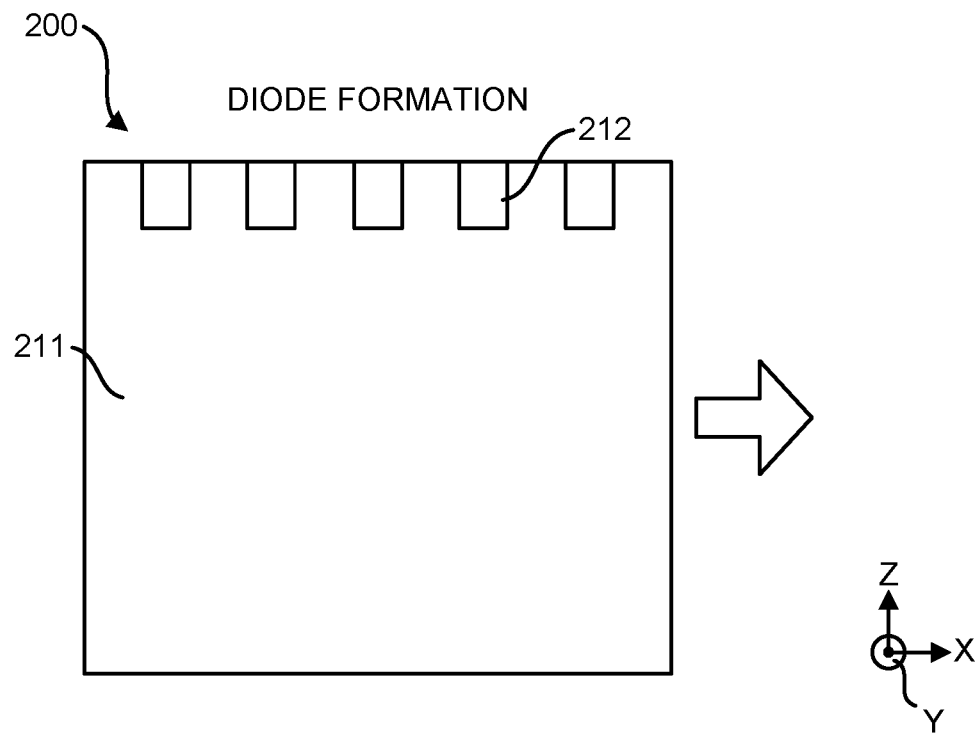
FIG. 7A through FIG. 7H are cross sectional fabrication stage views illustrating fabrication of a detector according to one example.
Figure 7B:
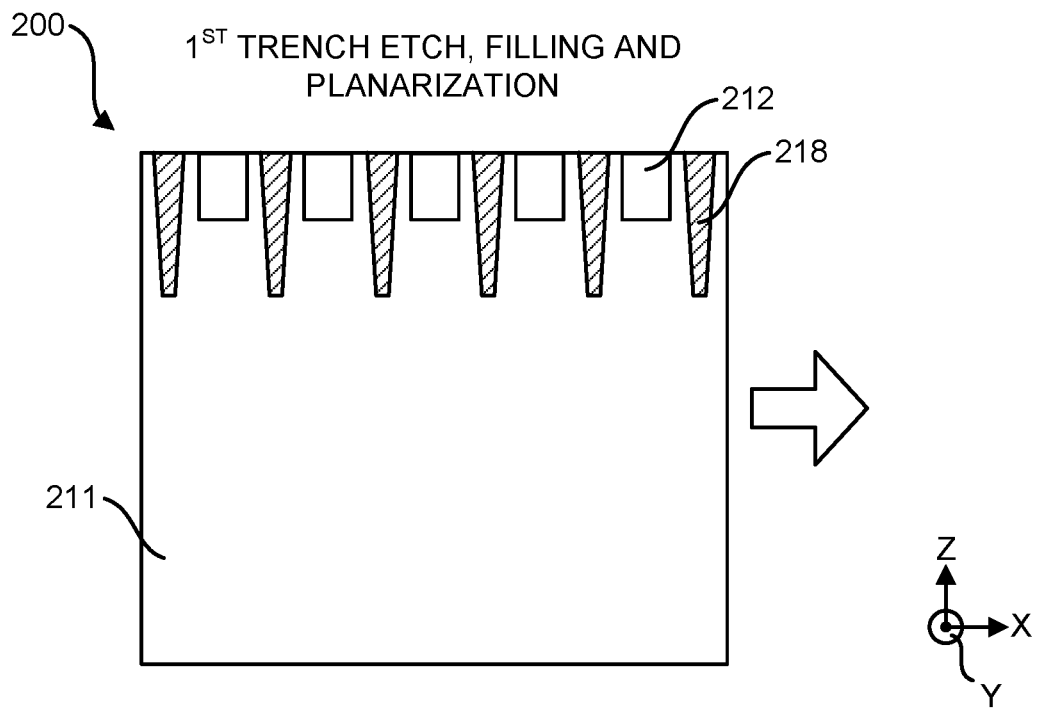

Another method for fabrication of detector 200 in accordance with FIG. 1B is described in reference to FIGS. 7A-7H. The fabrication methodology as described in reference to FIGS. 7A-7H is particularly advantageous for fabrication of a detector 200 wherein material of semiconductor formation 214 is differentiated from a material of semiconductor formation 211. Differentiation of the material of semiconductor formation 214 from the material of semiconductor formation 211 can be useful, e.g., to reduce thickness targets for achieving targeted wavelength separations. Referring to FIG. 7A, the starting point for the fabrication of detector 200 in the example of FIGS. 7A-7H can be provided by a bulk silicon wafer, which bulk silicon wafer defines semiconductor formation 211.

Referring to FIG. 7A, sensing photodiodes 212 can be formed using ion implantation. With sensing photodiodes 212 formed, detector 200, as shown in the intermediary stage of fabrication depicted in FIG. 7B, can be subject to etching, filling, and planarizing to partially define DTI formations 218.

Figure 7C:
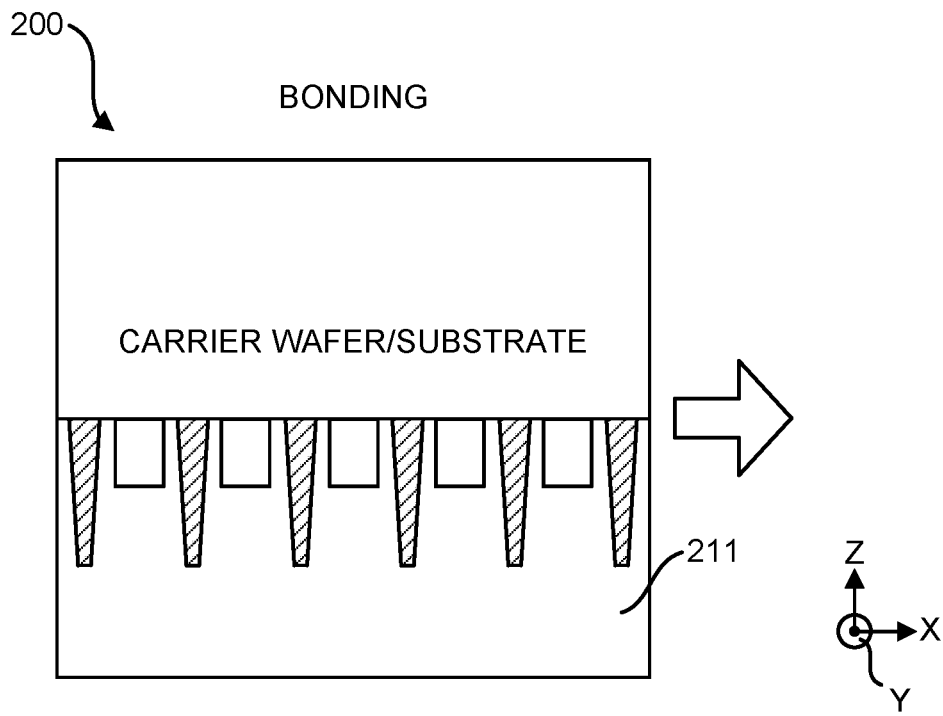
Figure 7D:
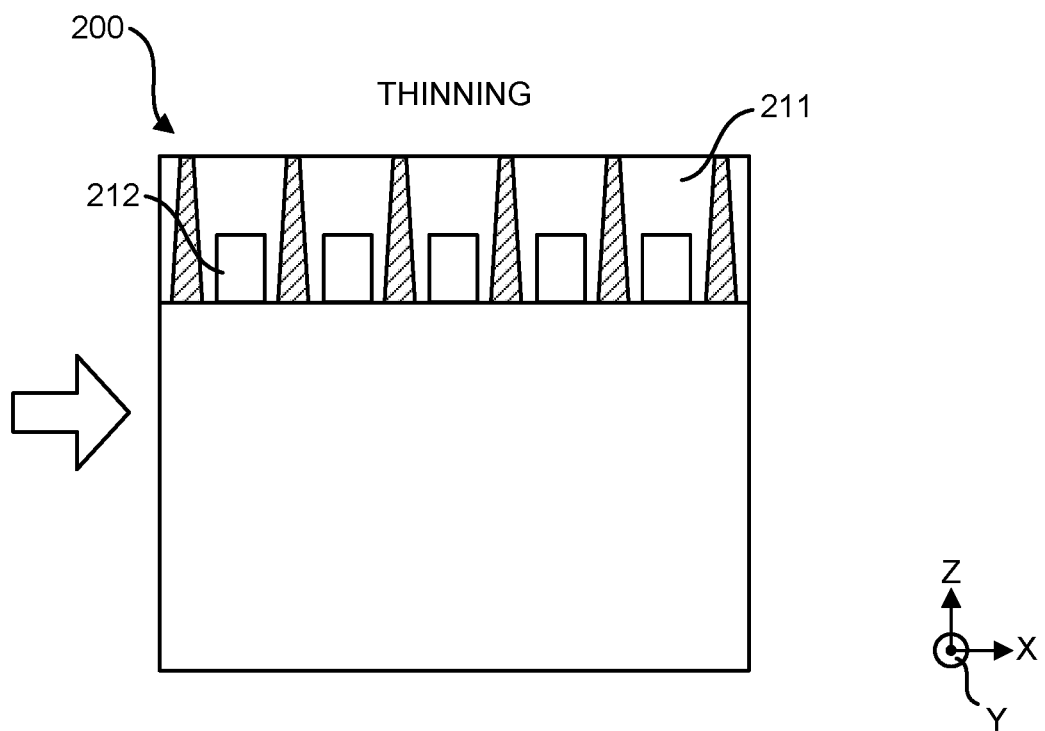

A carrier wafer can be bonded to the top planarized surface, as depicted in FIG. 7C, and, as depicted in FIG. 7D, detector 200 in the intermediary stage of fabrication shown, with carrier wafer attached, can be oriented in reverse backside up orientation to facilitate further fabrication processing.

Figure 7E:
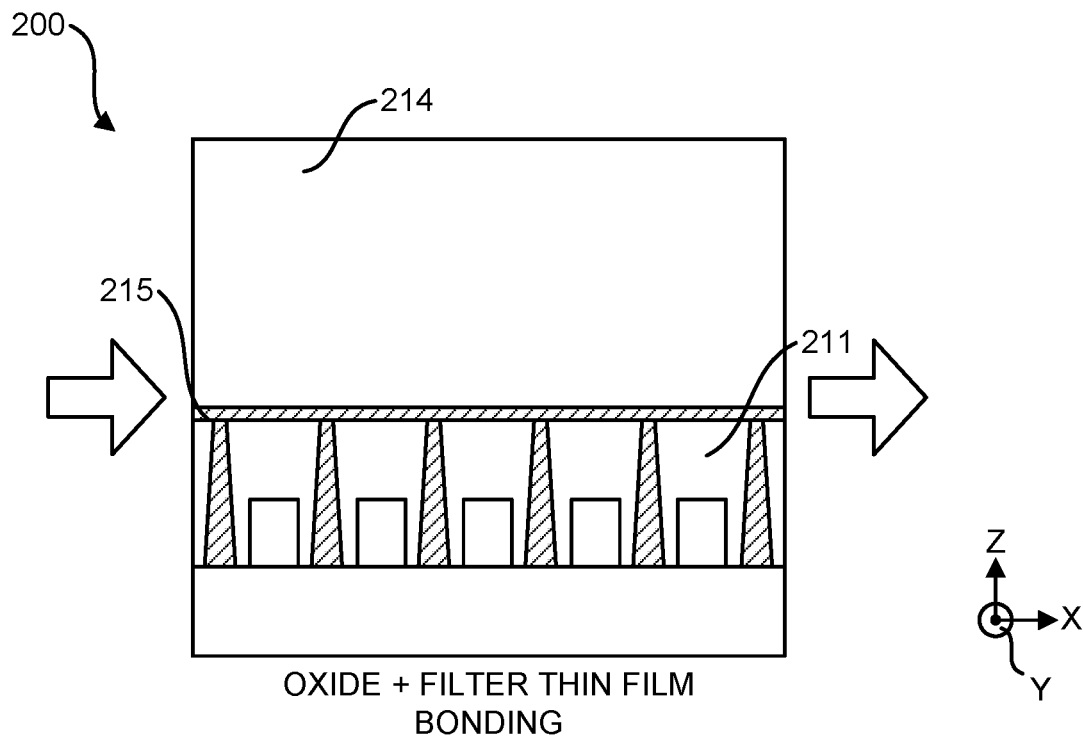

As shown in FIG. 7D, semiconductor formation 211 defined by a bulk silicon wafer can be subject to thinning by grinding so that the thickness of semiconductor formation 211 is reduced to desired thickness. With the thickness of semiconductor formation reduced, dielectric barrier 215 can be deposited and planarized as depicted in FIG. 7E. Dielectric barrier 215, in the example depicted in FIG. 7G, can be provided by a deposited and planarized layer of dielectric material.

With dielectric barrier 215 deposited and planarized, as shown in FIG. 7E, semiconductor formation 214 can be formed. Referring to FIG. 7E, semiconductor formation 214 can be formed by bonding a layer defining semiconductor formation 214 to a planarized surface defining dielectric barrier 215. The bonded layer of semiconductor material defining semiconductor formation 214 in the example of FIG. 7E can be any selected semiconductor material selected in dependence on target performance and dimensional characteristics of detector 200 for the current application. The material of semiconductor formation 214 can be differentiated from the material of semiconductor formation 211.

Figure 7F:
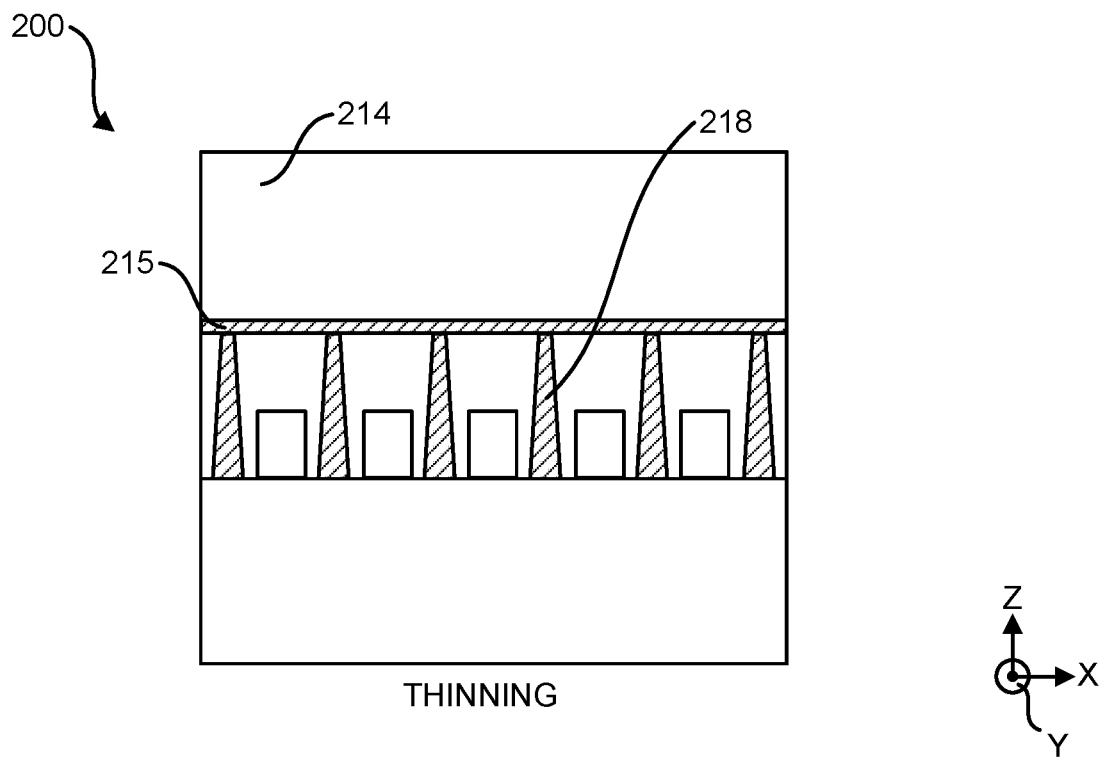

Referring to the fabrication stage view of FIG. 7F, semiconductor formation 214 can be thinned by grinding so that semiconductor formation 214 exhibits a desired thickness in dependence on target performance characteristics, including wavelength separation targets of detector 200. Referring to the fabrication stage view of FIG. 7G, trenches can be etched in semiconductor formation 214 and then filled with dielectric material and then planarized to partially define DTI formations 218. Referring to the fabrication stage view of FIG. 7H, one or more material layer can be deposited to define sample supporting structure 260, detector surface 206, and nanowells 208.

Figure 7G:
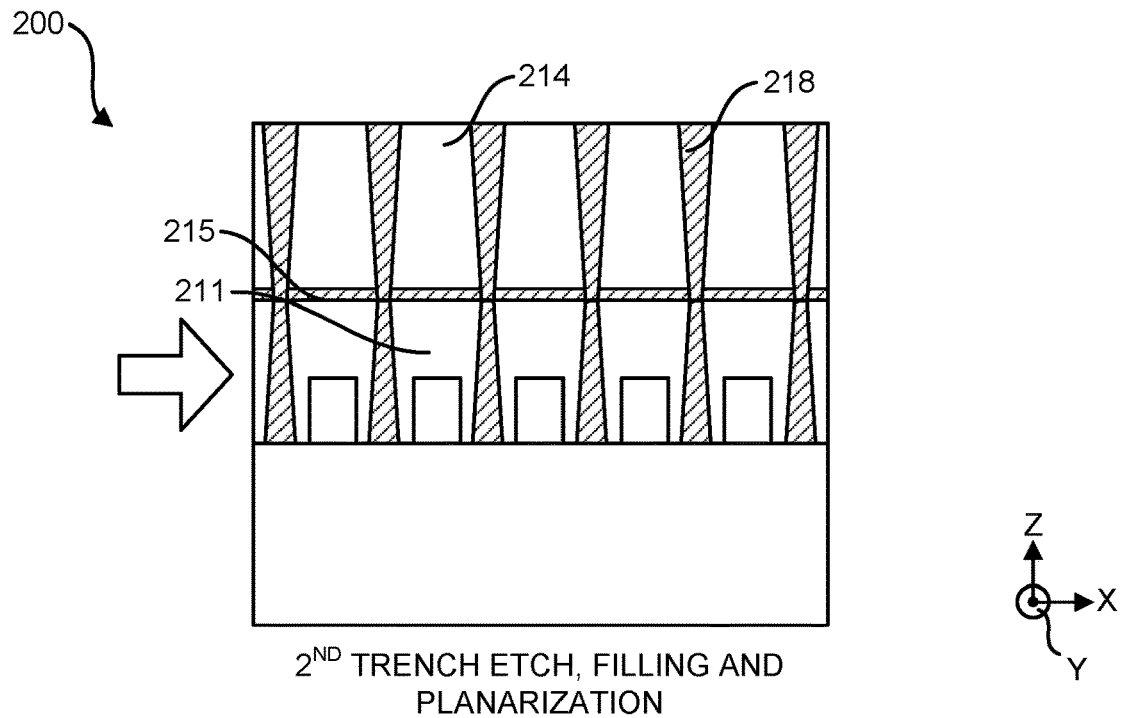

There is set forth herein, in reference to FIGS. 7F and 7G, a method including using frontside fabrication processing to form first partial deep trench isolation trenches extending through semiconductor formation 211 (FIG. 7F) and filling the first partial deep trench isolation trenches to form first partial deep trench isolation formations, and wherein method includes using backside fabrication processing to form second partial deep trench isolation trenches extending through semiconductor formation 214 (FIG. 7G) and filling the second partial deep trench isolation trenches to form second partial deep trench isolation formations, the second partial deep trench isolation formations defining light separating structure regions within the structure comprising the dielectric barrier and the second semiconductor formation.

Figure 7H:
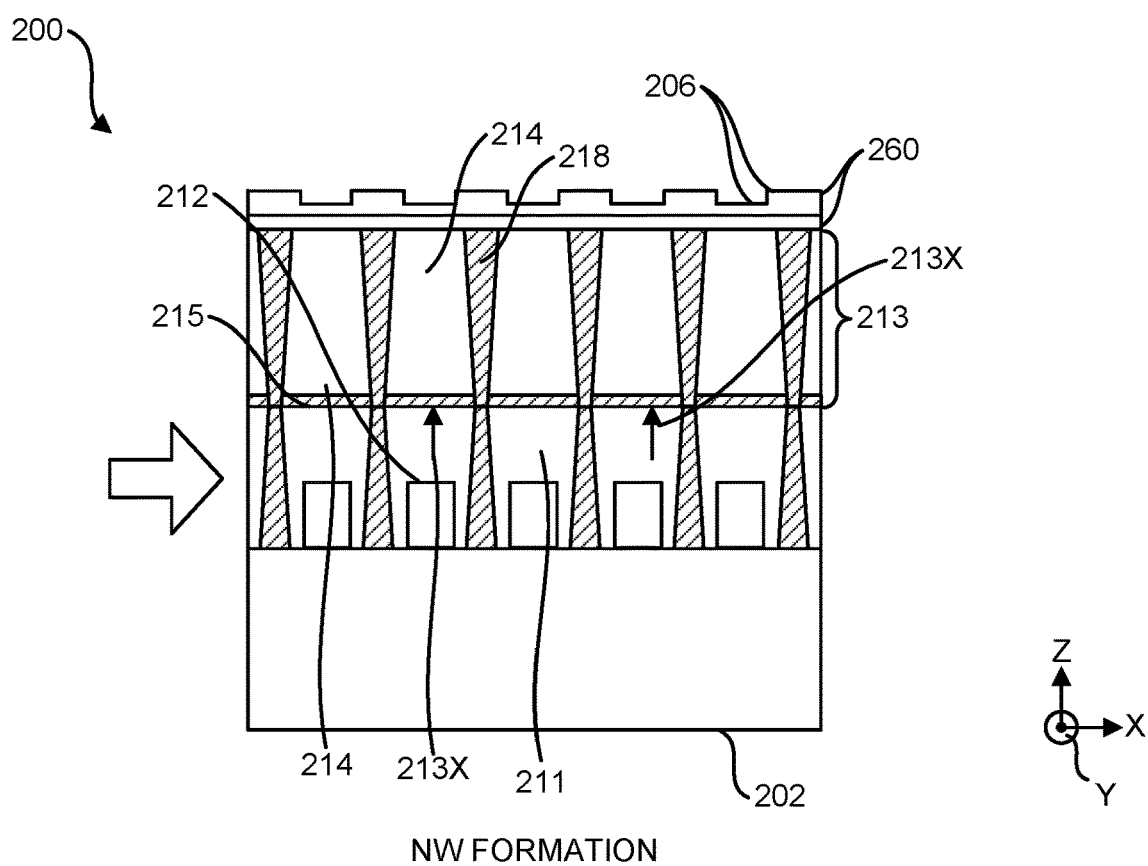

Referring to FIG. 7H, respective DTI formations 218 can include frontside sections extending through semiconductor formation 211 and backside sections extending through semiconductor formation 214.

Another method for fabrication of detector 200 in accordance with the example of FIG. 1B is described in reference to the fabrication stage views of FIGS. 8A-8G.

Figure 8A:
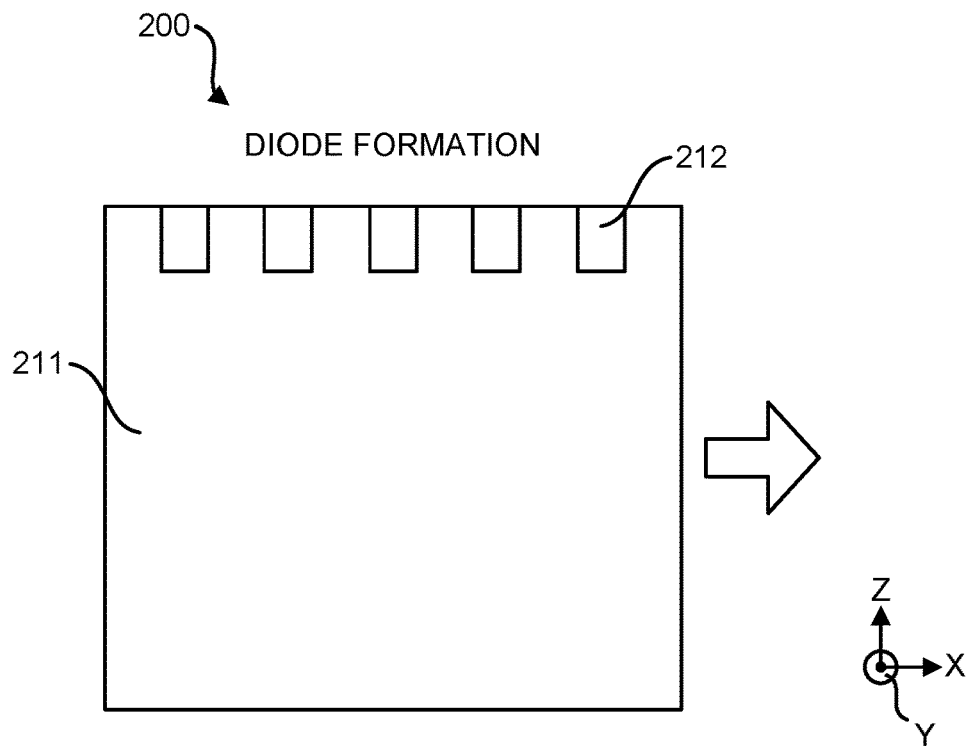
FIG. 8A through FIG. 8G are cross sectional fabrication stage views illustrating fabrication of a detector according to one example.
Figure 8B:
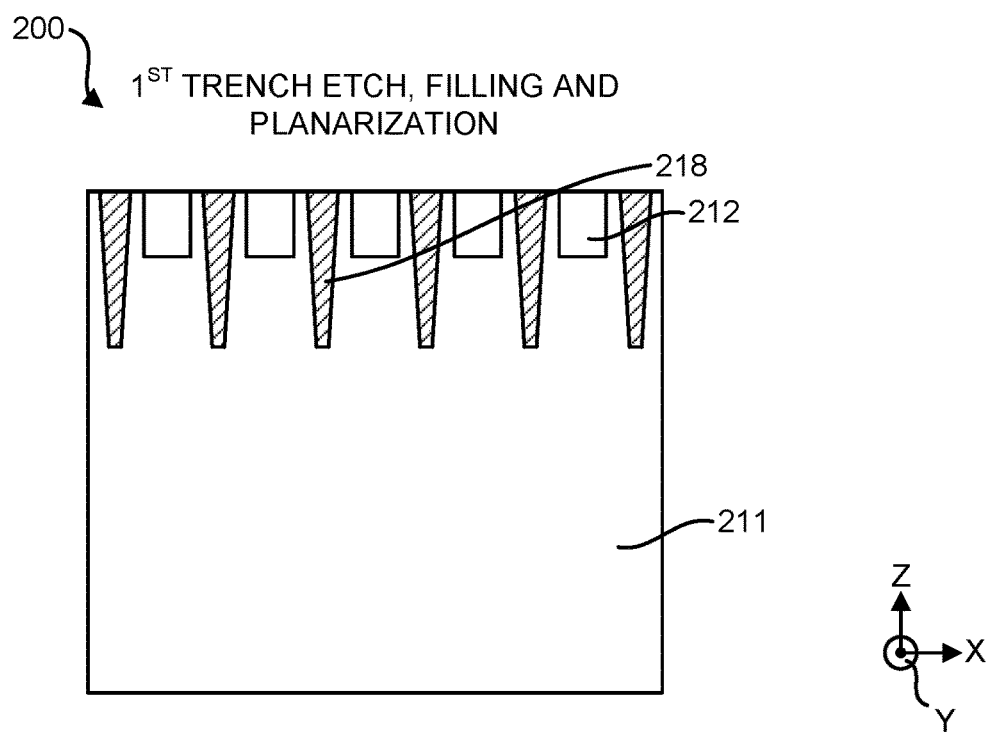

Referring to FIG. 8A, sensing photodiodes 212 can be formed using ion implantation. With sensing photodiodes 212 formed, detector 200, as shown in the intermediary stage of fabrication depicted in FIG. 8B, can be subject to etching, filling, and planarizing to partially define DTI formations 218.

Figure 8C:
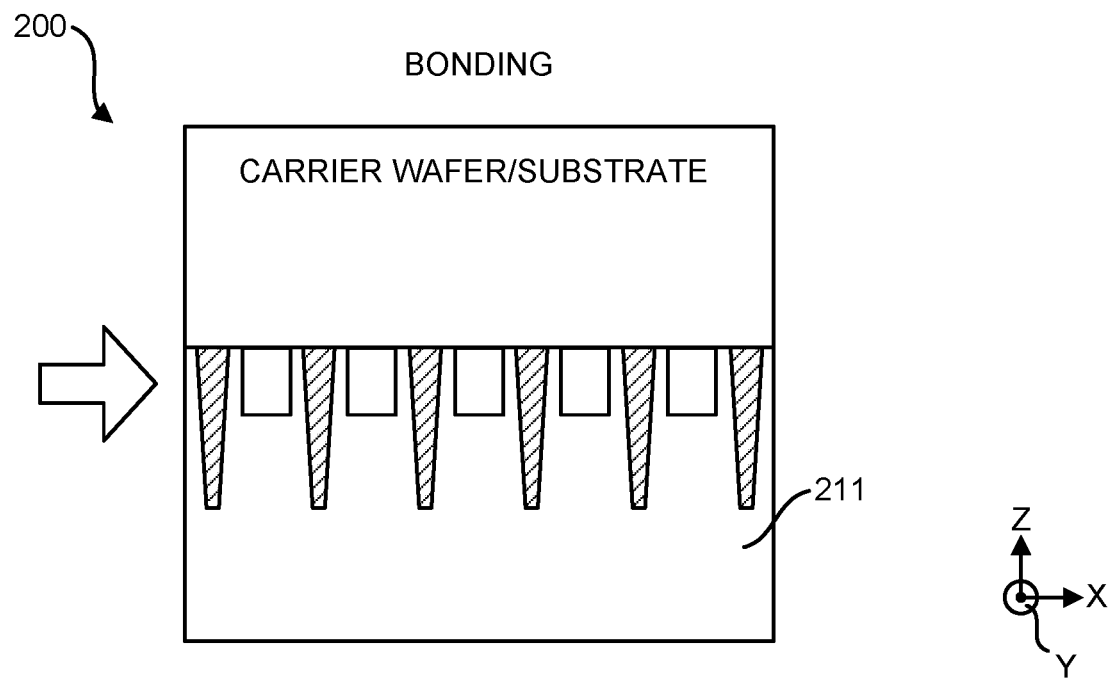
Figure 8D:
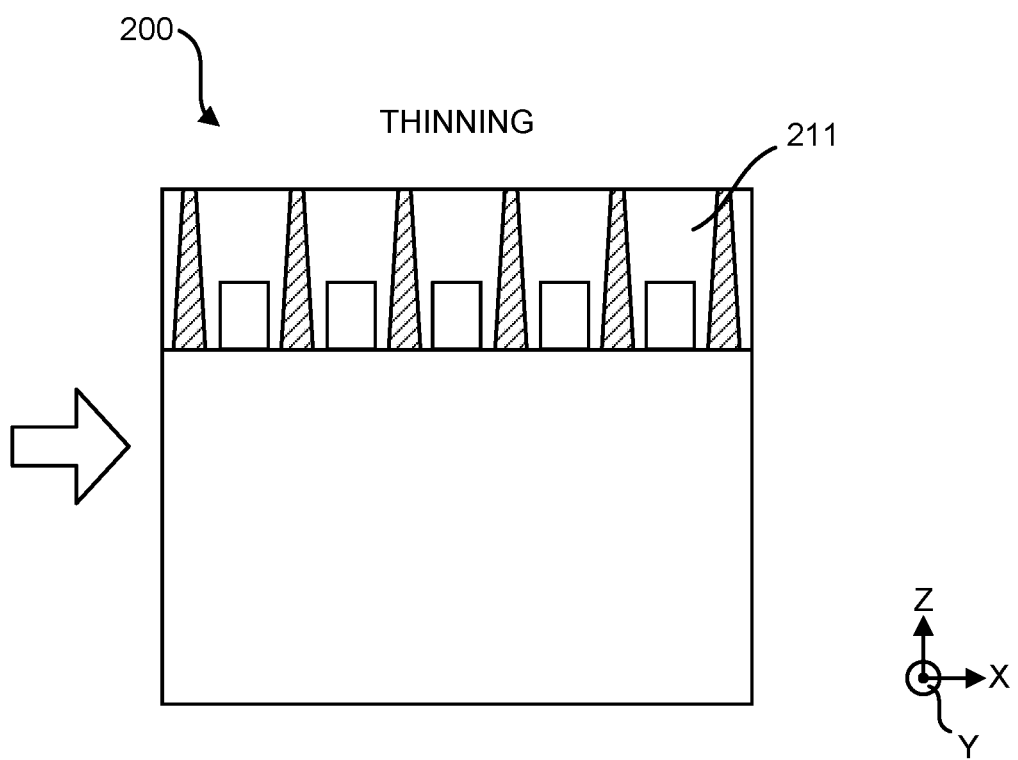

A carrier wafer can be bonded to the top planarized surface, as depicted in FIG. 8C, and, as depicted in FIG. 8D, detector 200 in the intermediary stage of fabrication shown, with carrier wafer attached, can be oriented in reverse backside up orientation to facilitate further fabrication processing. As shown in FIG. 8D, semiconductor formation 211 defined by a bulk silicon wafer can be subject to thinning by grinding so that the thickness of semiconductor formation 211 is reduced to desired thickness.

Figure 8E:
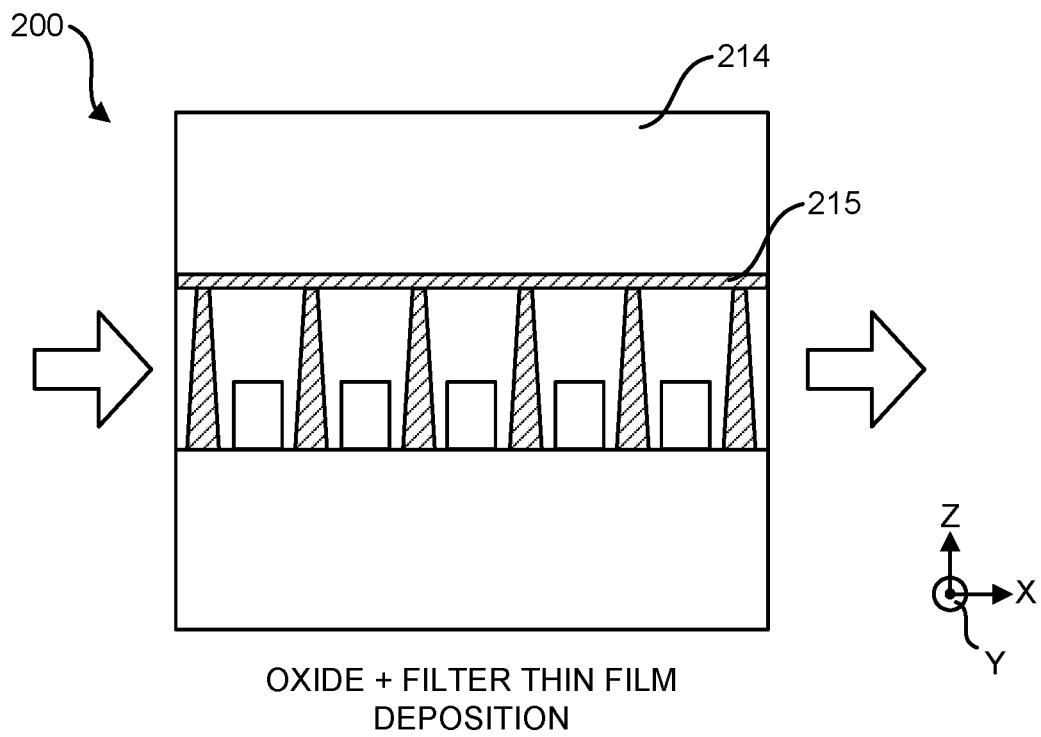

With the thickness of semiconductor formation 214 reduced, dielectric barrier 215 can be deposited and planarized as depicted in FIG. 8E. Dielectric barrier 215, in the example depicted in FIG. 7G, can be provided by a deposited and planarized layer of dielectric material.

With dielectric barrier 215 deposited and planarized, as shown in FIG. 8E, semiconductor formation 214 can be formed. Referring to FIG. 8E, semiconductor formation 214 can be formed by depositing material defining semiconductor formation 214 to a planarized surface defining dielectric barrier 215. The deposited layer defining semiconductor formation 214 can be subject to planarization.

The deposited layer of semiconductor material defining semiconductor formation 214 in the example of FIG. 8E can be any selected semiconductor material selected in dependence on target performance and dimensional characteristics of detector 200 for the current application. The material of semiconductor formation 214 can be differentiated from the material of semiconductor formation 211.

Figure 8F:
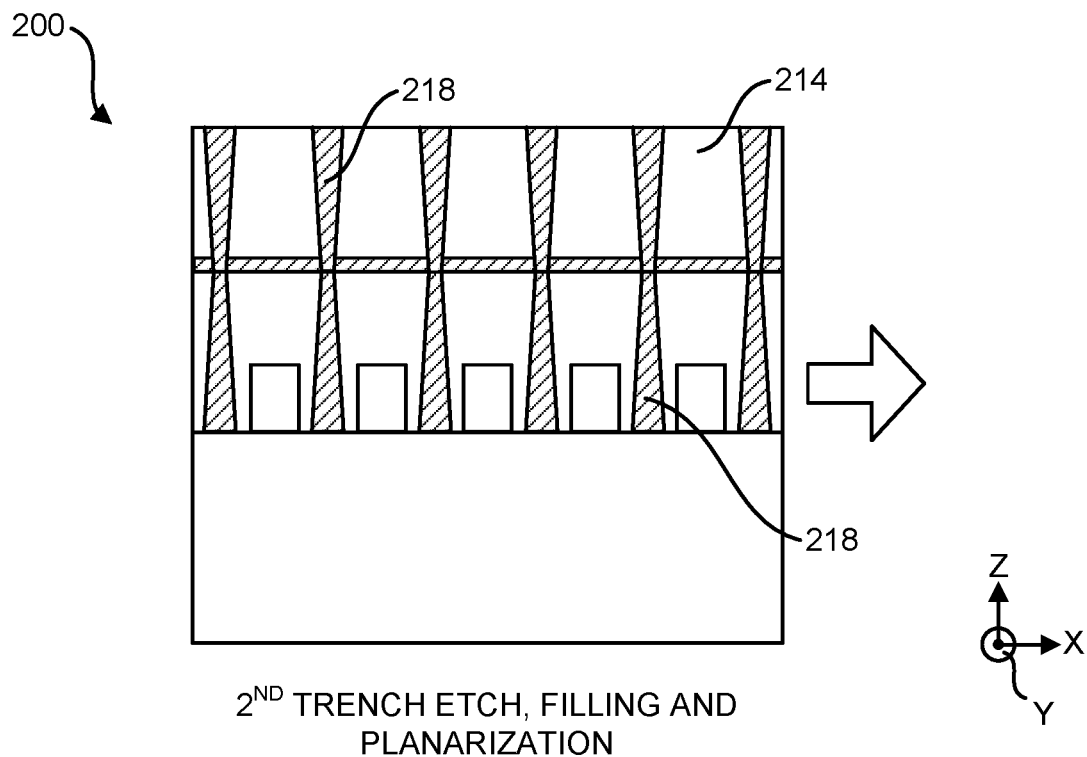

Referring to the fabrication stage view of FIG. 8F, semiconductor formation 214 can be thinned by grinding so that semiconductor formation 214 exhibits a desired thickness in dependence on target performance characteristics, including wavelength separation targets of detector 200. Referring to the fabrication stage view of FIG. 8G, trenches can be etched in semiconductor formation 214 and then filled with dielectric material and then planarized to partially define DTI formations 218. Referring to the fabrication stage view of FIG. 8G, one or more material layers can be deposited to define sample supporting structure 260, detector surface 206, and nanowells 208.

Figure 8G:
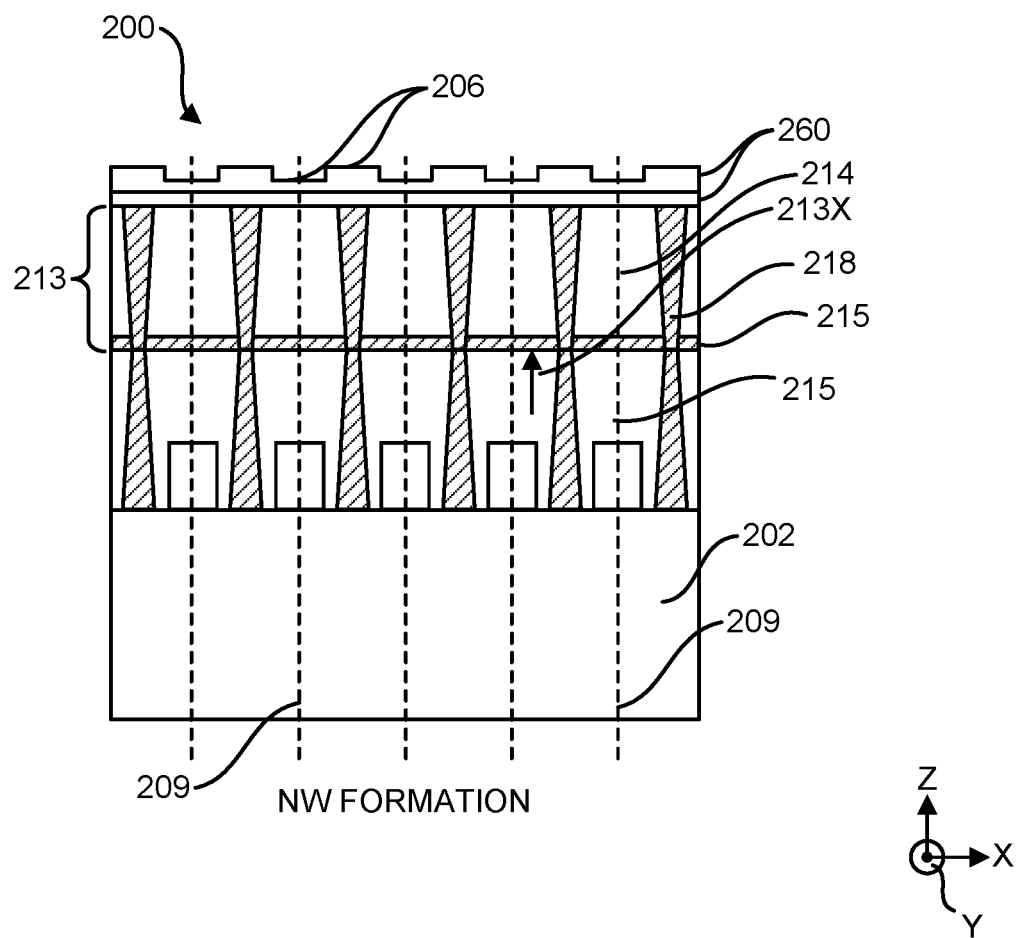

Referring to FIG. 8G, respective DTI formations 218 can include frontside sections extending through semiconductor formation 211 and backside sections extending through semiconductor formation 214.

Table A depicts additional fabrication and material details for examples herein in accordance with FIG. 1B, wherein light separating structure 213 includes a dielectric barrier 215 and a semiconductor formation 214, where semiconductor formation is configured for light absorption.

TABLE A

| Structure | Material and Process Conditions |
|---|---|
| Semiconductor formation 211 | Semiconductor formation 211 can be formed by grinding and then planarizing a bulk silicon wafer to thickness of from about 1.0 um to about 45.0 um. Alternatively, semiconductor formation 211 can be formed by grinding a silicon layer of an SOI wafer to a thickness of from about 1.0 um to about 45.0 um. |

TABLE A-continued

| Structure | Material and Process Conditions |
|---|---|
| Sensing photodiodes 212 | Sensing photodiodes 212 can be provided as n-doped regions on a p-substrate, or it could be an n-doped region on a p-well on an n-doped substrate or any other diode combination. Depth of the junction can be, e.g., from about 0.2 um to about 2.0 um according to one example. Sensing photodiodes 212 in one example can have a diameter, e.g., of about 1.0 um or less. Sensing photodiodes 212 in one example can have a diameter, e.g., of less than about 1.0 um. Sensing photodiodes 212 in one example can have a diameter, e.g., of less than 1.0 um. |
| Semiconductor formation 214 | Semiconductor formation 214 can be provided, e.g., by a silicon substrate of an SOI layer, a deposited silicon layer, or another semiconductor material. Semiconductor formation 214 can comprise an inorganic semiconductor material selected from the group consisting of, e.g., Si, a-Si, Ge, CdS. Semiconductor formation 214 can have a thickness of from about 1 nm to about 50.0 um. |
| Dielectric barrier 215 | Dielectric barrier 215 can be provided by dielectric material, e.g., silicon nitride (SiN), silicon oxide (SiO2), hafnium oxide (HfO2), or TaO5 (Ta2O5). Dielectric barrier 215 can have a thickness of from about 1.0 nm to about 1000 nm. |
| Deep trench isolation (DTI) formations 218 | DTI formations 218 can comprise or be formed of dielectric material, e.g., silicon nitride (SiN), silicon oxide (SiO2), hafnium oxide (HfO2), or TaO5 (Ta2O5). DTI formations 218 can feature diameters of from about 0.1 um to about 0.3 um. DTI formations 218 can have aspect ratios, e.g., of from about 1:5 to about 1:25. Height can be from about 1.0 um to about 15 um. |
| Sample supporting structure 260 | Structure 260 can comprise multiple dielectrics, e.g., silicon nitride (SiN), silicon oxide (SiO2), hafnium oxide (HfO2), or TaO5 (Ta2O5). |
| Substrate 202 | Can comprise a thickness, e.g., of from about 400 um to about 800 um to mechanically support sensing structure 210 and remaining structures fabricated thereon. |

A method for fabrication of a detector 200 in accordance with the example of FIG. 1C is set forth with reference to the fabrication stage views of FIGS. 9A-9F.

Figure 9A:
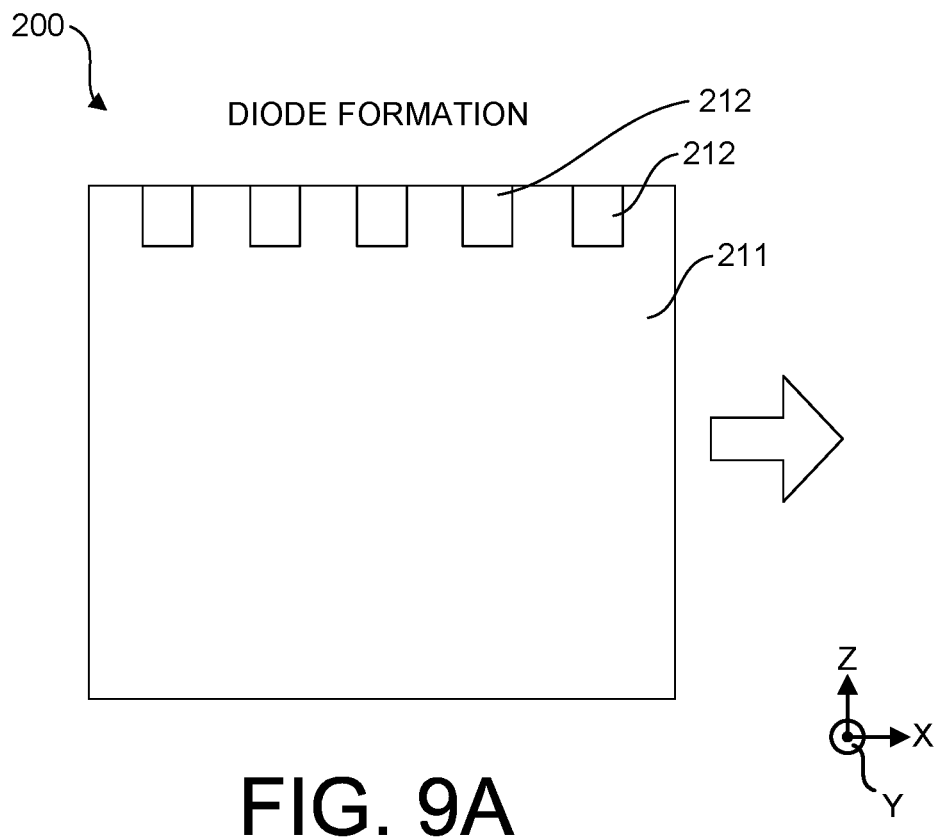
FIG. 9A through FIG. 9F are cross sectional fabrication stage views illustrating fabrication of a detector according to one example.

Referring to the fabrication stage view of FIG. 9A, sensing photodiodes 212 can be formed in a bulk silicon wafer by way of ion implantation. A carrier wafer can be attached to the frontside. In the example of FIG. 9A, semiconductor formation 211 can be defined by a bulk silicon wafer.

Figure 9B:
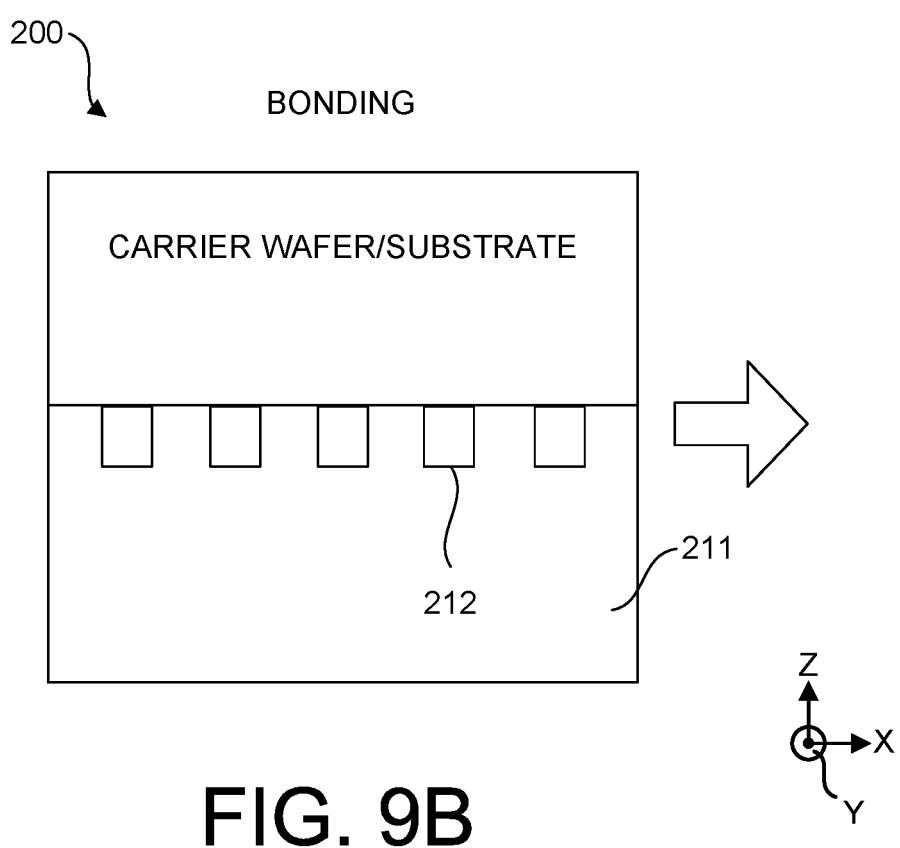

Referring to FIG. 9B, a carrier wafer can be attached to a front side of the structure depicted in FIG. 9A to permit backside fabrication processing of detector 200 and the intermediary stage of fabrication shown. Referring to the fabrication stage view of FIG. 9C, detector 200 in the intermediary stage of fabrication shown can be flipped in reverse orientation to facilitate backside fabrication processing.

Figure 9C:
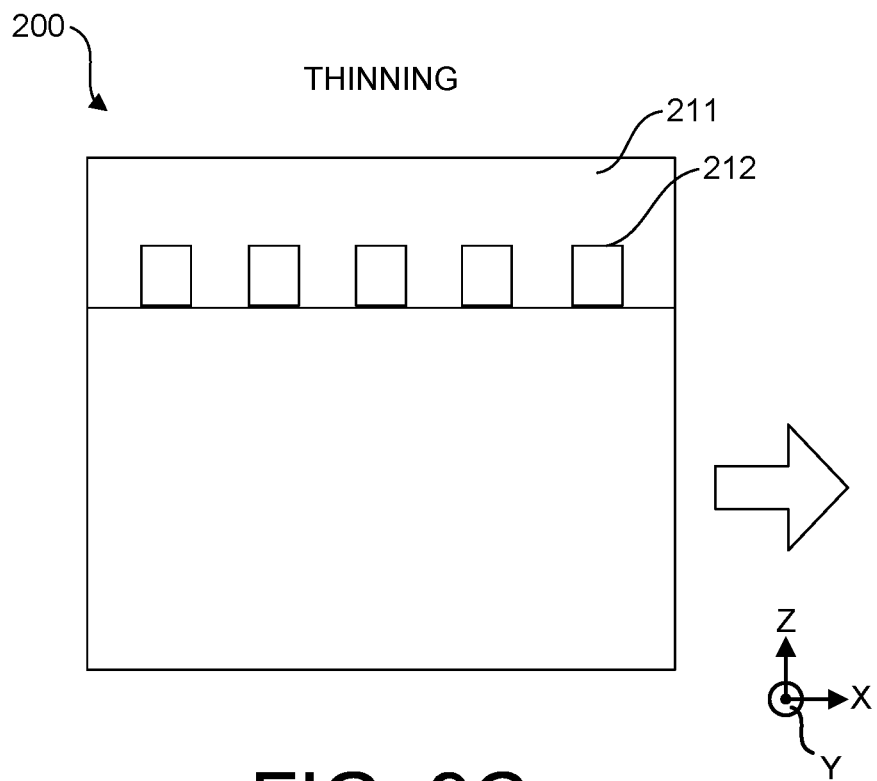

Referring to FIG. 9C, semiconductor formation 211 can be thinned by grinding so that semiconductor formation 211 exhibits a desired thickness.

Figure 9D:
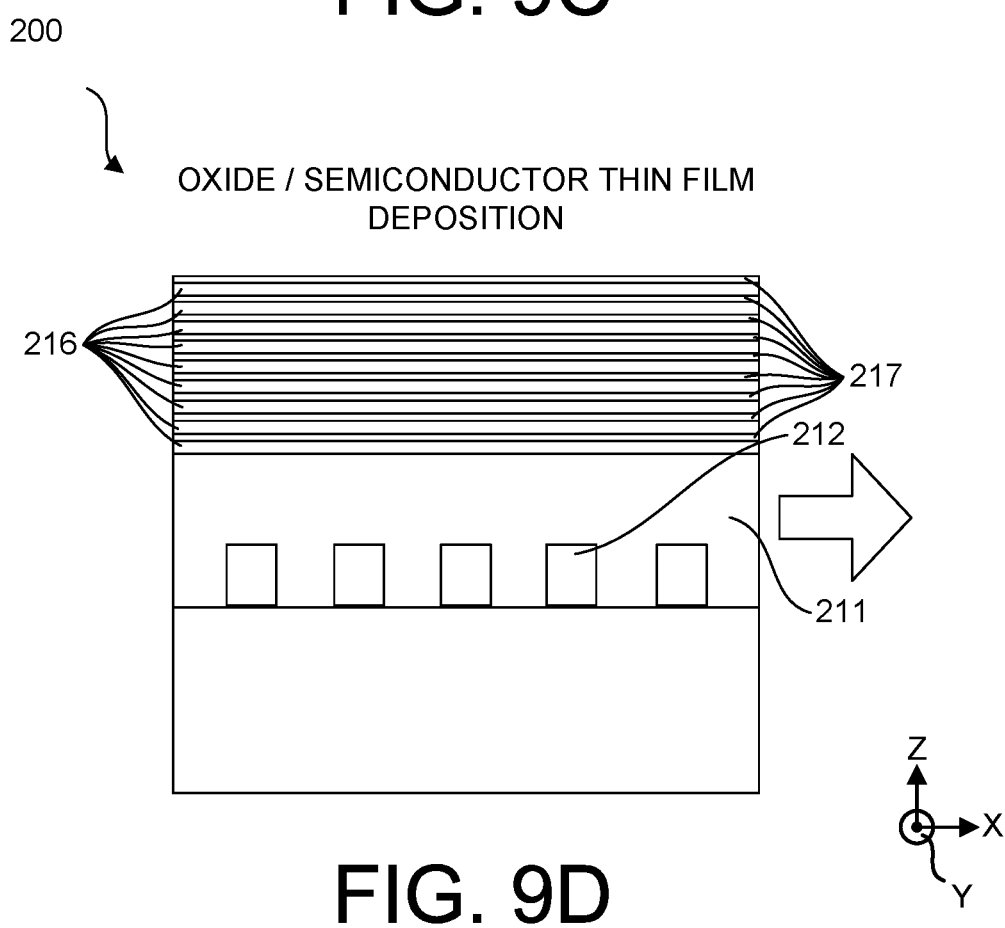

Referring to the fabrication stage view of FIG. 9D, alternating layers of first material 216 and second material 217 can be deposited and planarized to define an interference reflector as depicted in FIG. 9D (interference reflector defined by the alternating layers of first material 216 and second material 217 as depicted in FIG. 9D). With the interference reflector as depicted in FIG. 9D formed, detector 200 can be subject to further fabrication processing as depicted in FIG. 9E.

Figure 9F:
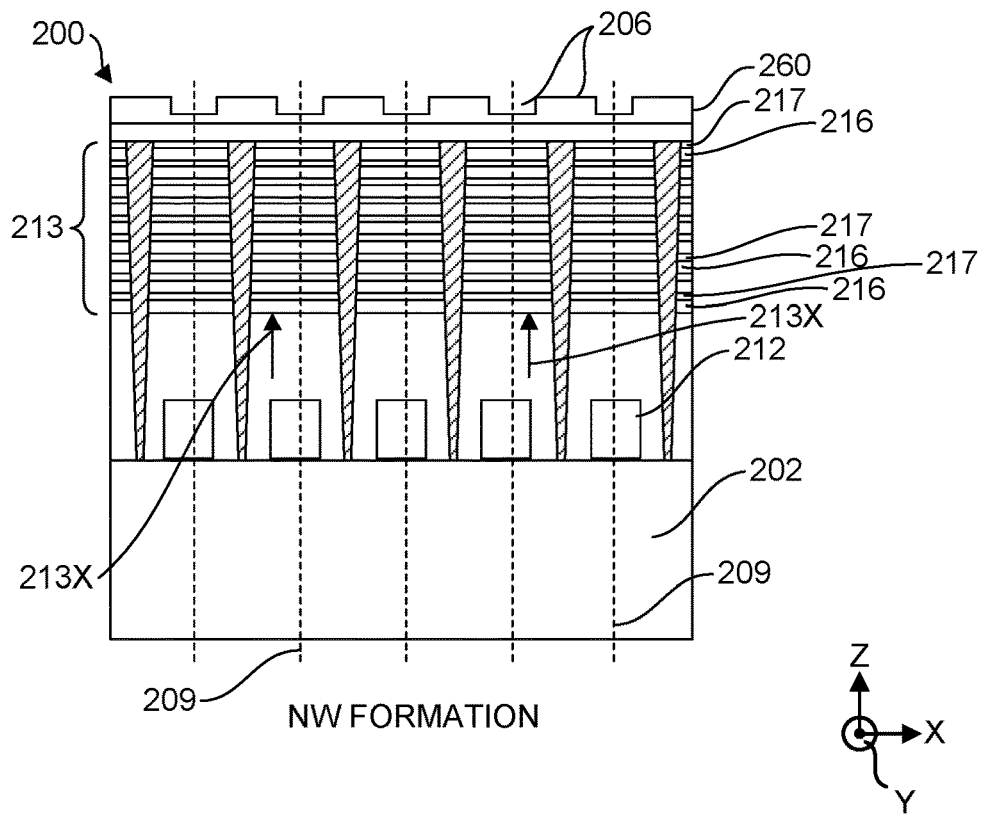
Figure 9E:
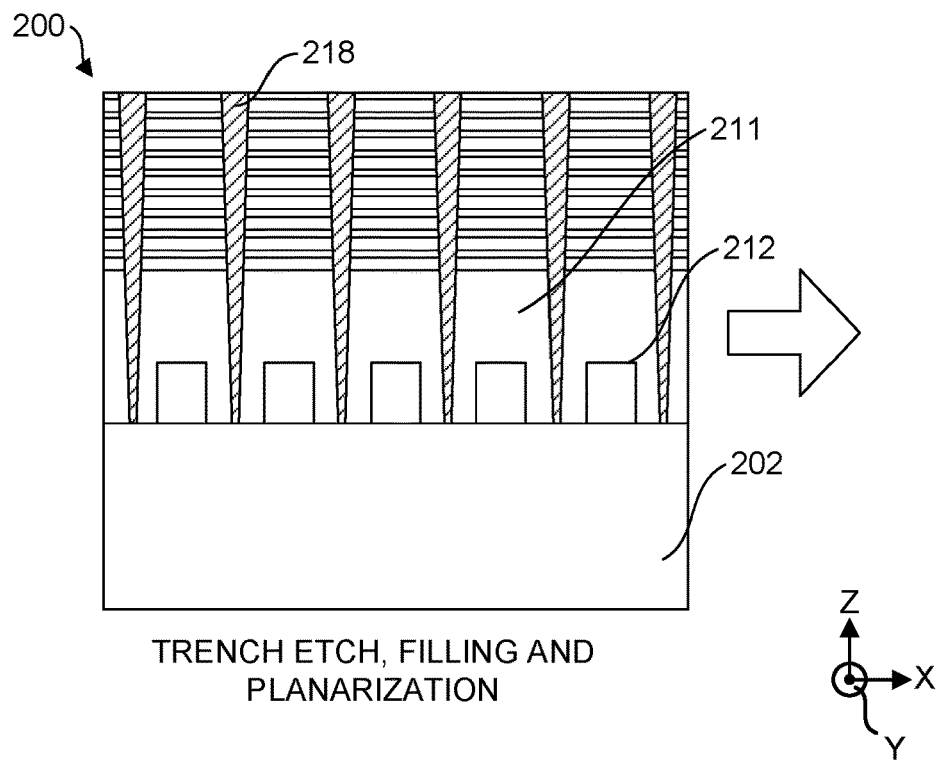

Referring to FIG. 9E, trenches can be etched, filled with dielectric material and planarized to define DTI formations 218 as depicted in FIG. 9E. Referring to DTI formations 218 as depicted in FIG. 9E, trenches for the formation of DTI formations 218 as depicted in FIG. 9E can extend through all elevations of the defined interference reflector and through all elevations of the depicted semiconductor formation 211, which, in the example of FIG. 9A-9F can be provided by a bulk silicon wafer. FIG. 9E depicts an example in which backside fabrication processing is used to form DTI formations after initial frontside fabrication processing is used to fabricate sensing photodiodes.

There is set forth herein, with reference to FIG. 9E a method including using backside fabrication processing to form deep trench isolation trenches extending through alternating layers of first material 216 and second material 217, and filling the deep trench isolation trenches to form DTI formations 218 that define light separating structure regions within the structure comprising the alternating layers of first material and second material.

Referring to FIG. 9F, one or more material layer can be deposited and patterned to define sample supporting structure 260, detector surface 206, and nanowells 208.

Table B depicts additional fabrication and material details for examples herein in accordance with FIG. 1C, wherein light separating structure 213 includes an interference reflector defined by alternating layers of first material 216 and second material 217.

TABLE B

| Structure | Material and Process Conditions |
|---|---|
| Semiconductor formation 211 | Semiconductor formation 211 can be formed by grinding and then planarizing a bulk silicon wafer to thickness of from about 1.0 um to about 45.0 um. Alternatively, semiconductor formation 211 can be formed by grinding a silicon layer of an SOI wafer to a thickness of from about 1.0 um to about 45.0 um. |
| Sensing photodiodes 212 | Sensing photodiodes 212 can be provided as n-doped regions on a p-substrate, or it could be an n-doped region on a p-well on an n-doped substrate or any other diode combination. Depth of the junction can be, e.g., from about 0.2 um to about 2.0 um according to one example. Sensing photodiodes 212 in one example can have a diameter, e.g., of about 1.0 um or less. Sensing photodiodes 212 in one example can have a diameter, e.g., of less than about 1.0 um. Sensing photodiodes 212 in one example can have a diameter, e.g., of less than 1.0 um. |
| Light separating structure 213 (provided by interference reflector in the example of FIG. 1C). | An interference reflector can be provided by alternating layers of first material 216 and second material 217. In one example, the first material can be selected from the group consisting of: aSi, SiN, SiO2, TiO2, TaOx, ZnSe, CdS. The second material can have an index of refraction different from the first material and can be selected from the group consisting of aSi, SiN, SiO2, TiO2, TaOx, ZnSe, CdS. |
| Deep trench isolation (DTI) formations 218 | DTI formations 218 can comprise or be formed of dielectric material, e.g., silicon nitride (SiN), silicon oxide (SiO2), hafnium |

TABLE B-continued

| Structure | Material and Process Conditions |
|---|---|
| | oxide (HfO2), or TaO5 (Ta2O5). DTI formations 218 can feature diameters of from about 0.1 um to about 0.3 um. DTI formations 218 can have aspect ratios, e.g., of from about 1:5 to about 1:25. Height can be from about 1.0 um to about 15 um. |
| Sample supporting structure 260 | Structure 260 can comprise multiple dielectrics, e.g., silicon nitride (SiN), silicon oxide (SiO2), hafnium oxide (HfO2), or TaO5 (Ta2O5). |
| Substrate 202 | Can comprise a thickness, e.g., of from about 400 um to about 800 um to mechanically support sensing structure 210 and remaining structures fabricated thereon. |

Figure 10:
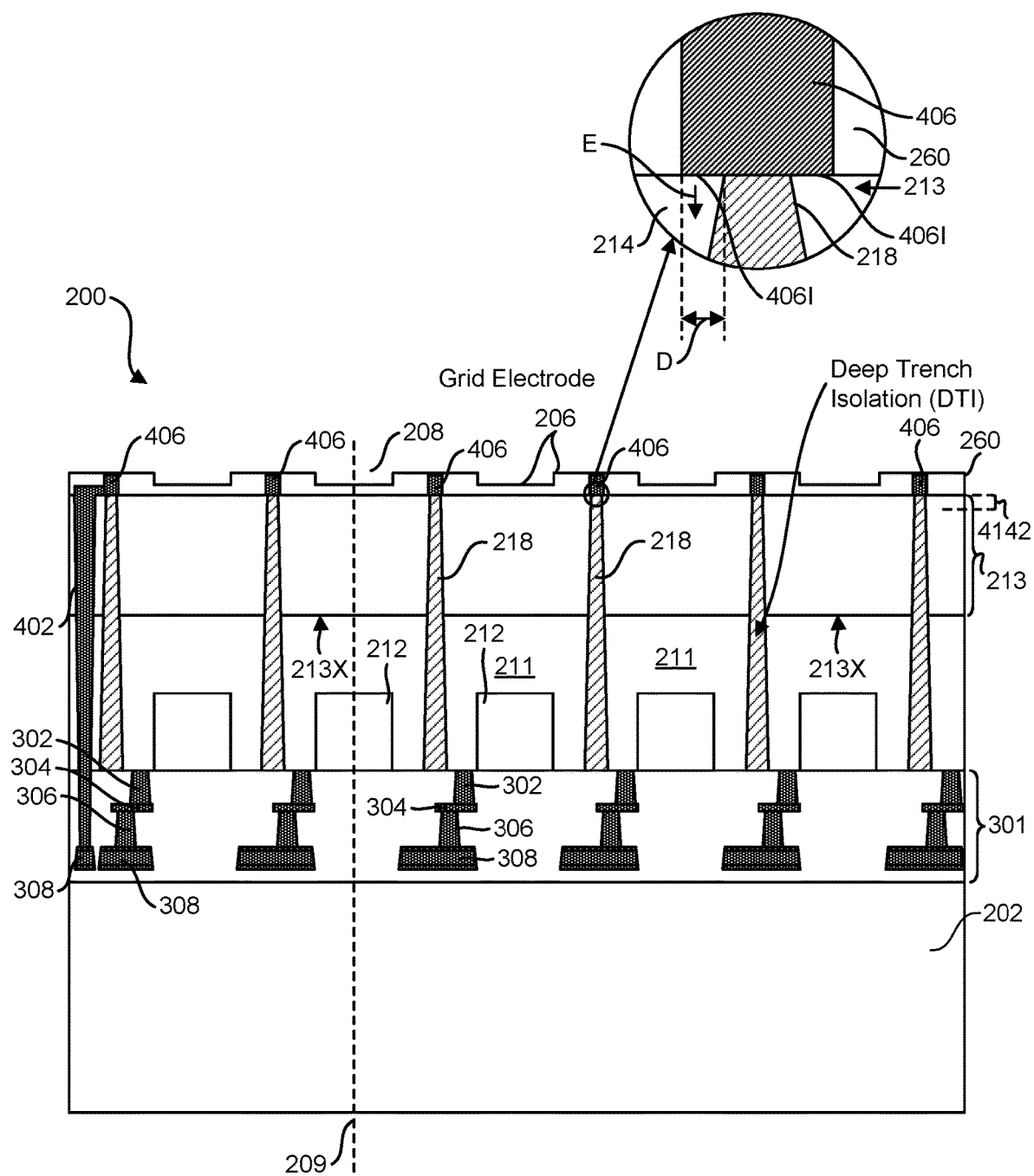
FIG. 10 is a schematic cutaway side view of a detector that includes a detector surface for supporting a biological or chemical sample according to one example.

Each of the described examples of detector 200 herein can include a dielectric stack 301, an example of which is shown in FIG. 10. Dielectric stack 301 can have fabricated therein one or more metallization layer 302, 304, 306, 308, which can define circuitry, e.g., for readout of signals from sensing photodiodes 212, digitization, storage and/or signal processing. In the example of FIG. 10, dielectric stack 301 can be formed on a frontside of semiconductor formation 211 using frontside fabrication processing and can be disposed between semiconductor formation 211 and substrate 202. In another example, dielectric stack 301 can be formed on a backside of semiconductor formation 211 using backside fabrication processing and can be disposed between semiconductor formation 211 and sample supporting structure 260 defining a detector surface 206.

Referring to FIG. 10, a grid 406 can be formed on a backside of the defined detector 200, or a frontside of the defined detector. Grid 406 can be formed, e.g., of W, Al, Cu or other metal and be electrically connected to a charge removal terminal (e.g., ground connection) with a charge removal conductor provided by through via 402 which through via 402 can extend entirely through the vertical elevations of semiconductor formation 211 and light separating structure 213. Through via 402 defining a charge removal path (e.g., ground path) as shown in the example of FIG. 10 can terminate at metallization layer 308 within dielectric stack 301, which metallization layer 308 in one example can define a charge removal terminal (e.g., ground connection). In one example, the charge removal conductor provided by through via 402 can extend vertically from metallization layer 308 to grid 406, which can be defined at an elevation of sample supporting structure 260. The described charge removal terminal defined by metallization layer 308, can be integrally fabricated within dielectric stack 301, which dielectric stack 301 can have fabricated therein one or more metallization layer 302, 304, 306, 308, which can define circuitry, e.g., for readout of signals from sensing photodiodes 212, digitization, storage and/or signal processing.

Examples herein recognize that the presence of dielectric barrier 215 as shown in FIG. 1B wherein light separating structure 213 includes semiconductor formation 214 and dielectric barrier 215 can block electrons from reaching sensing photodiodes 212, causing charges to build up within semiconductor formation 214, which electrical charges can increase system noise, and diminish performance of system 100. Grid 406 formed as shown can remove electrical charges from semiconductor formation 214 (FIG. 1B, FIG. 5A-8G) and improve performance of system 100.

In another aspect, grid 406 can be biased by application of a supply voltage to grid 406, e.g., a positive supply voltage or a negative supply voltage. Grid 406 can be biased with a positive supply voltage in the case that light separating structure 213 (which can comprise semiconductor formation 214 and dielectric barrier 215) is expected to include an excess of electrons. Grid 406 can be biased with a negative supply voltage in the case that light separating structure 213 is expected to include an excess of holes. Semiconductor formation 214 can be expected to include an excess of electrons where semiconductor formation 214 is n-doped, and semiconductor formation 214 can be expected to include an excess of holes where semiconductor formation 214 is p-doped. Biasing grid 406 with a positive supply voltage can produce an electric field, E, to cause drift of charges. Electric field, E, in the described example can push holes into semiconductor formation 214 and can attract electrons to remove electron charges via the described charge removal path defined by grid 406, a charge removal conductor provided by through via 402, and a charge removal terminal provided by metallization layer 308 integrated within dielectric stack 301. Biasing grid 406 with a negative supply voltage (e.g., a ground voltage) can produce an electric field, E, to cause drift of charges. Electric field, E, in the described example can push electrons into semiconductor formation 214 and can attract holes to remove hole charges via the described charge removal path defined by grid 406, a charge removal conductor provided by through via 402, and a charge removal terminal provided by metallization layer 308 integrated within dielectric stack 301.

Additional details are set forth in reference to the exploded view portion of FIG. 10. As described herein, light separating structure 213 can be provided in one example by a semiconductor formation 214 in combination with dielectric barrier 215. As shown the exploded view portion of FIG. 10, grid 406 can be in contact with semiconductor formation 214 at interface 4061. With voltage biasing of grid 406, grid 406 can generates electric field, E, to push charges into semiconductor formation 214, and to attract charges from semiconductor formation 214 for charge removal. Interface 4061 can extend a distance, D, from an outer perimeter of DTI formation 218, to an outer perimeter of the depicted portion of grid 406.

Shown as being provided at the elevation of sample supporting structure 260, grid 406 can alternatively be provided at an elevation of light separating structure 213 which can include semiconductor formation 214 in combination with dielectric barrier 215. In one example as set forth in reference to FIG. 10, material defining DTI formation 218 at elevation 4142 can be replaced with metal to define grid 406 that can define a charge removal path with a charge removal conductor provided by through via 402 and a charge removal terminal defined by metallization layer 308.

Through via 402 can be formed, e.g., of W, Al, Cu or other metal. Grid 406 can be configured to provide multiple functions. In one aspect, grid 406 can be configured to facilitate removal of electrical charge accumulated at the backside of detector 200 on or about sample supporting structure 260 and grid 406. In another aspect, grid 406, which can be opaque, can be configured to reduce optical cross talk between sample sites provided by adjacent nanowells 208. As shown, in FIG. 10, grid 406 according to one example, can have a depth (height) extending from a bottom elevation of support structure 260 defining detector surface 206 to a top elevation of sample supporting structure 260.

Figure 11:
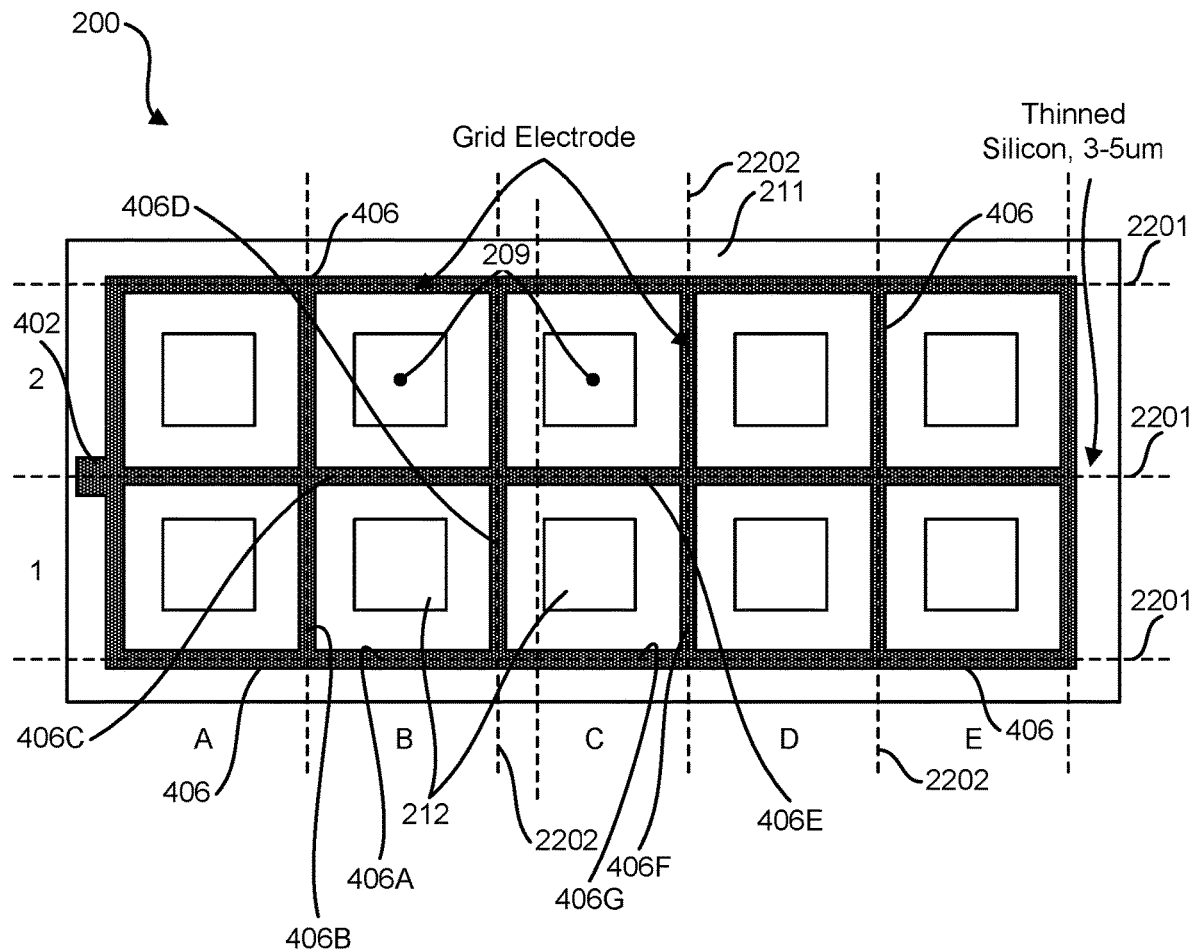
FIG. 11 is a schematic top multiple elevation view of a detector that includes a detector surface for supporting a biological or chemical sample according to one example.

FIG. 11 is a top multiple elevation view of detector 200 according to one example (grid 406 in the foreground depicted at the elevation of sample supporting structure 260 as depicted in FIG. 10). As shown in FIG. 11 together with FIG. 10, grid 406 according to one example can have grid segments as shown that completely encircle (360 degrees) each respective vertically extending central axis 209 (center axis) of detector 200. As explained throughout the views, each respective vertically extending center axis 209, can extend through one sensing photodiode 212 and one nanowell 208 according to one example, as well as one light separating structure region 213X. The arrangement shown in FIG. 11 together with FIG. 10, where grid 406 can include grid segments disposed between sample sites (e.g., reaction sites provided by nanowells) that completely encircle (360 degrees) each nanowell 208, can reduce cross talk between sample sites provided by the described reaction sites. In another example, grid 406 can be formed so that grid segments defining grid 406 do not completely encircle respective nanowells of nanowells 208. As shown in FIG. 10 and FIG. 11, grid 406 can have grid segments disposed so that elevations occupied by grid segments defining grid 406 overlap elevations occupied by nanowells 208. As shown in FIG. 10 and FIG. 11, nanowells 208 can be configured to that elevations occupied by nanowells 208 overlap elevations occupied by grid 406.

Each respective sensing photodiode 212 can have a pixel position, $P_X$, $P_Y$ which can be referenced as an X dimension position in combination with a Y dimension position, e.g., the pixel positions A1-F4 as depicted in FIG. 1D. Sample supporting structure 260, likewise, can be divided into pixel positions, wherein respective pixel positions of sample supporting structure 260 map to respective pixel positions of the array of sensing photodiodes 212. Like the pixel positions of the defined array of sensing photodiodes 212, the pixel positions of sample supporting structure 260 can be delimited by adjacent width dimension vertically extending planes 2201 adjacent depth dimension vertically extending planes 2202. As depicted in FIG. 11, vertically extending planes 2201 can extend through width dimension extending grid segments defining grid 406 and vertically extending planes 2202 can extend through depth dimension extending grid segments defining grid 406, which grid 406 can be defined at an elevation of sample supporting structure 260. The depicted pixel positions serve as pixel positions for reaction sites associated to respective sensing photodiodes 212, e.g., provided by nanowells 208 or alternate features formed on sample supporting structure 260 (e.g., as shown in FIG. 1A-1C). As depicted in FIG. 11, each pixel position A1-F4 at an elevation of sample supporting structure 260 (as shown in FIG. 10) can be delimited by a pair of adjacent width dimension extending grid segments of grid 406 and a pair of depth dimension extending grid segments of grid 406.

In reference to FIG. 11, there can be disposed at respective pixel positions A1-F2 of detector 200 one or more grid segment. For example, at pixel position B1 there can be disposed grid segments 406A, 406B, 406C and 406D. At pixel position C1, there can be disposed grid segments 406G, 406D, 406E, 406F. According to one example, there is set forth herein a device, wherein sensing photodiodes defining the array of sensing photodiodes are disposed at pixel positions of the device, wherein the device includes a charge removal path for removing electrical charges from light separating structure 213, wherein the charge removal path includes a conductive grid 406 provided by a metal grid having one or more grid segment 406A-406G disposed at respective ones of the pixel positions, e.g., B1, C1 (FIG. 11) of the device in contact with the light separating structure 213 (e.g., FIG. 1A, FIG. 10), a charge removal through via 402 electrically connected to the conductive grid 406 and extending through elevations of the light separating structure 413, and a metallization layer 308 electrically connected to the charge removal through via 402, wherein the metallization layer 308 is integrally formed within a dielectric stack 301 having integrally formed therein metallization defining readout circuitry for readout of signals from the array of sensing photodiodes, and wherein there is applied a voltage bias to the metal grid so that the metal grid produces an electric field, E, that attracts charges from the light separating structure 213.

Referring to FIG. 1A, 1D and FIG. 11, as highlighted by dashed line (FIG. 1D indicating foreground) grid 406 portion and nanowell 208 at pixel position A1 (which can be representative of all pixel positions) it will be seen that a portion of sample supporting structure 260 (support structure) having the pixel position $P_{X=m}$, $P_{Y=n}$ can include a reaction site provided by nanowell 208 that is disposed over and which is associated to and aligned to a certain sensing photodiode 212 of the defined pixel array having the common pixel position $P_{X=m}$, $P_{Y=n}$ (pixel position A1 in the described example). In the view of 1D in dashed view, there is shown a nanowell 208 disposed at representative pixel position A1 of pixel positions A1-F4, wherein one pixel position is defined for each respective sensing photodiode 212. In some examples, more than one reaction site can be associated to each sensing photodiode 212 and each pixel position. Respective light separating regions 213X throughout the examples can be associated to and aligned with respective sensing photodiodes 212 and can have pixel positions mapping to the pixel positions of their respective associated and aligned sensing photodiodes 212. At each pixel position, e.g., pixel position A1, B2, etc., as shown in FIG. 1D, a light separating structure region 213X defined at the elevation of light separating structure 213 (FIG. 1A) can be delimited by a pair of adjacent width dimension extending DTI formations 218 extending coextensive with vertically extending planes 2201 (FIG. 1D) and a pair of adjacent depth dimension extending DTI formations extending coextensive with vertically extending planes 2202 (FIG. 1D). Respective light separating regions 213X throughout the examples can be associated to and aligned with respective reaction sites which can be provided by nanowells 208 or another structure. In FIG. 1D there is depicted in dashed view at pixel position E1 (to indicate the different elevation) a representative light separating structure region 213X which can be representative of light separating structure region 213X at each pixel position of the depicted detector 200.

For alignment of respective ones of light separating structure regions 213X to respective ones of sensing photodiodes 212, associated light separating structure regions 213X and sensing photodiodes 212 can be arranged in one example to share a common vertically extending central axis 209, as shown in several of the views. In various shown examples, a vertically extending central axis 209 of an instance of sensing photodiode 212 can extend through light separating structure region 213X, and a vertically extending central axis 209 of an instance of light separating structure region 213X can extend through an instance of sensing photodiode 212. In one aspect of a sensing photodiode 212 being aligned to an associated light separating structure 213X sharing a common pixel position with the sensing photodiode 212, a vertically extending central axis 209 of the sensing photodiode 212 can extend through the associated light separating structure 213X. In one aspect of a light separating structure region 213X being aligned to an associated sensing photodiode sharing a common pixel position with the light separating structure region 213X, a vertically extending central axis 209 of the light separating structure region 213X can extend through the associated sensing photodiode. In one example, described sensing photodiode 212 and light separating structure region 213X can share a common vertically extending central axes 209. In various examples there can be disposed at each respective pixel position of detector 200 a reaction site which can be defined by a nanowell 208. In one aspect of a sensing photodiode 212 being aligned to a reaction site provided by a nanowell 208 sharing a common pixel position with the sensing photodiode 212, a vertically extending central axis 209 of the sensing photodiode 212 can extend through the reaction site provided by a nanowell 208 (e.g., as shown in FIG. 1). In one aspect of a light separating structure region 213X being aligned to an associated reaction site provided by a nanowell 208 sharing a common pixel position with the light separating structure region 213X, a vertically extending central axis 209 of the light separating structure region 213X can extend through the reaction site provided by a nanowell 208. In one aspect of a reaction site provided by a nanowell 208 being aligned to sensing photodiode 212 and a reaction structure region 213X sharing a common pixel position with the reaction site provided by a nanowell 208, a vertically extending central axis 209 of the reaction site provided by a nanowell 208 (e.g., as shown in FIG. 1A-1D and FIG. 11) can extend through the sensing photodiode 212 and a reaction structure region 213X. In one example, the described sensing photodiode 212, light separating structure region 213X and reaction site provided by a nanowell 208 can share a common vertically extending central axes 209.

As indicated by the taper of DTI formations 218 in FIG. 10, FIG. 10 depicts an example in which frontside fabrication processing can be used to form DTI formations 218 prior to any flipping of detector 200 in an intermediary stage of fabrication for performance of backside fabrication processing. Alternatively, backside fabrication processing can be used for the fabrication of DTI formations 218 as indicated by the taper of DTI formations 218 as shown, e.g. in FIGS. 5D, and 9E. In the example shown in FIG. 10, frontside fabrication processing can be used to form dielectric stack 301 prior to any flipping of detector 200 in an intermediary stage of fabrication for performance of backside fabrication processing. Alternatively backside fabrication processing can be used for the fabrication of dielectric stack 301.

Reactions sites shown as being provided by nanowells 208 throughout the views can alternatively be defined by alternative features. The alternative features can comprise, e.g., structural feature variations and/or variations in chemical composition. Structural features defining structural feature variations can form an array in or on sample supporting structure 260. Exemplary structural features can include, but are not limited to, nanowells as set forth herein, posts, pads, ridges, channels, and/or layers of a multilayer material. A feature can have characteristics such as size (e.g., volume, diameter, and depth), shape (e.g., round, elliptical, triangular, square, polygonal, star shaped (having any suitable number of vertices), irregular, or having concentric features separated by a dielectric material), and distribution (e.g., spatial locations of the features within the dielectric material, e.g., regularly spaced or periodic locations, or irregularly spaced or aperiodic locations). The cross section of a feature can be, but need not necessarily be, uniform along the length of the feature.

In reference again to FIG. 1A, system 100 can include processing circuitry 310. Processing circuitry 310 can include, according to one example, one or more processors 3101, memory 3102, and one or more input/output interface 3103. One or more processors 3101, memory 3102 and one or more input/output interface can be connected via system bus 3104. Memory 3102 can include a combination of system memory and storage memory. Memory 3102, according to one example, can store one or more programs for facilitating processes that are set forth herein. One or more processors 3101 can run one or more programs stored in memory 3102 to facilitate processes as is set forth herein. Memory 3102 can define a computer readable medium.

A DNA sequencing process facilitated by light energy exciter 10 is described with reference to FIGS. 1A, 2 and 12. Referring to FIG. 2, there is shown a spectral profile coordination diagram illustrating aspects of the operation of system 100. According to one example, light energy exciter 10 can be configured to radiate excitation light at first and second different wavelengths. As set forth herein, providing excitation light 101 at first and second different wavelength ranges facilitates dye chemistry DNA sequence reconstruction processes in which first and second dyes can be disposed in fluid within flow cell 282.

In the spectral profile coordination diagram of FIG. 2, spectral profile 1101 shown as a green light spectral profile is the spectral profile of excitation light 101 as emitted by light energy exciter 10. Spectral profile 1501 is the spectral profile of the emission light 501 caused by the fluorescence of a fluorophore on being excited by excitation light 101. Spectral profile 1220 is the transmission profile (detection band) of sensing photodiodes 212, according to one example. It will be understood that the spectral profile coordination diagram of FIG. 2 is intended to represent general features common to some examples, but that variations of the indicated spectral profiles are common.

In one aspect, excitation light 101 can commonly include, in addition to a green light spectral profile, a blue light spectral profile (not shown) wherein system 100 is switchable between modes in which (a) the green light spectral profile is active with the blue light spectral profile being inactive, and (b) the blue light spectral profile is active with the green light spectral profile being inactive. In other examples, there can be different combinations of excitation light 101 and emission light 501. In one example, the spectral profile 1101 of excitation light 101 can feature a center wavelength in the blue light wavelength range and the spectral profile of emission light 501 can feature a center wavelength in the green wavelength range.

Examples herein recognize in reference to the spectral profile coordination diagram of FIG. 2 that processing circuitry 310 can be configured to (a) determine that the first fluorophore is attached to a sample 502 (FIG. 1) based on fluorescence being sensed by a sensing photodiode 212 under excitation restricted to excitation by one or more green emitting light sources and fluorescence not being sensed by the sensing photodiode 212 under excitation restricted to excitation by one or more blue emitting light source; (b) determine that the second fluorophore is attached to a sample 502 based on fluorescence being sensed by a sensing photodiode 212 under excitation restricted to excitation by one or more blue emitting light sources and fluorescence not being sensed by the sensing photodiode 212 under excitation restricted to excitation by one or more green emitting light sources; and (c) determine that the third fluorophore is attached to a sample 502 based on fluorescence being sensed by a sensing photodiode 212 under excitation restricted to excitation by one or more green emitting light sources and fluorescence also being sensed by the sensing photodiode 212 under excitation restricted to excitation by one or more blue emitting light sources. Processing circuitry 310 can discriminate which fluorophores have attached to samples, and can determine nucleotide types, e.g., A, C, T, and G that are present in a fragment of a DNA strand providing a sample 502, e.g., using a decision logic data structure indicated by the decision logic table of Table C mapping fluorophore presence to nucleotide type, where discriminated nucleotides Nucleotide1-Nucleotide4 are nucleotides of the nucleotide types A, C, T and G (the particular mapping based on the test setup parameters).

TABLE C

| Detected fluorescence under excitation restricted to excitation by one or more green emitting light sources | Detected fluorescence under excitation restricted to excitation by one or more blue emitting light sources | Fluorophore presence indicated | Nucleotide indicated |
|---|---|---|---|
| YES | NO | first Fluorophore | Nucleotide1 |
| NO | YES | second Fluorophore | Nucleotide2 |
| YES | YES | third Fluorophore | Nucleotide3 |
| NO | NO | — | Nucleotide4 |

Processing circuitry 310 can run a process in support of DNA sequence reconstruction in a plurality of cycles. In each cycle, a different portion of a DNA fragment can be subject to sequencing processing to determine a nucleotide type, e.g. A, C, T, or G, associated to the fragment, e.g., using a decision data structure such as a decision data structure as set forth in Table C. Aspects of a process which can be run by processing circuitry 310 for use in performing DNA sequence reconstruction using light energy exciter 10 is described in the flowchart of FIG. 12.

At block 1802 processing circuitry 310 can clear flow cell 282, meaning processing circuitry 310 can remove fluid from flow cell 282 used during a prior cycle. At block 1804, processing circuitry 310 can input into flow cell 282 fluid having multiple fluorophores, e.g., first and second fluorophores, or first, second and third fluorophores.

At block 1806, processing circuitry 310 can read out signals from sensing photodiode 212 exposed with a first wavelength range excitation light. At block 1806, processing circuitry 310 can control light energy exciter 10 so that during an exposure period of sensing photodiode 212 light energy exciter 10 emits excitation light restricted excitation by one or more green light sources. At block 1806, processing circuitry 310 can during an exposure period of sensing photodiode 212 energize each one or more green emitting light sources of light energy exciter 10, while maintaining in a deenergized state each one or more blue emitting light sources of light energy exciter 10. With the light energy exciter 10 being controlled as described so that green light sources are on and blue light sources are off during an exposure period of sensing photodiode 212, processing circuitry 310 at block 1806 can read out first signals from sensing photodiode 212 exposed with excitation restricted to excitation by one or more green light sources as set forth herein.

At block 1808, processing circuitry 310 can read out signals from sensing photodiode 212 exposed with a second wavelength range excitation light. At block 1808, processing circuitry 310 can control light energy exciter 10 so that during an exposure period of the array of sensing photodiode 212 light energy exciter 10 emits excitation light restricted to excitation by one or more blue light sources of light energy exciter 10. At block 1808, processing circuitry 310 can during an exposure period of an array of sensing photodiodes 212 energize each of one or more blue emitting light sources of light energy exciter 10, while maintaining in a deenergized state each one or more green emitting light sources of light energy exciter 10. With the light energy exciter 10 being controlled as described so that blue light sources are on and green light sources are off during an exposure period of sensing photodiodes 212, processing circuitry 310 at block 1808 can read out second signals from sensing photodiodes 212 exposed with excitation restricted to excitation by one or more blue light sources as set forth herein. In each of the described exposure periods of the array of sensing photodiodes 212 according to one example, light energy exciter 10 can commonly and simultaneously radiate with excitation light 101 substantially all reaction sites, e.g., substantially all nanowells 208 of detector 200. Light energy exciter 10 can be configured to commonly excite substantially all nanowells 208 of detector 200 simultaneously at a common time. "Substantially all" herein includes and encompasses the instance of "literally all".

At block 1810 processing circuitry 310 for the current cycle can process the first signals read out at block 1806 and the second signals read out at block 1808 to determine a nucleotide type of the DNA fragment being subject to testing during the current cycle, e.g., using a decision data structure as set forth in Table C according to one example. Processing circuitry 310 can perform the described nucleotide identification process described with reference to the flowchart of FIG. 12 for each cycle of the DNA sequencing process until nucleotide identification is performed for each scheduled cycle.

Processing circuitry 310 can be configured to perform a wide range of tests for testing operation of the system 100. Processing circuitry 310 can perform a calibration test in which operation of light energy exciter 10 and detector 200 is tested. In such an example processing circuitry 310 can be configured to selectively energize different light sources during exposure periods of the array of sensing photodiodes 212 and can examine signals read out of pixel array of sensing photodiodes during the exposure periods. A method can include selectively energizing a first light source (e.g. green emitting) during a first exposure period of the array of sensing photodiodes with second (blue emitting) and third (e.g. red emitting) light sources maintained in a deenergized state, selectively energizing the second light source during a second exposure period of the array of sensing photodiodes with the first and third light sources maintained in a deenergized state, and selectively energizing the third light source during a third exposure period of the array of sensing photodiodes with the first and second light sources maintained in a deenergized state.

Now referring again to FIG. 5E, another example of detector 200 is shown, in connection with the section labeled "ALTERNATIVE". In the example of FIG. 5E, light separating structure regions 213X can be configured to have first and second dielectric barrier depths. A first set of light separating structure regions 213X can have dielectric barrier depths defined at relatively deeper elevation 1022 and the second set of light separating structure regions 213X can have dielectric barrier depths (defined by the elevation of dielectric barrier 215 which can have different and varying elevations in the alternative example) at relatively shallower elevation 1024. Dielectric barrier 215 at the deeper elevation 1022 can be optimized for separating excitation light 101 of relatively longer wavelengths (e.g., green light) while optimizing emission light absorption below the elevation 1022, and the dielectric barrier 215 at shallower elevation 1024 can be optimized for separating excitation light 101 of relatively shorter wavelengths (e.g., blue light) while optimizing emission light absorption below the elevation 1024. In one aspect, where dielectric barrier 215 includes a range of depths as shown in FIG. 5E, the range of depths, e.g., the range on depths between deeper elevation 1022 and shallower elevation 1024 can be selected in dependence on range of wavelengths of excitation light 101 targeted for separation, e.g., the range of wavelengths spanning green light (which dielectric barrier 215 at deeper elevation 1022 can be configured to separate) to blue light (which dielectric barrier 215 at shallower elevation 1024 can be configured to separate). Accordingly, in one example, the structure comprising semiconductor formation 214 and dielectric barrier 215 can be dimensioned to feature multiple different dielectric barrier depths, wherein a range of dielectric barrier depths defined by the multiple different barrier depths is selected in dependence on a range of excitation wavelengths targeted for separation. Light energy exciter 10 in the example of FIG. 5E (alternative) can be configured to selectively direct excitation photons to respective ones of reaction sites provided by nanowells 208 at first and second different times. For example, nanowell 208 can be irradiated at a first time with any suitable number of laser beams that interfere with one another in such a manner as to generate a first optical intensity pattern of a first wavelength that selectively excites a first set of nanowells 208 associated to the first set of light separating structure regions 213X at the first time, and can be irradiated at a second time with any suitable number of laser beams that interfere with one another in such a manner as to generate a second optical intensity pattern of a second wavelength that selectively excites a second set of nanowells 208 associated to the second set of light separating structure regions 213X at the second time. Light energy exciter 10 in the example of FIG. 5E (alternative), can alternatively be configured to commonly excite substantially all nanowells 208 of detector 200 simultaneously at a common time. "Substantially all" herein includes and encompasses the instance of "literally all". FIG. 5E (alternative) depicts a pattern wherein light separating structure regions 213X at adjacent pixel positions (FIG. 1D) have alternating depths of a first deeper depth and a second shallower depth. The same pattern can be repeated in the depth dimension so that the light separating structure regions 213X at each pixel position, e.g., C2, FIG. 1D, has neighboring light separating structure regions 213X at four corner adjacent pixel positions (e.g., B1, B3, D3, and D1 relative to C2) with a common depth (e.g. all deeper or all shallower), and neighboring light separating structure regions 213X at four side adjacent pixel positions (e.g., C1, B2, C3, D2 relative to C2) with a different depth relative to its own depth.

A small sample of devices and methods set forth herein include the following: (A1) A device comprising: a detector surface; an array of sensing photodiodes formed in a semiconductor formation, wherein the semiconductor formation receives light from the detector surface; a light separating structure intermediate the detector surface and a sensing photodiode of the array of sensing photodiodes; and wherein the light separating structure is configured to preferentially transmit photons of emission light relative to photons of excitation light. (A2) The device of (A1), wherein the light separating structure comprises a second semiconductor formation that absorbs photons of the excitation light and the emission light, and a dielectric barrier that blocks electrons generated from photon absorption in the second semiconductor formation from reaching a sensing photodiode of the array of sensing photodiodes. (A3) The device of any of (A1), wherein the light separating structure comprises a second semiconductor formation and a dielectric barrier, the second semiconductor formation comprising inorganic semiconductor material. (A4) The device of any of (A1) through (A3), wherein the light separating structure comprises material which facilitates photon absorption and travel of electrons within an inorganic semiconductor material formation. (A5) The device of any of (A1) through (A4), wherein the light separating structure comprises a material formation that absorbs photons of the excitation light and the emission light, and a dielectric barrier that blocks electrons generated from photon absorption in the material formation from reaching a sensing photodiode of the array of sensing photodiodes, wherein the material formation is absent of organic light filter material. (A6) The device of any of (A1) through (A2), wherein the light separating structure comprises inorganic semiconductor material. (A7) The device of any of (A1) through (A3), wherein the light separating structure is absent of organic filter material. (A8) The device of (A1), wherein the light separating structure comprises an interference reflector, the interference reflector having alternating layers of a first material, and a second material, the second material having a higher index of refraction than the first material. (A9) The device of any of (A1) through (A8), wherein the device comprises a conductive grid having grid segments disposed between sample sites of the detector surface, and a vertically extending through via connected to the conductive grid, the vertically extending through via extending through elevations of the light separating structure. (A10) The device of any of (A1) through (A8), wherein the device includes a charge removal path for removing electrical charges from the light separating structure. (A11) The device of any of (A1) through (A8), wherein sensing photodiodes defining the array of sensing photodiodes are disposed at pixel positions of the device, wherein the device includes a charge removal path for removing electrical charges from the light separating structure, wherein the charge removal path includes a conductive grid having one or more grid segment disposed at respective ones of the pixel positions of the device. (A12) The device of any of (A1) through (A8), wherein sensing photodiodes defining the array of sensing photodiodes are disposed at pixel positions of the device, wherein the device includes a charge removal path for removing electrical charges from the light separating structure, wherein the charge removal path includes a conductive grid having one or more grid segment in contact with the light separating structure disposed at respective ones of the pixel positions of the device. (A13) The device of any of (A1) through (A8), wherein sensing photodiodes defining the array of sensing photodiodes are disposed at pixel positions of the device, wherein the device includes a charge removal path for removing electrical charges from the light separating structure, wherein the charge removal path includes a conductive grid having one or more grid segment disposed at respective ones of the pixel positions of the device, and wherein there is applied a voltage bias to the conductive grid so that the conductive grid produces and electric field that attracts charges from the light separating structure. (A14) The device of any of (A1) through (A8), wherein sensing photodiodes defining the array of sensing photodiodes are disposed at pixel positions of the device, wherein the device includes a charge removal path for removing electrical charges from the light separating structure, wherein the charge removal path includes a metal grid having one or more grid segment disposed at respective ones of the pixel positions of the device in contact with the light separating structure, a charge removal through via electrically connected to the metal grid and extending through elevations of the light separating structure, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the light separating structure. (A15) The device of any of (A1) through (A3), and (A8), wherein sensing photodiodes defining the array of sensing photodiodes are disposed at pixel positions of the device, wherein the device includes a charge removal path for removing electrical charges from the light separating structure, wherein the charge removal path includes a conductive grid having one or more grid segment disposed at respective ones of the pixel positions of the device. (16) The device of any of (A1) through (A3), and (A8), wherein sensing photodiodes defining the array of sensing photodiodes are disposed at pixel positions of the device, wherein the device includes a charge removal path for removing electrical charges from the light separating structure, wherein the charge removal path includes a metal grid having one or more grid segment in contact with the light separating structure disposed at respective ones of the pixel positions of the device, a charge removal through via electrically connected to the metal grid and extending through elevations of the light separating structure, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the light separating structure. (B1) A device comprising: a detector surface; an array of sensing photodiodes formed in a semiconductor formation, wherein the semiconductor formation receives light from the detector surface; a structure intermediate the detector surface and a sensing photodiode of the array of sensing photodiodes, wherein the structure comprises a second semiconductor formation that absorbs photons of light, and a dielectric barrier that blocks electrons generated from photon absorption in the second semiconductor formation from reaching a sensing photodiode of the array of sensing photodiodes. (B2) The device of (B1), wherein the second semiconductor formation comprises inorganic semiconductor material. (B3) The device of any of (B1) through (B2), wherein the second semiconductor formation comprises inorganic semiconductor material differentiated from a material of the semiconductor formation. (B4) The device of any of (B1) through (B3), wherein semiconductor formation comprises silicon, and wherein the second semiconductor formation comprises inorganic semiconductor material selected from the group consisting of Si, a-Si, Ge, and CdS. (B5) The device of any of (B1) through (B4), wherein the semiconductor formation is defined by material of a silicon layer of a silicon on insulator (SOI) wafer, wherein the second semiconductor formation is defined by material of a bulk silicon substrate of the SOI wafer, and wherein the dielectric barrier is defined by material of an insulator of the SOI wafer. (B6) The device of any of (B1) through (B5), wherein the structure comprising the second semiconductor formation that absorbs photons of excitation light and emission light, and the dielectric barrier has a dielectric barrier depth greater than an absorption depth of a center wavelength of the excitation light. (B7) The device of any of (B1) through (B6), wherein the structure comprising the second semiconductor formation that absorbs photons of excitation light and emission light, and the dielectric barrier has a dielectric barrier depth less than an absorption depth of a center wavelength of the emission light. (B8) The device of any of (B1) through (B7), wherein the structure comprising the second semiconductor formation that absorbs photons of excitation light and emission light, and the dielectric barrier has a dielectric barrier depth greater than an absorption depth of a center wavelength of the excitation light, and wherein the structure comprising the second semiconductor formation that absorbs photons of the excitation light and the emission light, and the dielectric barrier has a dielectric barrier depth less than an absorption depth of a center wavelength of the emission light. (B9) The device of any of (B1) through (B8), wherein the structure comprising the second semiconductor formation that absorbs photons of excitation light and emission light, and the dielectric barrier has a dielectric barrier depth configured so that a percentage of photons at a center wavelength of the emission light absorbed at elevations of the semiconductor formation below the dielectric barrier depth is about 2× or more than a percentage of photons at a center wavelength of the excitation light absorbed at elevations of the semiconductor formation below the dielectric barrier depth. (B10) The device of any of (B1) through (B9), wherein the structure comprising the second semiconductor formation that absorbs photons of excitation light and emission light, and the dielectric barrier has a dielectric barrier depth configured so that a percentage of photons at a center wavelength of the emission light absorbed at elevations of the semiconductor formation below the dielectric barrier depth is about 20× or more than a percentage of photons at a center wavelength of the excitation light absorbed at elevations of the semiconductor formation below the dielectric barrier depth. (B11) The device of any of (B1) through (B10), wherein the structure comprising the second semiconductor formation that absorbs photons of excitation light and emission light, and the dielectric barrier has a dielectric barrier depth configured so that a percentage of photons at a center wavelength of the emission light absorbed at elevations of the semiconductor formation below the dielectric barrier depth is about 50× or more than a percentage of photons at a center wavelength of the excitation light absorbed at elevations of the semiconductor formation below the dielectric barrier depth. (B12) The device of any of (B1) through (B11), wherein the structure comprising the second semiconductor formation and the dielectric barrier is dimensioned to feature a dielectric barrier depth longer than an absorption depth of light in the blue wavelength band, the dielectric barrier depth being shorter than an absorption depth of light in the red wavelength band. (B13) The device of any of (B1) through (B12), wherein the structure comprising the second semiconductor formation and the dielectric barrier is dimensioned to feature a dielectric barrier depth longer than an absorption depth of light in the green wavelength band, the dielectric barrier depth being shorter than an absorption depth of light in the red wavelength band. (B14) The device of any of (B1) through (B13), wherein the structure comprising the second semiconductor formation and the dielectric barrier is dimensioned so that an absorption depth of photons of excitation light of a first wavelength is less than a dielectric barrier depth of the dielectric barrier. (B15) The device of any of (B1) through (B14), wherein the structure comprising the second semiconductor formation and the dielectric barrier is dimensioned so that a first set of light separating structure regions have a first dielectric barrier depth, and a second set of light separating structure regions have a second dielectric barrier depth, the second dielectric barrier depth being less than the first barrier depth. (B16) The device of any of (B1) through (B15), wherein the second semiconductor formation has a thickness of from about 1 nm to about 50.0 um, and wherein the dielectric barrier has a thickness of from about 1.0 nm to about 1000 nm. (B17) The device of any of (B1) through (B16), wherein the device comprises vertically extending deep trench isolation formations separating the structure having the second semiconductor formation and the dielectric barrier into light separating structure regions, wherein respective ones of the light separating structure regions are associated to one sensing photodiode of the array of sensing photodiodes. (B18) The device of any of (B1) through (B17), wherein the structure having the second semiconductor formation and the dielectric barrier has a dielectric barrier depth less than an absorption depth of a center wavelength of emission light. (B19) The device of any of (B1) through (B18), wherein the structure having the second semiconductor formation and the dielectric barrier has a dielectric barrier depth greater than an absorption depth of a center wavelength of excitation light, and wherein the structure having the second semiconductor formation and the dielectric barrier has a dielectric barrier depth less than an absorption depth of a center wavelength of emission light. (B20) The device of any of (B1) through (B18), wherein the device comprises a conductive grid having grid segments disposed between sample sites of the detector surface, and a charge removal conductor connected to the conductive grid, the charge removal conductor extending through the semiconductor formation. (B21) The device of any of (B1) through (B18), wherein the device includes a charge removal path for removing electrical charges from the second semiconductor formation. (B22) The device of any of (B1) through (B18), wherein sensing photodiodes defining the array of sensing photodiodes are disposed at pixel positions of the device, wherein the device includes a charge removal path for removing electrical charges from the second semiconductor formation, wherein the charge removal path includes a conductive grid having one or more grid segment disposed at respective ones of the pixel positions of the device. (B23) The device of any of (B1) through (B18), wherein sensing photodiodes defining the array of sensing photodiodes are disposed at pixel positions of the device, wherein the device includes a charge removal path for removing electrical charges from the second semiconductor formation, wherein the charge removal path includes a conductive grid having one or more grid segment in contact with the second semiconductor formation disposed at respective ones of the pixel positions of the device. (B24) The device of any of (B1) through (B18), wherein sensing photodiodes defining the array of sensing photodiodes are disposed at pixel positions of the device, wherein the device includes a charge removal path for removing electrical charges from the second semiconductor formation, wherein the charge removal path includes a conductive grid having one or more grid segment disposed at respective ones of the pixel positions of the device, and wherein there is applied a voltage bias to the conductive grid so that the conductive grid produces and electric field that attracts charges from the second semiconductor formation. (B25) The device of any of (B1) through (B18), wherein sensing photodiodes defining the array of sensing photodiodes are disposed at pixel positions of the device, wherein the device includes a charge removal path for removing electrical charges from the second semiconductor formation, wherein the charge removal path includes a metal grid having one or more grid segment in contact with the second semiconductor formation disposed at respective ones of the pixel positions of the device, a charge removal through via electrically connected to the metal grid and extending through elevations of the second semiconductor formation, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the second semiconductor formation. (B26) The device of any of (B1) through (B2), wherein the structure comprising the second semiconductor formation that absorbs photons of excitation light and emission light, and the dielectric barrier has a dielectric barrier depth greater than an absorption depth of a center wavelength of the excitation light, and wherein the structure comprising the second semiconductor formation that absorbs photons of the excitation light and the emission light, and the dielectric barrier has a dielectric barrier depth less than an absorption depth of a center wavelength of the emission light. (B27) The device of any of (B1) through (B2), wherein the structure comprising the second semiconductor formation that absorbs photons of excitation light and emission light, and the dielectric barrier has a dielectric barrier depth configured so that a percentage of photons at a center wavelength of the emission light absorbed at elevations of the semiconductor formation below the dielectric barrier depth is about 20× or more than a percentage of photons at a center wavelength of the excitation light absorbed at elevations of the semiconductor formation below the dielectric barrier depth. (B28) The device of any of (B1) through (B2), wherein the structure comprising the second semiconductor formation and the dielectric barrier is dimensioned so that a first set of light separating structure regions have a first dielectric barrier depth, and a second set of light separating structure regions have a second dielectric barrier depth, the second dielectric barrier depth barrier depth being less than the first dielectric barrier depth. (B29) The device of any of (B1) through (B2), wherein the device comprises vertically extending deep trench isolation formations separating the structure having the second semiconductor formation and the dielectric barrier into light separating structure regions, wherein respective ones of the light separating structure regions are associated to one sensing photodiode of the array of sensing photodiodes. (B30) The device of any of (B1) through (B2), wherein the structure having the second semiconductor formation and the dielectric barrier has a dielectric barrier depth greater than an absorption depth of a center wavelength of excitation light, and wherein the structure having the second semiconductor formation and the dielectric barrier has a dielectric barrier depth less than an absorption depth of a center wavelength of emission light. (B31) The device of any of (B1) through (B2), wherein sensing photodiodes defining the array of sensing photodiodes are disposed at pixel positions of the device, wherein the device includes a charge removal path for removing electrical charges from the second semiconductor formation, wherein the charge removal path includes a conductive grid having one or more grid segment in contact with the second semiconductor formation disposed at respective ones of the pixel positions of the device. (B32) The device of any of claims (B1) through B2), having nanowells defined at the detector surface, wherein sensing photodiodes defining the array of sensing photodiodes are disposed at pixel positions of the device, wherein the device includes a charge removal path for removing electrical charges from the second semiconductor formation, wherein the charge removal path includes a metal grid having one or more grid segment in contact with the second semiconductor formation disposed at respective ones of the pixel positions of the device and occupying elevations overlapping elevations occupied by the nanowells, a charge removal through via electrically connected to the metal grid and extending through elevations of the second semiconductor formation, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the second semiconductor formation. (C1) A device comprising: a detector surface; an array of sensing photodiodes formed in a semiconductor formation, wherein the semiconductor formation receives light from the detector surface; and a structure intermediate the detector surface and a sensing photodiode of the array of sensing photodiodes, wherein the structure comprises alternating layers of a first material and a second material, the second material having a higher index of refraction than the first material, wherein the structure preferentially transmits photons of emission light relative to photons of excitation light. (C2) The device of (C1), wherein the alternating layers of the first material and the second material define an interference reflector. (C3) The device of (C2), wherein the alternating layers of the first material and the second material define an interference reflector, and wherein the alternating layers of the first material and the second material are provided by alternating layers of a dielectric material and a semiconductor material. (D1) A method comprising: forming in a semiconductor formation an array of sensing photodiodes; forming an array of light separating structure regions, wherein respective light separating structure regions of the array of light separating structure regions are associated to respective sensing photodiodes of the array of sensing photodiodes; and forming a detector surface, wherein the semiconductor formation is configured to receive excitation light and emission light from the detector surface; wherein the respective light separating structure regions are formed in a receive light path of the excitation light and emission light from the detector surface. (D2) The method of (D1), wherein the respective light separating structure regions are formed in a receive light path of the excitation light and emission light from the detector surface intermediate of the detector surface and the array of sensing photodiodes. (D3) The method of any of (D1) through (D2), wherein the forming in the semiconductor formation the array of sensing photodiodes includes performing fabrication processing of a silicon layer of an SOI wafer, and wherein the forming an array of light separating structure regions includes performing fabrication processing of an insulator layer of the SOI wafer. (D4) The method of any of claims (D1) through (D3), wherein forming in the semiconductor formation the array of sensing photodiodes includes performing fabrication processing of a silicon layer of an SOI wafer, and wherein the forming an array of light separating structure regions includes performing fabrication processing of a bulk substrate of the SOI wafer. (D5) The method of any of (D1) through (D4), wherein forming in the semiconductor formation the array of sensing photodiodes includes performing fabrication processing of a silicon layer of an SOI wafer, and wherein the forming an array of light separating structure regions includes performing fabrication processing of an insulator layer and a bulk substrate of the SOI wafer. (D6) The method of any of (D1) through (D5), wherein the forming the array of light separating structure regions includes bonding above the semiconductor formation, a second semiconductor formation. (D7) The method of any of (D1) through (D6), wherein the forming the array of light separating structure regions includes bonding above the semiconductor formation, a second semiconductor formation, the second semiconductor formation comprising a semiconductor material different than a semiconductor material of the semiconductor formation. (D8) The method of any of (D1) through (D7), wherein the forming the array of light separating structure regions includes depositing above the semiconductor formation, a second semiconductor formation. (D9) The method of any of (D1) through (D8), wherein the forming the array of light separating structure regions includes depositing above the semiconductor formation, a second semiconductor formation, the second semiconductor formation comprising a semiconductor material different than a semiconductor material of the semiconductor formation. (D10) The method of any of (D1) through (D9), wherein the forming the array of light separating structure regions includes depositing above the semiconductor formation, alternating layers of first material and second material, the alternating layers of first material and second material having different indices of refraction, the alternating layers of first material and second material defining an interference reflector. (D11) The method of any of (D1) through (D10), wherein the forming the array of light separating structure regions includes providing a second semiconductor formation, and wherein method includes using frontside fabrication processing to form deep trench isolation trenches extending through second semiconductor formation, and the semiconductor formation, and filling the deep trench isolation trenches to form deep trench isolation formations that define light separating structure regions of the array of light separating structure regions. (D12) The method of any of (D1) through (D11), wherein the forming the array of light separating structure regions includes providing a second semiconductor formation, and wherein method includes using frontside fabrication processing to form first deep trench isolation trenches extending through the semiconductor formation and filling the first deep trench isolation trenches to form first partial deep trench isolation formations, and wherein method includes using backside fabrication processing to form second deep trench isolation trenches extending through the second semiconductor formation and filling the second deep trench isolation trenches to form second partial deep trench isolation formations, the second partial deep trench isolation formations defining light separating structure regions of the array of light separating structure regions. (D13) The method of any of (D1) through (D12), wherein the forming the array of light separating structure regions includes bonding above the semiconductor formation, a second semiconductor formation. (D14) The method of any of (D1) through (D13), wherein sensing photodiodes defining the array of sensing photodiodes are disposed at pixel positions, wherein the method includes forming a charge removal path for removing electrical charges from the light separating structure, wherein the charge removal path includes a conductive grid having one or more grid segment disposed at respective ones of the pixel positions. (D15) The method of any of (D1) through (D14), wherein sensing photodiodes defining the array of sensing photodiodes are disposed at pixel positions, wherein the method includes providing a charge removal path for removing electrical charges from the light separating structure, wherein the charge removal path includes a metal grid having one or more grid segment in contact with the light separating structure disposed at respective ones of the pixel positions, a charge removal through via electrically connected to the metal grid and extending through elevations of the light separating structure, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the light separating structure. (E1) A method comprising: forming in a semiconductor formation an array of sensing photodiodes; forming a structure having a dielectric barrier and a second semiconductor formation, and forming a detector surface, wherein the semiconductor formation is configured to receive excitation light and emission light from the detector surface; wherein the structure having the dielectric barrier and the second semiconductor formation is formed in a receive light path of the excitation light and emission light from the detector surface. (E2) The method of (E1), wherein the structure having the dielectric barrier and the second semiconductor formation is formed in a receive light path of the excitation light and emission light from the detector surface intermediate of the detector surface and the array of sensing photodiodes. (E3) The method of any of (E1) through (E2), wherein the structure is configured so that photons absorbed in the second semiconductor formation generate electrons blocked from reaching the array of sensing photodiodes by the dielectric barrier. (E4) The method of any of (E1) through (E3), wherein the forming in the semiconductor formation the array of sensing photodiodes includes performing fabrication processing of a silicon layer of an SOI wafer, and wherein the forming an array of light separating structure regions includes performing fabrication processing of an insulator layer of the SOI wafer. (E5) The method of any of (E1) through (E4), wherein forming in the semiconductor formation the array of sensing photodiodes includes performing fabrication processing of a silicon layer of an SOI wafer, and wherein the forming an array of light separating structure regions includes performing fabrication processing of aa bulk substrate of the SOT wafer. (E6) The method of any of (E1) through (E5), wherein forming in the semiconductor formation the array of sensing photodiodes includes performing fabrication processing of a silicon layer of an SOT wafer, and wherein the forming an array of light separating structure regions includes performing fabrication processing of an insulator layer and a bulk substrate of the SOT wafer. (E7) The method of any of (E1) through (E6), wherein the forming the structure having a dielectric barrier and the second semiconductor formation includes bonding above the semiconductor formation, a second semiconductor formation. (E8) The method of any of (E1) through (E7), wherein the forming the structure having a dielectric barrier and the second semiconductor formation includes bonding above the semiconductor formation, the second semiconductor formation, the second semiconductor formation comprising a semiconductor material different than a semiconductor material of the semiconductor formation. (E9) The method of any of (E1) through (E8), wherein the forming the structure having the dielectric barrier and the second semiconductor formation includes depositing above the semiconductor formation, a second semiconductor formation. (E10) The method of any of (E1) through (E9), wherein the forming the structure having the dielectric barrier and the second semiconductor formation includes depositing above the semiconductor formation, the second semiconductor formation, the second semiconductor formation comprising a semiconductor material different than a semiconductor material of the semiconductor formation. (E11) The method of any of (E1) through (E10), wherein method includes using frontside fabrication processing to form deep trench isolation trenches extending through the second semiconductor formation, and the semiconductor formation, and filling the deep trench isolation trenches to form deep trench isolation formations that define light separating structure regions within the structure comprising the dielectric barrier and the second semiconductor formation. (E12) The method of any of (E1) through (E11), wherein method includes using frontside fabrication processing to form first partial deep trench isolation trenches extending through the semiconductor formation and filling the first partial deep trench isolation trenches to form first partial deep trench isolation formations, and wherein method includes using backside fabrication processing to form second partial deep trench isolation trenches extending through the second semiconductor formation and filling the second partial deep trench isolation trenches to form second partial deep trench isolation formations, the second partial deep trench isolation formations defining light separating structure regions within the structure comprising the dielectric barrier and the second semiconductor formation. (E13) The method of any of) E1) through (E11), wherein sensing photodiodes defining the array of sensing photodiodes are disposed at pixel positions, wherein the method includes forming a charge removal path for removing electrical charges from the second semiconductor formation, wherein the charge removal path includes a conductive grid having one or more grid segment in contact with the second semiconductor formation disposed at respective ones of the pixel positions. (E14) The method of any of (E1) through (E11), wherein sensing photodiodes defining the array of sensing photodiodes are disposed at pixel positions, wherein the method includes forming a charge removal path for removing electrical charges from the second semiconductor formation, wherein the charge removal path includes a metal grid having one or more grid segment in contact with the second semiconductor formation disposed at respective ones of the pixel positions, a charge removal through via electrically connected to the metal grid and extending through elevations of the second semiconductor formation, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the second semiconductor formation. (F1) A method comprising: forming in a semiconductor formation an array of sensing photodiodes; forming a structure having alternating layers of first material and second material, the first material and the second material having different indices of refraction, and forming a detector surface, wherein the semiconductor formation is configured to receive excitation light and emission light from the detector surface; wherein the structure having the alternating layers of first material and second material is formed in a receive light path of the excitation light and emission light from the detector surface. (F2) The method of (F1), wherein the structure having the alternating layers of first material and second material is formed in a receive light path of the excitation light and emission light from the detector surface intermediate of the detector surface and the array of sensing photodiodes. (F3) The method of any of (F1) through (F2), wherein the structure having the alternating layers of first material and second material is configured to reflect light in wavelength bands of the excitation light. (F4) The method any of (F1) through (F3), wherein the structure having the alternating layers of first material and second material defines an interference reflector. (F5) The method of any of (F1) through (F4), wherein the structure having the alternating layers of first material and second material defines an interference reflector, the alternating layers of first material and second material are provided by alternating layers of dielectric material and semiconductor material. (F6) The method of any of (F1) through (F5), wherein the method includes depositing above the semiconductor formation, the alternating layers of first material and second material. (F7) The method of any of (F1) through (F6), wherein method includes using backside fabrication processing to form deep trench isolation trenches extending through the alternating layers of first material and second material, and filling the deep trench isolation trenches to form deep trench isolation formations that define light separating structure regions within the structure comprising the alternating layers of first material and second material. (G1) A device comprising: a detector surface configured for supporting biological or chemical samples; an array of sensing photodiodes formed in a semiconductor formation, wherein the semiconductor formation receives excitation light and emission light from the detector surface; a conductive grid having grid segments disposed between sample sites of the detector surface; wherein the conductive grid defines a charge removal path. (G2) The device of (G1), wherein the charge removal path extends through elevations of the semiconductor formation. (G3) The device of any of (G1) through (G2), wherein the charge removal path extends through elevations of the semiconductor formation and elevations of a light separating structure disposed intermediate the array of sensing photodiodes and the detector surface. (G4) The device of any of (G1) through (G3), wherein the conductive grid is configured to reduce cross talk between the sample sites. (G5) The device of any of (G1) through (G4), wherein the conductive grid is configured to reduce cross talk between the sample sites, and wherein a voltage bias is applied to the conductive grid so that the conductive grid produces an electric field. (H1) A device comprising: a detector surface configured for supporting biological or chemical samples; an array of sensing photodiodes formed in a semiconductor formation, wherein the semiconductor formation receives excitation light and emission light from the detector surface; and a light separating structure in a receive light path of the excitation light and emission light intermediate the detector surface and a sensing photodiode of the array of sensing photodiodes; wherein the light separating structure is configured to preferentially transmit photons of the emission light relative to photons of the excitation light. (I1) A device comprising: a detector surface configured for supporting biological or chemical samples; an array of sensing photodiodes formed in a semiconductor formation, wherein the semiconductor formation receives excitation light and emission light from the detector surface; a structure in a receive light path of the excitation light and emission light intermediate the detector surface and a sensing photodiode of the array of sensing photodiodes, wherein the structure comprises a second semiconductor formation that absorbs photons of the excitation light and the emission light, and a dielectric barrier that blocks electrons generated from photon absorption in the second semiconductor formation from reaching a sensing photodiode of the array of sensing photodiodes. (J1) A device comprising: a detector surface configured for supporting biological or chemical samples; an array of sensing photodiodes formed in a semiconductor formation, wherein the semiconductor formation receives excitation light and emission light from the detector surface; and a structure in a receive light path of the excitation light and emission light intermediate the detector surface and a sensing photodiode of the array of sensing photodiodes, wherein the structure comprises alternating layers of a first material and a second material, the second material having a higher index of refraction than the first material, wherein the structure preferentially transmits photons of the emission light relative to photons of the excitation light.

The terms "substantially", "approximately", "about", "relatively", or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations, that is, ±0%.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

It should be appreciated that all combinations of the foregoing concepts and additional concepts discussed in greater detail below (provided such concepts are not mutually inconsistent) are contemplated as being part of the subject matter disclosed herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples without departing from their scope. While the dimensions and types of materials described herein are intended to define the parameters of the various examples, they are by no means limiting and are merely exemplary. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of the term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112 (f) unless and until such claim limitations expressly use the phrase "means for" followed by a statement of function void of further structure. It is to be understood that not necessarily all such objects or advantages described above can be achieved in accordance with any particular example. Thus, for example, those skilled in the art will recognize that the systems and techniques described herein can be embodied or carried out in a manner that achieves or optimizes one advantage or group of advantages as taught herein without necessarily achieving other objects or advantages as can be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure can include only some of the described examples. Also, while some examples are described as having a certain number of elements it will be understood that the subject matter can be practiced with less than or greater than the certain number of elements. In addition, it will be understood that any feature herein described with respect to a certain example, can be incorporated into another example. Further, any description of a range herein encompasses all subranges. Accordingly, the subject matter is not to be seen as limited by the foregoing description, but is only limited by the scope of the appended claims.

The invention claimed is:

1. A device comprising:
a detector surface;
an array of sensing photodiodes formed in a semiconductor formation, wherein the semiconductor formation receives light from the detector surface; and
a light separating structure intermediate the detector surface and a sensing photodiode of the array of sensing photodiodes;
wherein the light separating structure is configured to preferentially transmit photons of emission light relative to photons of excitation light.

2. The device of claim 1, wherein the light separating structure comprises a second semiconductor formation that absorbs photons of light, and a dielectric barrier that blocks electrons generated from photon absorption in the second semiconductor formation from reaching a sensing photodiode of the array of sensing photodiodes.

3. The device of claim 1, wherein the light separating structure comprises a second semiconductor formation and a dielectric barrier, the second semiconductor formation comprising inorganic semiconductor material.

4. The device of claim 1, wherein sensing photodiodes defining the array of sensing photodiodes are disposed at pixel positions of the device, wherein the device includes a charge removal path for removing electrical charges from the light separating structure, wherein the charge removal path includes a conductive grid having one or more grid segment disposed at respective ones of the pixel positions of the device.

5. A device comprising:
a detector surface;
an array of sensing photodiodes formed in a semiconductor formation; and
a structure intermediate the detector surface and a sensing photodiode of the array of sensing photodiodes, wherein the structure comprises a second semiconductor formation that absorbs photons of light, and a dielectric barrier that blocks electrons generated from photon absorption in the second semiconductor formation from reaching a sensing photodiode of the array of sensing photodiodes.

6. The device of claim 5, wherein the second semiconductor formation comprises inorganic semiconductor material.

7. The device of claim 5, wherein the second semiconductor formation comprises inorganic semiconductor material differentiated from a material of the semiconductor formation.

8. The device of claim 5, wherein semiconductor formation comprises silicon, and wherein the second semiconductor formation comprises inorganic semiconductor material selected from the group consisting of Si, a-Si, Ge, and CdS.

9. The device of claim 5, wherein the semiconductor formation is defined by material of a silicon layer of a silicon on insulator (SOI) wafer, wherein the second semiconductor formation is defined by material of a bulk silicon substrate of the SOI wafer, and wherein the dielectric barrier is defined by material of an insulator of the SOI wafer.

10. The device of claim 5, wherein the structure comprising the second semiconductor formation that absorbs photons of light, and the dielectric barrier has a dielectric barrier depth greater than an absorption depth of a center wavelength of excitation light travelling from the detector surface.

11. The device of claim 5, wherein the structure comprising the second semiconductor formation that absorbs photons of light, and the dielectric barrier has a dielectric barrier depth less than an absorption depth of a center wavelength of emission light.

12. The device of claim 5, wherein the structure comprising the second semiconductor formation that absorbs photons of light, and the dielectric barrier has a dielectric barrier depth greater than an absorption depth of a center wavelength of excitation light, and wherein the structure comprising the second semiconductor formation that absorbs photons of light, and the dielectric barrier has a dielectric barrier depth less than an absorption depth of a center wavelength of emission light.

13. The device of claim 5, wherein the structure comprising the second semiconductor formation that absorbs photons of light, and the dielectric barrier has a dielectric barrier depth configured so that a percentage of photons at a center wavelength of emission light absorbed at elevations of the semiconductor formation below the dielectric barrier depth is about 20× or more than a percentage of photons at a center wavelength of excitation light absorbed at elevations of the semiconductor formation below the dielectric barrier depth.

14. The device of claim 5, wherein the structure comprising the second semiconductor formation and the dielectric barrier is dimensioned so that a first set of light separating structure regions have a first dielectric barrier depth, and a second set of light separating structure regions have a second dielectric barrier depth, the second dielectric barrier depth being less than the first dielectric barrier depth.

15. The device of claim 5, wherein the second semiconductor formation has a thickness of from about 1 nm to about 50.0 um, and wherein the dielectric barrier has a thickness of from about 1.0 nm to about 1000 nm.

16. The device of claim 5, wherein sensing photodiodes defining the array of sensing photodiodes are disposed at pixel positions of the device, wherein the device includes a charge removal path for removing electrical charges from the second semiconductor formation, wherein the charge removal path includes a conductive grid having one or more grid segment in contact with the second semiconductor formation disposed at respective ones of the pixel positions of the device.

17. The device of claim 5, having nanowells defined at the detector surface, wherein sensing photodiodes defining the array of sensing photodiodes are disposed at pixel positions of the device, wherein the device includes a charge removal path for removing electrical charges from the second semiconductor formation, wherein the charge removal path includes a metal grid having one or more grid segment in contact with the second semiconductor formation disposed at respective ones of the pixel positions of the device and occupying elevations overlapping elevations occupied by the nanowells, a charge removal through via electrically connected to the metal grid and extending through elevations of the second semiconductor formation, and a metallization layer electrically connected to the charge removal through via, wherein the metallization layer is integrally formed within a dielectric stack having integrally formed therein metallization defining readout circuitry for readout of signals from the array of sensing photodiodes, and wherein there is applied a voltage bias to the metal grid so that the metal grid produces an electric field that attracts charges from the second semiconductor formation.

* * * * *